United States Patent
Park et al.

(10) Patent No.: US 12,335,927 B2
(45) Date of Patent: Jun. 17, 2025

(54) METHOD AND APPARATUS FOR PERIODICALLY TRANSMITTING AND RECEIVING DATA IN WIRELESS COMMUNICATION SYSTEM

(71) Applicant: Samsung Electronics Co., Ltd., Suwon-si (KR)

(72) Inventors: Sungjin Park, Suwon-si (KR); Jinyoung Oh, Suwon-si (KR); Jonghyun Bang, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 17/757,683

(22) PCT Filed: Dec. 21, 2020

(86) PCT No.: PCT/KR2020/018730
§ 371 (c)(1),
(2) Date: Jun. 17, 2022

(87) PCT Pub. No.: WO2021/125907
PCT Pub. Date: Jun. 24, 2021

(65) Prior Publication Data
US 2023/0041764 A1    Feb. 9, 2023

(30) Foreign Application Priority Data

Dec. 20, 2019   (KR) .................. 10-2019-0172309
Oct. 19, 2020   (KR) .................. 10-2020-0135286
Nov. 17, 2020   (KR) .................. 10-2020-0153950

(51) Int. Cl.
*H04W 72/0446*   (2023.01)
*H04L 1/1812*    (2023.01)
(Continued)

(52) U.S. Cl.
CPC ....... *H04W 72/0446* (2013.01); *H04L 1/1812* (2013.01); *H04L 5/14* (2013.01); *H04W 72/21* (2023.01)

(58) Field of Classification Search
CPC .......................... H04W 72/0446; H04W 72/21; H04L 1/1812; H04L 5/14; H04L 1/1854; H04L 1/1861
See application file for complete search history.

(56) References Cited

U.S. PATENT DOCUMENTS

| 10,728,915 B2 | 7/2020 | Seo et al. |
| 2013/0265914 A1 | 10/2013 | Ahn et al. |

(Continued)

FOREIGN PATENT DOCUMENTS

| CN | 105490783 A | 4/2016 |
| CN | 106165334 A | 11/2016 |

(Continued)

OTHER PUBLICATIONS

Supplementary European Search Report dated Nov. 22, 2023, in connection with European Application No. 20902931.3, 8 pages.

(Continued)

*Primary Examiner* — Christine Ng

(57) ABSTRACT

The present disclosure relates to a communication technique for merging, with an IoT technology, a 5G communication system for supporting a higher data transmission rate than a 4G system, and a system therefor. The present disclosure can be applied to intelligent services (for example, smart homes, smart buildings, smart cities, smart cars or connected cars, healthcare, digital education, retail business, security-and safety-related services, and the like) on the basis of a 5G communication technology and an IoT-related technology. The present disclosure discloses a method and apparatus for transmitting and receiving downlink grant-free-based data.

11 Claims, 23 Drawing Sheets

(51) Int. Cl.
*H04L 5/14* (2006.01)
*H04W 72/21* (2023.01)

(56) References Cited

U.S. PATENT DOCUMENTS

| | | | |
|---|---|---|---|
| 2014/0348039 A1* | 11/2014 | Park | H04L 27/2601 370/280 |
| 2015/0244485 A1 | 8/2015 | Nguyen et al. | |
| 2017/0094642 A1 | 3/2017 | Lee et al. | |
| 2018/0020335 A1* | 1/2018 | Yin | H04W 28/0268 |
| 2019/0081750 A1* | 3/2019 | Yang | H04L 5/0082 |
| 2019/0313436 A1 | 10/2019 | Lee et al. | |
| 2019/0356455 A1 | 11/2019 | Yang et al. | |
| 2020/0044712 A1* | 2/2020 | Manolakos | H04L 1/0013 |
| 2020/0045706 A1 | 2/2020 | Shin et al. | |
| 2021/0160829 A1 | 5/2021 | Park et al. | |
| 2021/0314105 A1* | 10/2021 | Gao | H04W 72/21 |
| 2021/0344455 A1* | 11/2021 | Choi | H04L 5/0055 |
| 2021/0368453 A1* | 11/2021 | Lee | H04W 52/146 |
| 2022/0166541 A1* | 5/2022 | Takeda | H04L 1/1864 |

FOREIGN PATENT DOCUMENTS

| | | |
|---|---|---|
| KR | 10-2013-0115348 A | 10/2013 |
| WO | 2014061972 A1 | 4/2014 |
| WO | 2018169326 A1 | 9/2018 |

OTHER PUBLICATIONS

LG Electronics, "Discussion on DL SPS enhancement and resource conflict between PUSCHs," R1-1908547, 3GPP TSG RAN WG1 #98, Prague, Czech Republic, Aug. 26-30, 2019, 6 pages.
Nokia, et al., "On resource conflicts between UL grants and HARQ-ACK Enhancements for SPS," R1-1908439, 3GPP TSG RAN WG1 Meeting #98, Prague, Czech Republic, Aug. 26-30, 2019, 9 pages.
International Search Report and Written Opinion of the International Searching Authority dated Mar. 9, 2021, in connection with International Application No. PCT/KR2020/018730, 9 pages.
Institute for Information Industry (III), "Enhancements to DL SPS," R1-1912778, 3GPP TSG RAN WG1 #99, Reno, USA, Nov. 18-22, 2019, 5 pages.
Motorola Mobility, et al., "HARQ-ACK feedback for enhanced DL SPS," R1-1912854, 3GPP TSG RAN WG1 #99, Reno, USA, Nov. 18-22, 2019, 4 pages.
NTT DOCOMO, INC., "Discussions on DL SPS enhancement," R1-1912891, 3GPP TSG RAN WG1 #99, Reno, USA, Nov. 18-22, 2019, 9 pages.
Wilus Inc., "Remaining Issues on SPS PDSCH for NR URLLC," R1-1913071, 3GPP TSG RAN WG1 #99, Reno, USA, Nov. 18-22, 2019, 5 pages.
3GPP TS 38.211 V15.7.0 (Sep. 2019), Technical Specification, 3rd Generation Partnership Project; Technical Specification Group Radio Access Network; NR; Physical channels and modulation (Release 15), Sep. 2019, 97 pages.
3GPP TS 38.213 V16.0.0 (Dec. 2019), Technical Specification, 3rd Generation Partnership Project; Technical Specification Group Radio Access Network; NR; Physical layer procedures for control (Release 16), Dec. 2019, 146 pages.
3GPP TS 38.321 V15.7.0 (Sep. 2019), Technical Specification, 3rd Generation Partnership Project; Technical Specification Group Radio Access Network; NR; Medium Access Control (MAC) protocol specification (Release 15), Sep. 2019, 78 pages.
3GPP TS 38.321 V16.0.0 (Mar. 2020), Technical Specification, 3rd Generation Partnership Project; Technical Specification Group Radio Access Network; NR; Medium Access Control (MAC) protocol specification (Release 16), Mar. 2020, 141 pages.
The First Office Action dated Oct. 22, 2024, in connection with Chinese Application No. 202080088699.5, 19 pages.
Qualcomm Incorporated, "Discussion on Simultaneous PDSCH Reception," R1-1803533, 3GPP TSG-RAN WG1 Meeting AH 1801, Athens, Greece, Feb. 26-Mar. 2, 2018, 1 pages.
Notification of the Decision to Grant a Patent Right for Patent for Invention dated Mar. 14, 2025, in connection with Chinese Applicaion No. 202080088699.5, 7 pages.

* cited by examiner

METHOD AND APPARATUS FOR PERIODICALLY TRANSMITTING AND RECEIVING DATA IN WIRELESS COMMUNICATION SYSTEM

CROSS-REFERENCE TO RELATED APPLICATIONS

This application is a 371 National Stage of International Application No. PCT/KR2020/018730, filed Dec. 21, 2020, which claims priority to Korean Patent Application No. 10-2019-0172309, filed Dec. 20, 2019, Korean Patent Application No. 10-2020-0135286, filed Oct. 19, 2020, and Korean Patent Application No. 10-2020-0153950, filed Nov. 17, 2020, the disclosures of which are herein incorporated by reference in their entirety.

BACKGROUND

1. Field

The disclosure relates to a grant-free-based data transmission method in a wireless communication system. More particularly, the disclosure relates to a downlink grant-free-based data transmission method.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques have been discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

A 5G communication system has been developed to provide various services, and a method of efficiently providing the services is needed according to provision of the various services. Accordingly, research on grant-free-based communication is being actively conducted.

SUMMARY

The disclosure describes an embodiment for efficiently using radio resources and performing grant-free-based data transmission and reception. Particularly, a downlink grant-free-based data transmission and reception method and an uplink grant-free-based data transmission and reception method are described.

In order to solve the problem, a method performed by a UE in a wireless communication system according to an embodiment of the disclosure includes: receiving a higher-layer signal including information for a first semi-persistence scheduling (SPS) configuration from a BS; receiving downlink control information (DCI) for activating the first SPS configuration from the BS; receiving first SPS data related to the first SPS configuration from the BS at two or more different time points, based on information for the first SPS configuration and the DCI; and transmitting a plurality of pieces of hybrid automatic repeat request-acknowledgement (HARQ-ACK) information for the first SPS data from the BS through one physical uplink control channel (PUCCH), wherein the two or more different time points are determined based on the information for the first SPS configuration, and the plurality of pieces of HARQ-ACK information are transmitted at an uplink transmission time point identified based on the higher-layer signal and the DCI.

The information for the first SPS configuration may include at least one of a transmission period of the first SPS data, an HARQ process number, and resource information for the PUCCH, and the DCI may include a timing indicator indicating a transmission period of HARQ-ACK information for the first SPS data related to the first SPS configuration.

The plurality of pieces of HARQ-ACK information may include at least one piece of HARQ-ACK information which cannot be transmitted at a transmission time point indicated by the timing indicator.

The higher-layer signal may further include information for a second SPS configuration, the plurality of pieces of HARQ-ACK information may include HARQ-ACK information for at least one piece of second SPS data related to the second SPS configuration, and HARQ process IDs for HARQ-ACK information included in the plurality of pieces of HARQ-ACK information may be determined not to overlap each other, based on the HARQ process number.

According to another embodiment of the disclosure, a UE in a wireless communication system includes: a transceiver configured to transmit and receive a signal; and a controller connected to the transceiver, wherein the controller is configured to receive a higher-layer signal including information for a first semi-persistent scheduling (SPS) configuration from a BS, receive downlink control information (DCI) for activating the first SPS configuration from the BS, receive first SPS data related to the first SPS configuration from the BS at two or more different time points, based on the information for the first SPS configuration and the DCI, and transmit a plurality of pieces of hybrid automatic repeat request-acknowledgement (HARQ-ACK) information for the first SPS data to the BS through one physical uplink control channel (PUCCH), and the two or more different time points are determined based on the information for the first SPS configuration, and the plurality of pieces of HARQ-ACK information are transmitted at an uplink transmission time point identified based on the higher-layer signal and the DCI.

A method performed by a BS in a wireless communication system according to another embodiment of the disclosure includes: transmitting a higher-layer signal including information for a first semi-persistent scheduling (SPS) configuration to a UE; transmitting downlink control information (DCI) for activating the first SPS configuration to the BS; transmitting first SPS data related to the first SPS configuration to the BS at two or more different time points, based on information for the first SPS configuration and the DCI; and receiving a plurality of pieces of hybrid automatic repeat request-acknowledgement (HARQ-ACK) information for the first SPS data from the UE through one physical uplink control channel (PUCCH), wherein the two or more different time points are determined based on the information for the first SPS configuration, and the plurality of pieces of HARQ-ACK information are received at an uplink transmission time point identified based on the higher-layer signal and the DCI.

A BS in a wireless communication system according to another embodiment of the disclosure includes: a transceiver configured to transmit and receive a signal; and a controller connected to the transceiver, wherein the controller is configured to transmit a higher-layer signal including information for a first semi-persistent scheduling (SPS) configuration to a UE, transmit downlink control information (DCI) for activating the first SPS configuration to the UE, transmit first SPS data related to the first SPS configuration to the UE at two or more different time points, based on the information for the first SPS configuration and the DCI, and receive a plurality of pieces of hybrid automatic repeat request-acknowledgement (HARQ-ACK) information for the first SPS data from the UE through one physical uplink control channel (PUCCH), and the two or more different time points are determined based on the information for the first SPS configuration, and the plurality of pieces of HARQ-ACK information are received at an uplink transmission time point identified based on the higher-layer signal and the DCI.

According to the disclosed embodiments, radio resource can be efficiently used and various services can be efficiently provided to users according to priorities.

DETAILED DESCRIPTION

Figure 1:
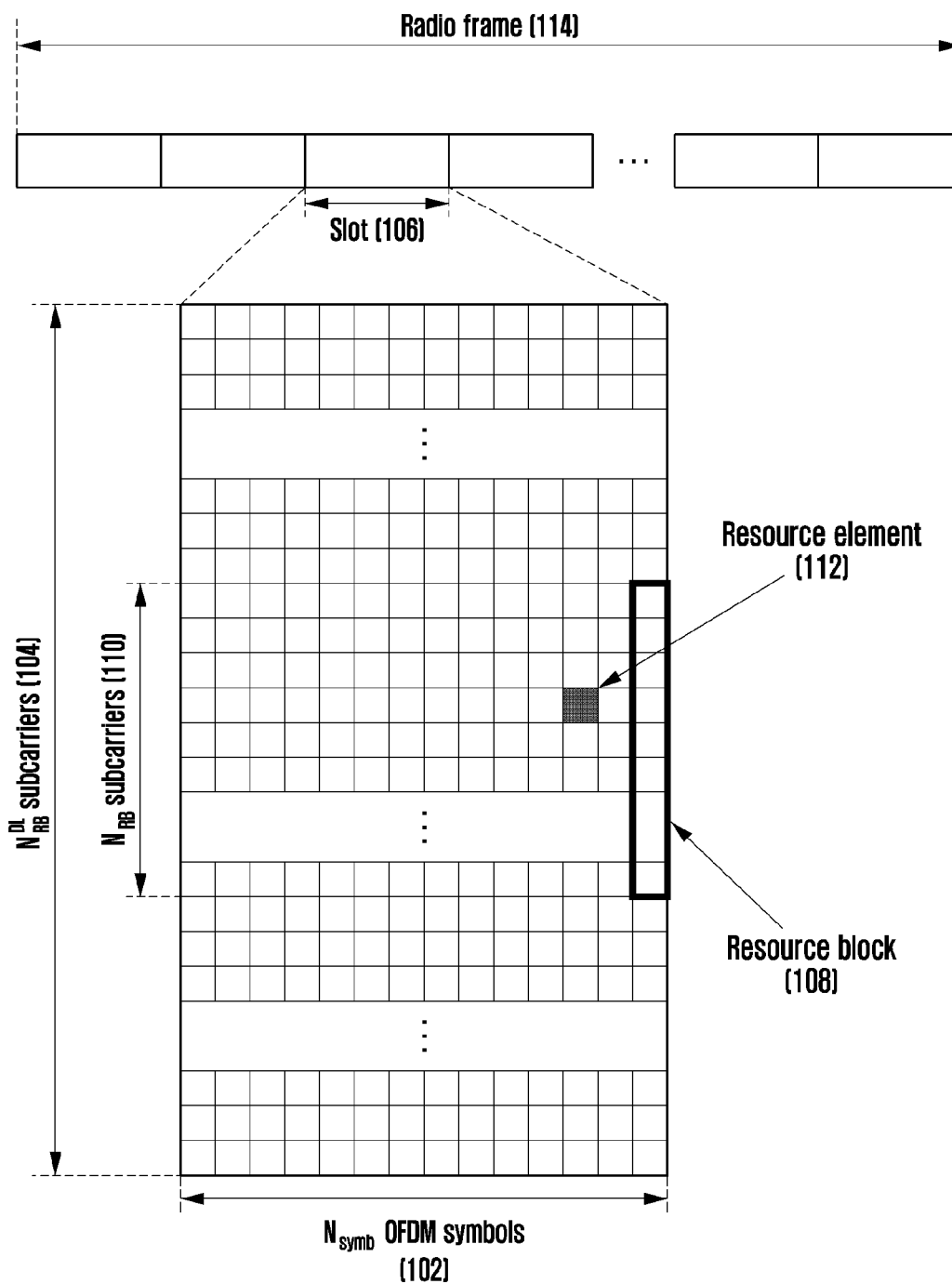
FIG. 1 illustrates a transmission structure of time-frequency domains which are wireless resource areas of a 5G or NR system according to an embodiment of the disclosure.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has been developed from an initial wireless communication system providing a service based on a voice to a broadband wireless communication system providing a high speed and high quality packet data service like the communication standard such as a high speed packet access (HSPA) of 3rd generation partnership project (3GPP), long term evolution (LTE) (or evolved universal terrestrial radio access (E-UTRA)), high rate packet data (HRPD) of 3GPP2, ultra mobile broadband (UMB), and institute of electrical and electronics engineers (IEEE) 802.16e. Communication standard of 5G or new radio (NR) is being developed as a 5G wireless communication system.

In a 5G or NR system that is a representative example of the broadband wireless communication system, an orthogonal frequency division multiplexing (OFDM) scheme is adopted in the downlink (DL) and the uplink. More specifically, a cyclic-prefix OFDM (CP-OFDM) scheme is adopted in the downlink, and a discrete Fourier transform spreading OFDM (DFT-S-OFDM) scheme is adapted in addition to the CP-OFDM scheme in the uplink. The uplink refers to a radio link through which the UE transmits data or a control signal to the BS, and the downlink refers to a radio link through which the BS transmits data or a control signal to the UE. In such a multi-access scheme, time-frequency resources for carrying data or control information are allocated and operated in a manner to prevent overlapping of resources, that is, to establish orthogonality, between users so as to identify data or control information of each user.

The 5G or NR system adopts a hybrid automatic repeat request (HARQ) scheme in which a physical layer re-transmits corresponding data when a decoding failure occurs in an initial transmission. In the HARQ scheme, when a receiver does not accurately decode data, the receiver transmits information (negative acknowledge: NACK) informing the transmitter of decoding failure and thus the transmitter may re-transmit the corresponding data on the physical layer. The receiver may combine data retransmitted from the transmitter and previous data, the decoding of which failed, whereby data reception performance may increase. Further, when the receiver accurately decodes data, the receiver transmits information (acknowledgement: ACK) informing the transmitter of decoding success and thus the transmitter may transmit new data.

Meanwhile, new radio access technology (NR) system that is new 5G communication is designed to freely multiplex various services in time and frequency resources, and accordingly waveform, numerology, and reference signals may be dynamically or freely allocated according to a need of the corresponding service. Meanwhile, in the 5G or NR system, supported service types may be divided into categories such as enhanced mobile broadband (eMBB), massive machine type communications (mMTC), ultra-reliable and low-latency communications (URLLC), and the like. eMBB is a service aiming at high-speed transmission of high-capacity data, mMTC is a service aiming at minimization of UE power and access of a plurality of UEs, and URLLC is a service aiming at high reliability and low latency. Different requirements may be applied according to the type of service applied to the UE.

In the disclosure, the terms are defined in consideration of functions thereof and may vary depending on a user, an operator's intention, or convention. Therefore, the definitions of the terms should be made based on the contents throughout the specification. Hereinafter, the BS is the entity that allocates resources to the UE, and may be at least one of a gNode B (gNB), an eNode B (eNB), a Node B, a base station (BS), a radio access unit, a BS controller, and a node on a network. The UE may include a user equipment (UE), a mobile station (MS), a cellular phone, a smart phone, a computer, or a multimedia system capable of performing a communication function. Hereinafter, the disclosure describes the NR system as an example, but is not limited thereto, and embodiments of the disclosure can be applied to various communication systems having a similar technical background or channel form. Further, the embodiments of the disclosure can be applied to other communication systems through some modifications without departing from the scope of the disclosure on the basis of a determination by those skilled in the art.

In the disclosure, the conventional terms "physical channel" and "signal" may be interchangeably used with "data" or "control signal". For example, a physical downlink shared channel (PDSCH) is a physical channel through which data is transmitted, but the PDSCH may be data in the disclosure. That is, PDSCH transmission and reception may be understood as data transmission and reception.

In the disclosure, higher signaling (or interchangeably used with a higher signal, a higher-layer signal, and higher-layer signaling) is a method by which the BS transmits a signal to the UE through a downlink data channel of a physical layer or by which the UE transmits a signal to the BS through an uplink data channel of a physical layer, and may be referred to as radio resource control (RRC) signaling or a medium access control (MAC) control element (CE).

According to recent research on the 5G communication system, various schemes for scheduling communication with the UE have been discussed. Accordingly, an efficient scheduling and data transmission/reception method considering characteristics of the 5G communication system is required. Therefore, a method of providing each service in the same time interval according to a characteristic of the corresponding service in order to provide a plurality of services to a user and an apparatus using the same are needed in a communication system.

The UE should receive separate control information from the BS in order to transmit or receive data to or from the BS. However, in the case of periodically generated traffic or a service type requiring low latency and/or high reliability, it is possible to transmit or receive data without the separate control information. Such a transmission method is called a configured grant (or interchangeably used with grant-free or configured scheduled)-based data transmission method. A method of receiving or transmitting data after data transmission resources configured through control information are configured and relevant information is received may be a first signal transmission/reception type, and a method of transmitting or receiving data on the basis of pre-configured information without any control information may be a second signal transmission/reception type. For the second signal transmission/reception type, pre-configured resource areas periodically exist, and the areas have an uplink type 1 grant (UL type 1 grant) which is a method including a configuration of only an higher signal and an uplink type 2 grant (UL type 2 grant) which is a method including a configuration of a combination of a higher signal and an L1 signal (that is, downlink control information (DCI)) (or semi-persistent scheduling (SPS)). In the case of the UL type 2 grant (or SPS), some pieces of information are determined by the higher signal, and whether to actually transmit data is determined by the L1 signal. The L1 signal may be largely divided into a signal indicating activation of resources through a higher configuration and a signal indicating release of the activated resources.

The disclosure includes, when a DL SPS transmission period has aperiodicity or smaller than one slot, a semi-static HARQ-ACK codebook and dynamic HARQ-ACK codebook determination method and an HARQ-ACK information transmission method.

FIG. 1 illustrates a transmission structure of time-frequency domains which are radio resource areas in the 5G or NR system.

Referring to FIG. 1, in the radio resource areas, the horizontal axis indicates a time domain and the vertical axis indicates a frequency domain. The minimum transmission unit in the time domain is an OFDM symbol, and Nsymb OFDM symbols 102 correspond to one slot 106. The length of a subframe may be defined as 1.0 ms, and a radio frame 114 may be defined as 10 ms. In the frequency domain, the minimum transmission unit is a subcarrier, and a bandwidth of the entire system transmission band may include a total of NBW subcarriers 104. However, such detailed values may be variably applied according to a system.

A basic unit of the time-frequency resource areas is a resource element (RE) 112, and may be indicated by an OFDM symbol index and a subcarrier index. A resource block (RB) 108 may be defined as NRB consecutive subcarriers 110 in the frequency domain.

In general, the minimum transmission unit of data is an RB. In the 5G or NR system, in general, Nsymb=14, NRB=12, and NBW may be proportional to the bandwidth of the system transmission band. The data rate increases in proportion to the number of RBs scheduled to the UE. In the case of an FDD system in which the downlink and the uplink are divided and operated according to the frequency in the 5G or NR system, a downlink transmission bandwidth and an uplink transmission bandwidth may be different. A channel bandwidth refers to an RF bandwidth corresponding to a system transmission bandwidth. [Table 1] below shows the corresponding relation between a system transmission bandwidth defined in the LTE system that is 4th-generation wireless communication before the 5G or NR system and a channel bandwidth. For example, the LTE system having a channel bandwidth of 10 MHz has a transmission bandwidth of 50 RBs.

TABLE 1

| | Channel bandwidth BW$_{Channel}$[MHz] | | | | | |
|---|---|---|---|---|---|---|
| | 1.4 | 3 | 5 | 10 | 15 | 20 |
| Transmission bandwidth configuration NRB | 6 | 15 | 25 | 50 | 75 | 100 |

In the 5G or NR system, a wider channel bandwidth than the channel bandwidth of LTE shown in [Table 1] may be adopted. [Table 2] shows the corresponding relation between a system transmission bandwidth of the 5G or NR system, and a channel bandwidth and subcarrier spacing (SCS).

TABLE 2

| | SCS | Channel bandwidth BW$_{Channel}$ [MHz] | | | | | | | | | |
|---|---|---|---|---|---|---|---|---|---|---|---|
| | [kHz] | 5 | 10 | 15 | 20 | 25 | 40 | 50 | 60 | 80 | 100 |
| Maximum transmission bandwidth N$_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| Maximum Transmission bandwidth N$_{RB}$ | 60 | N.A. | 11 | 18 | 24 | 31 | 51 | 65 | 79 | 107 | 135 |

In the 5G or NR system, scheduling information for downlink data or uplink data may be transmitted from the BS to the UE through downlink control information (DCI). The DCI is defined in various formats. Each format may indicate whether the DCI is scheduling information (UL grant) for uplink data or scheduling information (DL grant) for downlink data, whether the DCI is compact DCI having small size control information, whether the DCI applies spatial multiplexing using multiple antennas, and whether the DCI is DCI for controlling power. For example, DCI format 1_1 which is scheduling control information (DL grant) of downlink data may include one of pieces of the following information.

Carrier indicator: indicates a frequency carrier through which transmission is performed.

DCI format indicator: indicates an indicator for identifying whether the corresponding DCI is for the downlink or the uplink.

Bandwidth part (hereinafter, referred to as a BWP) indicator: indicates a BWP in which transmission is performed.

Frequency domain resource allocation: indicates RBs allocated to data transmission in the frequency domain. Expressed resources are determined according to the system bandwidth and the resource allocation type.

Time domain resource allocation: indicates a slot and an OFDM symbol in which a data-related channel is to be transmitted.

VRB-to-PRB mapping: indicates a mapping scheme of a virtual RB (hereinafter, referred to as a VRB) index and a physical RB (hereinafter, referred to as a PRB) index.

Modulation and coding scheme (MCS): indicates a modulation scheme and a coding rate used for data transmission; That is, a coding rate value informing of a transport block size (TBS) and channel coding information along with information indicating quadrature phase shift keying (QPSK), 16 quadrature amplitude modulation (QAM), 64 QAM, or 256 QAM may be indicated.

Codeblock group (CBG) transmission information: indicates information on which CBG is transmitted when CBG retransmission is configured.

HARQ process number: indicates a process number of HARQ.

New data indicator: indicates HARQ initial transmission or HARQ retransmission.

Redundancy version: indicates a redundancy version of HARQ.

Physical uplink control channel (PUCCH) resource indicator: indicates PUCCH resources for transmitting ACK/NACK information of downlink data.

PDSCH-to-HARQ feedback timing indicator: indicates a slot in which ACK/NACK information for downlink data is transmitted.

Transmit power control (TPC) command for PUCCH: indicates a transmission power control command for a PUCCH which is an uplink control channel.

In the case of physical uplink shared channel (PUSCH) transmission, time domain resource assignment may be delivered by information on a slot in which the PUSCH is transmitted, a start symbol location S in the corresponding slot, and the number L of OFDM symbols to which the PUSCH is mapped. S may be a relative location from start of the slot, L may be the number of consecutive OFDM symbols, and S and L may be determined on the basis of a start and length indicator value (SLIV) defined as follows.

If $(L-1) \leq 7$ then $SLIV=14*(L-1)+S$ else $SLIV=14*(14-L+1)+(14-1-S)$ where $0<L<14-S$ In the 5G or NR system, in general, a table including information on an SLIV value, a PUSCH mapping type, and a slot in which the PUSCH is transmitted in one row may be configured through an RRC configuration. Thereafter, in the time domain resource assignment of the DCI, the BS may transmit information on the SLIV value, the PUSCH mapping type, and the slot in which the PUSCH is transmitted by indicating an index value in the configured table. Such a method may be applied to the PDSCH.

Specifically, when the BS indicates a time resource allocation field index m included in DCI for scheduling the PDSCH to the UE, it may inform of a combination of DMRS Type A position information corresponding to m+1, PDSCH mapping type information, a slot index K0, a data resource start symbol S, and a data resource allocation length L in the table indicating time domain resource allocation information. For example, [Table 3] below is a table including normal cyclic prefix-based PDSCH time domain resource allocation information.

TABLE 3

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In [Table 3], the dmrs-typeA-Position is a field informing of a symbol location at which the DMRS is transmitted in one slot indicated by a system information block (SIB) which is one of UE-common control information. An available value of the corresponding field may include 2 or 3. When a total number of symbols included in one slot is 14 and a first symbol index is 0, 2 refers to a third symbol and 3 refers to a fourth symbol. In [Table 3], the PDSCH mapping type is information informing of a location of the DMRS in the scheduled data resource area. When the PDSCH mapping type is A, the DMRS may be always transmitted and received at the symbol location determined by the dmrs-typeA-Position regardless of allocated data time domain resources. When the PDSCH mapping type is B, the DMRS may be always transmitted and received in a first symbol in the allocated data time domain resources. In other words, the PDSCH mapping type B may not use dmrs-typeA-Position information.

In [Table 1], K0 denotes an offset of a slot index to which the physical downlink control channel (PDCCH) for transmitting DCI belongs and a slot index to which the PDSCH scheduled by the corresponding DCI or the PUSCH belongs. For example, when the slot index of the PDCCH is n, a slot index of the PDSCH scheduled by the DCI or the PUSCH is n+K0. In [Table 3], S denotes a start symbol index of the data time domain resources in one slot. A range of an available S value is from 0 to 13 on the basis of a normal cyclic prefix. In [Table 1], L denotes a data time domain resource interval length in one slot. A range of an available L value is from 1 to 14.

In the 5G or NR system, a type A and a type B are defined as the PDSCH mapping type. In the PDSCH mapping type A, a first OFDM symbol of the DMRS OFDM symbols may be located in a second or a third OFDM symbol of the slot. In the PUSCH mapping type B, a first OFDM symbol of the DMSR OFDM symbols may be located in a first OFDM symbol of the time domain resources allocated through PUSCH transmission. The method of allocating PUSCH time domain resources can be equally applied to PDSCH time domain resource allocation.

DCI may be transmitted through a physical downlink control channel (or interchangeably used with control information) which is a downlink physical control channel via the channel coding and modulation process. In General, the DCI is scrambled by a specific radio network temporary identifier (RNTI) (or a UE identifier), independently for each UE, a cyclic redundancy check (CRC) is added, and channel coding is performed, whereby each independent PDCCH is configured and transmitted. The PDCCH is mapped to a control resource set (CORESET) configured in the UE and transmitted.

Downlink data may be transmitted through a physical downlink shared channel (PDSCH) which is a physical channel for transmitting downlink data. The PDSCH may be transmitted after the control channel transmission interval, and the detailed mapping location in the frequency domain and scheduling information such as the modulation scheme may be determined on the basis of the DCI transmitted through the PDCCH.

Via the MCS of the control information included in the DCI, the BS may report the modulation scheme applied to a PDSCH to be transmitted to the UE and the size (transport block size (TBS)) of data to be transmitted. In an embodiment, the MCS may be configured by 5 bits or bits larger than or smaller than 5 bits. The TBS corresponds to the size before channel coding for error correction is applied to the data (TB) to be transmitted by the BS.

In the disclosure, the transport block (TB) may include a medium access control (MAC) header, a MAC CE, one or more MAC service data units (SDUs), and padding bits. Alternatively, the TB may indicate the unit of data from the MAC layer to the physical layer or a MAC protocol data unit (PDU).

The modulation scheme supported by the 5G or LTE system includes quadrature phase shift keying (QPSK), 16 quadrature amplitude modulation (16 QAM), 64 QAM, and 256 QAM. Respective modulation orders (Qm) correspond to 2, 4, 6, and 8, respectively. That is, 2 bits may be transmitted per symbol in the QPSK modulation, 4 bits may be transmitted per OFDM symbol in the 16 QAM modulation, 6 bits may be transmitted per symbol in the 64 QAM modulation, and 8 bits may be transmitted per symbol in the 256 QAM modulation.

When the PDSCH is scheduled by the DCI, HARQ-ACK information indicating whether the PDSCH is successfully decoded or the decoding fails is transmitted from the UE to the BS through the PUCCH. The HARQ-ACK information is transmitted in a slot indicated by a PDSCH-to-HARQ feedback timing indicator included in the DCI for scheduling the PDSCH, and values mapped to PDSCH-to-HARQ feedback timing indicators of 1 to 3 bits are configured by a higher-layer signal as shown in [Table 4]. When the PDSCH-to-HARQ feedback timing indicator indicates k, the UE may transmit HARQ-ACK information in a slot after k slots from a slot n in which the PDSCH is transmitted, that is, in a slot n+k.

TABLE 4

| PDSCH-to-HARQ_feedback timing indicator | | | |
|---|---|---|---|
| 1 bit | 2 bits | 3 bits | Number of slots k |
| '0' | '00' | '000' | 1st value provided by dl-DataToUL-ACK |

TABLE 4-continued

| PDSCH-to-HARQ_feedback timing indicator | | | |
|---|---|---|---|
| 1 bit | 2 bits | 3 bits | Number of slots k |
| '1' | '01' | '001' | 2nd value provided by dl-DataToUL-ACK |
|  | '10' | '010' | 3rd value provided by dl-DataToUL-ACK |
|  | '11' | '011' | 4th value provided by dl-DataToUL-ACK |
|  |  | '100' | 5th value provided by dl-DataToUL-ACK |
|  |  | '101' | 6th value provided by dl-DataToUL-ACK |
|  |  | '110' | 7th value provided by dl-DataToUL-ACK |
|  |  | '111' | 8th value provided by dl-DataToUL-ACK |

When the PDSCH-to-HARQ feedback timing indicator is not included in DCI format 1_1 for scheduling the PDSCH, the UE may transmit HARQ-ACK information in a slot n+k according to the value of k configured through higher-layer signaling. When transmitting the HARQ-ACK information through the PUCCH, the UE may transmit the HARQ-ACK information through PUCCH resources determined on the basis of a PUCCH resource indicator included in the DCI for scheduling the PDSCH. At this time, an ID of the PUCCH resources mapped to the PUCCH resource indicator may be configured through higher-layer signaling.

Figure 2:
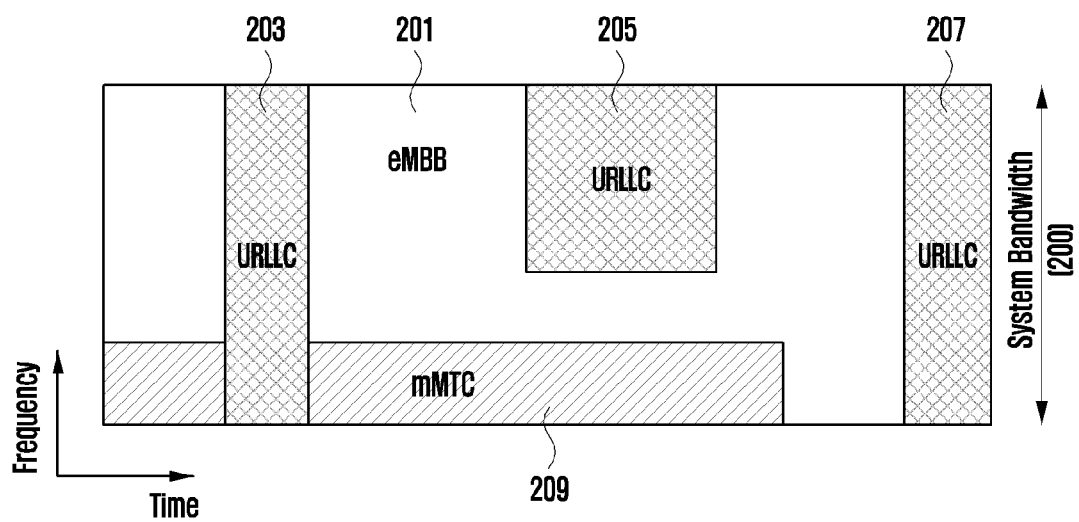
FIG. 2 illustrates an example of allocating data for eMBB, URLLC, and mMTC in time-frequency resource areas in the 5G or NR system according to an embodiment of the disclosure.

FIG. 2 illustrates an example of allocating data for eMBB, URLLC, and mMTC in time-frequency resource areas in the 5G or NR system.

Referring to FIG. 2, the data for eMBB, URLLC, and mMTC may be allocated to an entire system frequency band 200. When URLLC data 203, 205, and 207 are generated and are required to be transmitted while eMBB data 201 and mMTC data 209 are allocated to specific frequency bands and transmitted, the transmitter may empty the part to which the eMBB data 201 and the mMTC data 209 have been already allocated or transmit the URLLC data 203, 205, and 207 without transmission of the data. Among the services, URLLC needs to reduce a delay time, and thus URLLC data may be allocated to and transmitted in a part of resources to which eMBB or mMTC data is allocated. When the URLLC data is additionally allocated to and transmitted in resources to which the eMBB data has been allocated, the eMBB data may not be transmitted in duplicate frequency-time resources, and accordingly, the transmission performance of the eMBB data may be reduced. That is, the eMBB data transmission may fail due to URLLC allocation.

Figure 3:
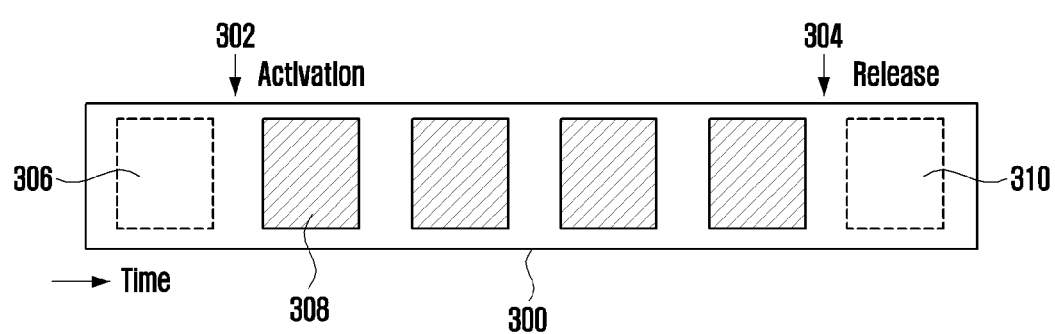
FIG. 3 illustrates a grant-free transmission/reception operation according to an embodiment of the disclosure.

FIG. 3 illustrates a grant-free transmission and reception operation.

The UE have a first signal transmission/reception type of receiving downlink data from the BS according to information configured only through a higher signal and a second signal transmission/reception type of receiving downlink data according to transmission configuration information indicated by a higher signal and an L1 signal. The disclosure mainly describes a UE operation method of the second signal transmission/reception type. In the disclosure, SPS which is the second signal type for receiving downlink data means downlink grant-free-based PDSCH transmission. In DL SPS, the UE may receive the grant-free-based PDSCH transmission through additional configuration information indicated by the higher signal configuration and DCI.

DL SPS means downlink semi-persistent scheduling, and is a method by which the BS periodically transmits and receives downlink data information to and from the UE on the basis of information configured through higher signaling without specific downlink control information scheduling. It can be applied in the VoIP or a periodically occurring traffic situation. Alternatively, a resource configuration for DL SPS may be periodic but actually generated data may be aperiodic. In such a case, the UE does not know whether actual data is generated in the periodically configured resources, and thus two types of operations below can be performed.

Method 3-1: the UE transmits HARQ-ACK information for an uplink resource area corresponding to the corresponding resource area for a demodulation/decoding result of the received data to the BS Method 3-2: when the UE successfully detects at least a DMRS or a signal for data for the periodically configured DL SPS resource area, the UE transmits HARQ-ACK information for an uplink resource area corresponding to the corresponding resource area for a demodulation/decoding result of the received data to the BS Method 3-3: when the UE succeeds in the demodulation/decoding (that is, ACK) for the periodically configured DL SPS resource area, the UE transmits HARQ-ACK information for an uplink resource area corresponding to the corresponding resource area for a demodulation/decoding result of the received data to the BS In method 3-1, the UE always transmits HARQ-ACK information to the uplink resource area corresponding to the corresponding DL SPS resource area even though the BS does not actually transmit downlink data for the DL SPS resource area. In method 3-2, the UE can transmit HARQ-ACK information if the UE know whether data is transmitted/received like in a situation in which the UE successively detects a DMRS or a CRC since the UE does not know when the BS transmits data to the DL SPS resource area. In method 3-3, HARQ-ACK information is transmitted to the uplink resource area corresponding to the corresponding DP SPS resource area only when the UE successively demodulates/decodes data.

Among the above-described methods, the UE can support only one method all the time or can support two or more methods. One of the methods can be selected through the 3GPP standard or a higher signal. For example, method 3-1 is indicated through a higher signal, the UE can transmit HARQ-ACK information for the corresponding DL SPS on the basis of method 3-1. Alternatively, one method can be selected according to DL SPS higher configuration information. For example, the UE can apply method 3-1 when a transmission period is n slots or longer in DL SPS higher configuration information, and apply method 3-3 in the opposite case. In the present embodiment, the transmission period is described as an example, but an applied MCS table, DMRS configuration information, or resource configuration information can be sufficiently used.

The UE may receive downlink data in a downlink resource area configured through higher signaling. The downlink resource area configured through higher signaling may be activated or released by L1 signaling.

FIG. 3 illustrates an operation for DL SPS. The UE may receive the following DL SPS configuration information through a higher signal.

Periodicity: DL SPS transmission period
nrofHARQ-Processes: the number of HARQ processes configured for the DL SPS n1PUCCH-AN: HARQ resource configuration information for DL SPS mcs-Table: MCS table configuration information applied to DL SPS In the disclosure, all pieces of the DL SPS configuration information can be configured for each Pcell or each Scell and also configured for each bandwidth part (BWP). Further, one or more DL SPSs can be configured for each specific cell or BWP.

In FIG. 3, the UE may determine grant-free transmission/reception configuration information 300 through reception of a higher signal for DL SPS. In the DL SPS, data can be transmitted and received for a resource area 308 configured after the reception 302 of DCI indicating activation and data can be transmitted and received for an entire resource area 306 before reception of the corresponding DCI. Further, for a resource area 310 after reception 304 of DCI indicating release, the UE cannot receive data.

When all of the two conditions below are satisfied for SPS scheduling activation or release, the UE may verify the DL SPS assignment PDCCH.

Condition 1: a CRC bit of a DCI format transmitted in the PDCCH is scrambled by a CS-RNTI configured through higher signaling Condition 2: a new data indicator (NDI) field for an activated transport block is configured as 0

When some of the fields included in DCI formats transmitted through the DL SPS assignment PDCCH are the same as those shown in [Table 5] or [Table 6], the UE may determine that information within the DCI format is valid activation or valid release of the DL SPS. For example, when the UE detects the DCI format including the information shown in [Table 5], the UE may determine that the DL SPS is activated. In another example, when the UE detects the DCI format including the information shown in [Table 6], the UE may determine that the DL SPS is released.

When some of the fields included in the DCI formats transmitted through the DL SPS assignment PDCCH are not the same as those shown in [Table 5](special field configuration information for activating DL SPS) or [Table 6](special field configuration information for releasing DL SPS), the UE determines that the DCI format is detected by a non-matching CRC.

TABLE 5

|  | DCI format 1_0 | DCI format 1_1 |
|---|---|---|
| HARQ process number | set to all '0's | set to all '0's |
| Redundancy version | set to '00' | For the enabled transport block: set to '00' |

TABLE 6

|  | DCI format 1_0 |
|---|---|
| HARQ process number | set to all '0's |
| Redundancy version | set to '00' |
| Modulation and coding scheme | set to all '1's |
| Resource block assignment | set to all '1's |

When the UE receives the PDSCH without reception of the PDCCH or receives the PDCCH indicating SPS PDSCH release, the UE may generate an HARQ-ACK information bit corresponding thereto. Further, in at least Rel-15 NR, the UE may not expect transmission of HARQ-ACK information(s) for reception of two or more SPS PDSCHs in one PUCCH resource. In other words, in at least Rel-15 NR, the UE may include only HARQ-ACK information for reception of one SPS PDSCH in one PUCCH resource.

DL SPS may be also configured in a primary cell (PCell) and a secondary cell (SCell). Parameters which can be configured through DL SPS higher signaling may be described below.

Periodicity: DL SPS transmission period nrofHARQ-processes: the number of HARQ processes which can be configured for DL SPS n1PUCCH-AN: PUCCH HARQ resources for DL SPS, wherein the BS configures resources by PUCCH format 0 or 1

[Table 5] and [Table 6] described above may fields in which only one DL SPS can be configured for each cell and each BWP. In a situation in which a plurality of DL SPSs are configured for each cell and each BWP, a DCI field for activating (or releasing) each DL SPS resource may be different. The disclosure provides a method of solving such a situation.

In the disclosure, not all DCI formats described in [Table 5] and [Table 6] are used for activating or releasing DL SPS resources. For example, DCI format 1_0 and DCI format 1_1 used for scheduling the PDSCH may be used for activating DL SPS resources. For example, DCI format 1_0 used for scheduling the PDSCH may be used for releasing DL SPS resources.

Figure 4:
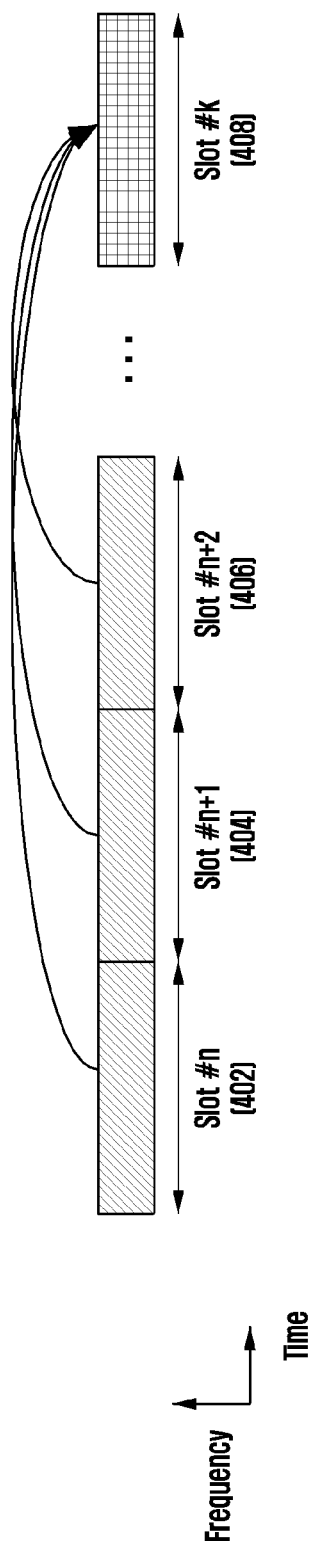
FIG. 4 illustrates a semi-static hybrid automatic repeat request (HARQ)-acknowledgement (ACK) codebook configuration method in the NR system.

FIG. 4 illustrates a semi-static HARQ-ACK codebook configuration method in the NR system.

In a situation in which the number of HARQ-ACK PUCCHs which can be transmitted by the UE within one slot is limited to one, when the UE receives a semi-static HARQ-ACK codebook higher configuration, the UE may report HARQ-ACK information for PDSCH reception or SPS PDSCH release through an HARQ-ACK codebook in a slot indicated by a value of a PDSCH-to-HARQ_feedback timing indicator in DCI format 1_0 or DCI format 1_1. Further, the UE may report, as NACK, an HARQ-ACK information bit value within the HARQ-ACK codebook in a slot which is not indicated by the PDSCH-to-HARQ feedback timing indicator field within DCI format 1_0 or DCI format 1_1. If the UE reports only HARQ-ACK information for one SPS PDSCH release or one PDSCH reception in the cases of $M_{A,c}$ for reception of candidate PDSCHs and the report is scheduled by DCI format 1_0 including information indicating 1 by a counter DAI field in the Pcell, the UE may determine one HARQ-ACK codebook for the corresponding SPS PDSCH release or the corresponding PDSCH reception.

The other cases, an HARQ-ACK codebook determination method according to the following method may be performed.

When a set of PDSCH reception candidates in a serving cell c is $M_{A,c}$, $M_{A,c}$ may be obtained through the following step of [pseudo-code 1].

[pseudo-code 1 start]

- Step 1: initialize j to 0 and $M_{A,c}$ to a null set. k which is an HARQ-ACK transmission timing index is initialized to 0.

- Step 2: configure R as a set of rows in a table including information on a slot to which the PDSCH is mapped, start symbol information, the number of symbols, or length information. When a mapping information of an available PDSCH indicated by each value of R is configured as an UL symbol according to the configured DL and UL configuration, the corresponding row is deleted from R.
- Step 3-1: the UE may receive one PDSCH for unicast in one slot, and one PDSCH is added to a set of MA,c if R is not a null set.
- Step 3-2: when the UE can receive one or more PDSCHs for unicast in one slot, the number of PDSCHs which can be allocated to different symbols is counted in the calculated R and the corresponding number is added to MA,c.
- Step 4: increase k by 1 and start from step 2 again.
[pseudo-code 1 end]

In a description of pseudo-code 1 by way of example of FIG. 4, all slot candidates for PDSCH-to-HARQ-ACK timing at which slot #k 408 can be indicated are considered to perform HARQ-ACK PUCCH transmission in slot #k 408. In FIG. 4, it is assumed that HARQ-ACK transmission is possible in slot #k 408 by a PDSCH-to-HARQ-ACK timing combination allowed only for PDSCHs scheduled in slot #n 402, slot #n+1 404, and slot #n 406. The maximum number of PDSCHs which can be scheduled for each slot is calculated in consideration of time domain resource configuration information of PDSCHs which can be scheduled in the slots 402, 404, and 406 and information indicating whether a symbol within the slot is for downlink or uplink. For example, when the maximum number of PDSCHs which can be scheduled in the slot 402 is 2, the maximum number of PDSCHs which can be scheduled in the slot 404 is 3, and the maximum number of PDSCHs which can be scheduled in the slot 406 is 2, the maximum number of PDSCHs included in an HARQ-ACK codebook transmitted in the slot 408 is 7. This is called cardinality of the HARQ-ACK codebook.

In a specific slot, step 3-2 is described through [Table 7](default PDSCH time domain resource allocation A for normal CP) below.

TABLE 7

| Row index | dmrs-TypeA-Position | PDSCH mapping type | $K_0$ | S | L | Ending | Order |
|---|---|---|---|---|---|---|---|
| 1 | 2 | Type A | 0 | 2 | 12 | 13 | 1x |
|   | 3 | Type A | 0 | 3 | 11 | 13 | 1x |
| 2 | 2 | Type A | 0 | 2 | 10 | 11 | 1x |
|   | 3 | Type A | 0 | 3 | 9 | 11 | 1x |
| 3 | 2 | Type A | 0 | 2 | 9 | 10 | 1x |
|   | 3 | Type A | 0 | 3 | 8 | 10 | 1x |
| 4 | 2 | Type A | 0 | 2 | 7 | 8 | 1x |
|   | 3 | Type A | 0 | 3 | 6 | 8 | 1x |
| 5 | 2 | Type A | 0 | 2 | 5 | 6 | 1x |
|   | 3 | Type A | 0 | 3 | 4 | 6 | 1x |
| 6 | 2 | Type B | 0 | 9 | 4 | 12 | 2x |
|   | 3 | Type B | 0 | 10 | 4 | 13 | 3 |
| 7 | 2 | Type B | 0 | 4 | 4 | 7 | 1x |
|   | 3 | Type B | 0 | 6 | 4 | 9 | 2 |
| 8 | 2, 3 | Type B | 0 | 5 | 7 | 11 | 1x |
| 9 | 2, 3 | Type B | 0 | 5 | 2 | 6 | 1x |
| 10 | 2, 3 | Type B | 0 | 9 | 2 | 10 | 2x |
| 11 | 2, 3 | Type B | 0 | 12 | 2 | 13 | 3x |
| 12 | 2, 3 | Type A | 0 | 1 | 13 | 13 | 1x |
| 13 | 2, 3 | Type A | 0 | 1 | 6 | 6 | 1x |
| 14 | 2, 3 | Type A | 0 | 2 | 4 | 5 | 1 |
| 15 | 2, 3 | Type B | 0 | 4 | 7 | 10 | 1x |
| 16 | 2, 3 | Type B | 0 | 8 | 4 | 11 | 2x |

[Table 7] is a time resource allocation table in which the UE operates by default before receiving allocation of time resources through a separate RRC signal. For reference, a PDSCH time resource allocation value is determined by dmrs-TypeA-Position which is a UE-common RRC signal in addition to an indication of a row index value through separate RRC. In [Table 7] above, an encoding column and an order column are separately added for convenience of description, and they may not actually exist. The ending column means a end symbol of the scheduled PDSCH, and the order column means a code location value located within a specific codebook in a semi-static HARQ-ACK codebook. The corresponding table is applied to time resource allocation applied in DCI format 1_0 in the common-search area of the PDCCH.

The UE performs the following steps in order to determine the HARQ-ACK codebook by calculating the maximum number of PDSCHs that do not overlap within a specific slot.

Step 1: search for a PDSCH allocation value first ending within a slot in all rows in the PDSCH time resource allocation table. In corresponding [Table 7], 14 of a row index first ends. This is expressed as 1 in the order column. Other row indexes which overlap with the corresponding order index 14 in at least one symbol are expressed as 1x in the order column.

Step 2: search for a PDSCH allocation value which first ends in the remaining row indexes which are not expressed in the order column. In [Table 7], the PDSCH allocation value corresponds to a row having a row index of 7 and a dmrs-TypeA-Position value of 3. Other row indexes which overlap with the corresponding order index in at least one symbol are expressed as 2x in the order column.

Step 3: increase and express an order value by repeating step 2. For example, in [Table 7], a PDSCH allocation value which first ends in row indexes which are not expressed in the order column is searched for. In [Table 7], the PDSCH allocation value corresponds to a row having a row index of 6 and a dmrs-TypeA-Position value of 3. Other row indexes which overlap with the corresponding order index in at least one symbol are expressed as 3x in the order column.

Step 4: end the process when all row indexes are expressed in the order. The size of the corresponding order is the maximum number of PDSCHs which can be scheduled in the corresponding slot without time overlapping. Scheduling having no time overlapping means that different PDSCHs are scheduled by TDM.

In the order column of [Table 7], a maximum value of order means the size of the HARQ-ACK codebook of the corresponding slot, and the order value means an HARQ-ACK codebook point at which an HARQ-ACK feedback bit for the corresponding scheduled PDSCH is located. For example, a row index 16 in [Table 7] means a second code location in a semi-static HARQ-ACK codebook having the size of 3. When a set of occasions for candidates PDSCH receptions in the serving cell c is $M_{A,c}$, the UE transmitting HARQ-ACK feedback may calculate $M_{A,c}$ through the steps of [pseudo-code 1] or [pseudo-code 2]. $M_{A,c}$ may be used to determine the number of HARQ-ACK bits which the UE should transmit. Specifically, the HARQ-ACK codebook may be configured using cardinality of the $M_{A,c}$ set.

In another example, matters that should be considered to determine the semi-static HARQ-ACK codebook (or type 1 HARQ-ACK codebook) are described below.

a) on a set of slot timing values $K_1$ associated with the active UL BWP
  a)) If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0
  b)) If the UE is configured to monitor PDCCH for DCI format 1_1 for serving cell c, $K_1$ is provided by dl-DataToUL-ACK for DCI format 1_1 b) on a set of row indexes R of a table that is provided either by a first set of row indexes of a table that is provided by PDSCH-TimeDomainResourceAllocationList in PDSCH-ConfigCommon or by Default PDSCH time domain resource allocation A [6, TS 38.214], or by the union of the first set of row indexes and a second set of row indexes, if provided by PDSCH-TimeDomainResourceAllocationList in PDSCH-Config, associated with the active DL BWP and defining respective sets of slot offsets $K_0$, start and length indicators SLIV, and PDSCH mapping types for PDSCH reception as described in [6, TS 38.214]

c) on the ratio $2^{\mu_{DL}-\mu_{UL}}$ between the downlink SCS configuration $\mu_{DL}$ and the uplink SCS configuration $\mu_{UL}$ provided by subcarrierSpacing in BWP-Downlink and BWP-Uplink for the active DL BWP and the active UL BWP, respectively d) Dedicated as described in Subclause 11.1.

In another example, a pseudo-code for determining the HARQ-ACK codebook is described below.

```
[pseudo-code 2 start]
    For the set of slot timing values K_1, the UE determines a set of M_{A,c} occasions
for candidate PDSCH receptions or SPS PDSCH releases according to the following pseudo-code.
A location in the Type-1 HARQ-ACK codebook for HARQ-ACK information corresponding to a
SPS PDSCH release is same as for a corresponding SPS PDSCH reception.
    Set j = O - index of occasion for candidate PDSCH reception or SPS PDSCH
release
    Set B = Ø
    Set M_{A,c} = Ø
    Set c(K_1) to the cardinality of set K_1
    Set k =0 - index of slot timing values K_{1,k}, in descending order of the slot
timing values, in set K_1 for serving cell c
        while k < c(K_1)
            if mod(n_U-K_{1,k}+1,max(2^{μUL-μDL},1))=0
            Set n_D = 0 - index of a DL slot within an UL slot
            while n_D < max(2^{μDL-μUL}, 1)
                Set R to the set of rows
                Set c(R) to the cardinality of R
                Set r=0 - index of row in set R
                if slot n_U starts at a same time as or after a slot for an active
DL BWP change on serving cell c or an active UL BWP change on the PCell and slot
⌊(n_U-K_{1,k})*2^{μDL-μUL}⌋ +n_D is before the slot for the active DL BWP change on serving cell c or
the active UL BWP change on the PCell
                    continue;
                else
                    while r<c(R)
                        if the UE is provided TDD-UL-DL-
ConfigurationCommon or TDD-UL-DL-ConfigDedicated and, for each slot from slot
⌊(n_U-K_{1,k})*2^{μDL-μUL}⌋ + n_D-N_{PDSCH}^{repeat}+1 to slot ⌊(n_U-K_{1,k})*2^{μDL-μUL}⌋ +n_D, at least one symbol of the
PDSCH time resource derived by row r is configured as UL here K_{1,k} is the k-th slot timing
value in set K_1,
                            R=R/r;
                        end if
                        r=r+1;
                    end while
                    if the UE does not indicate a capability to receive
more than one unicast PDSCH per slot and R≠Ø,
                        M_{A,c}=M_{A,c} ∪j;
                        j=j+1;
                        The UE does not expect to receive SPS
PDSCH release and unicast PDSCH in a same slot;
                    else
                        Set c(R) to the cardinality of R
                        Set m to the smallest last OFDM symbol
index, as determined by the SLIV, among all rows of R
                        while R≠Ø
                            Set r=0
                            while r<c(R)
                                if S≤m for start OFDM symbol
index S for row r
                                    b_{r,k,n_D}=j ; - index of
occasion for candidate PDSCH reception or SPS PDSCH release associated with row r
                                    R=R/r;
                                    B=B ∪ b_{r,k,n_D};
```

-continued

```
            end if
            r=r+1;
        end while
        M_{A,c}=M_{A,c} ∪j
        j=j+i;
        Set m to the smallest last OFDM
symbol index among all rows of R;
        end while
      end if
    end if
    n_D=n_D+1;
  end while
 end if
 k = k + 1;
end while
[pseudo-code 2 end]
```

In [pseudo-code 2], the location of the HARQ-ACK codebook including HARQ-ACK information for DCI indicating DL SPS release is based on the location at which the DL SPS PDSCH is received. For example, when a start symbol of transmission of the DL SPS PDSCH is a fourth OFDM symbol based on the slot and the length thereof is 5 symbols, it is assumed that HARQ-ACK information including DL SPS release indicating the release of the corresponding SPS starts from the fourth OFDM symbol of the slot in which the DL SPS release is transmitted and a PDSCH having the length of 5 symbols is mapped and HARQ-ACK information corresponding thereto is determined through a PDSCH-to-ACK timing indicator and a PUSCH resource indicator included in control information indicating DL SPS release. In another example, when a start symbol of transmission of the DL SPS PDSCH is a fourth OFDM symbol based on the slot and the length thereof is 5 symbols, it is assumed that HARQ-ACK information including DL SPS release indicating the release of the corresponding SPS starts from the fourth OFDM symbol of the slot indicated by time domain resource allocation (TDRA) of DCI that is the DL SPS release and a PDSCH having the length of 5 symbols is mapped and HARQ-ACK information corresponding thereto is determined through a PDSCH-to-ACK timing indicator and a PUSCH resource indicator included in control information indicating DL SPS release.

Figure 5:
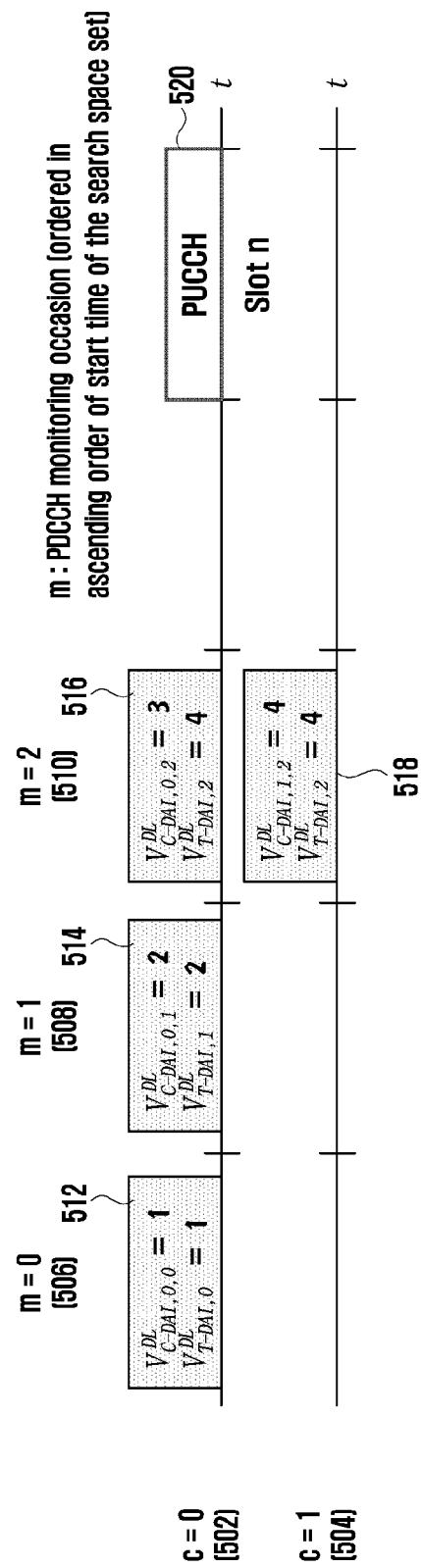
FIG. 5 illustrates a dynamic HARQ-ACK codebook configuration method in the NR system.

FIG. 5 illustrates a dynamic HARQ-ACK codebook configuration method in the NR system.

The UE transmits HARQ-ACK information transmitted within one PUCCH in corresponding slot n on the basis of a PDSCH-to-HARQ feedback timing value for PUCCH transmission of HARQ-ACK information in slot n for PDSCH reception or SPS PDSCH release and K0 that is transmission slot location information of the PDSCH scheduled in DCI format 1_0 or 1_1. Specifically, for the HARQ-ACK information transmission, the UE determines an HARQ-ACK codebook of the PUCCH transmitted in the slot determined by the PDSCH-to-HARQ feedback timing and K0 on the basis of DAI included in the DCI indicating the PDSCH or SPS PDSCH release.

The DAI includes counter DAI and total DAI. The counter DAI is information informing of the location of HARQ-ACK information corresponding to the PDSCH scheduled in DCI format 1_0 or DCI format 1_1 within the HARQ-ACK codebook. Specifically, a value of the counter DAI within DCI format 1_0 or 1_1 indicates an accumulated value of PDSCH reception or SPS PDSCH release scheduled by DCI format 1_0 or DCI format 1_1 in a specific cell c. The accumulated value is configured on the basis of PDCCH monitoring occasion in which the scheduled DCI exists and the serving cell.

The total DAI is a value informing the size of the HARQ-ACK codebook. Specifically, a value of the total DAI means a total number of PDSCH or SPS PDSCH releases scheduled before a time point at which the DCI is scheduled. The total DAI is a parameter used when HARQ-ACK information in the serving cell includes HARQ-ACK information for the PDSCH scheduled in another cell including the serving cell c in carrier aggregation (CA). In other words, in a system operated by one cell, there is no total DAI parameter.

An example of the operation for the DAI is illustrated in FIG. 5. FIG. 5 illustrates a change in values of counter DAI (C-DAI) and total DAI (T-DAI) indicated by DCI found for each PDCCH monitoring occasion configured for each carrier when the UE transmits an HARQ-ACK codebook selected on the basis of DAI in an nth slot of carrier 0 502 to a PUCCH 520 in a situation in which two carriers are configured. First, DCI found in m=0 506 indicates a value 512 of 1 by C-DAI and T-DAI. DCI found in m=1 508 indicates a value 514 of 2 by C-DAI and T-DAI. DCI found in carrier 0 502 (c=0) of m=2 510 indicates a value 516 of 3 by C-DAI and T-DAI. DCI found in carrier 1 504 (c=1) of m=2 510 indicates a value 516 of 4 by C-DAI and T-DAI At this time, when carriers 0 and 1 are scheduled in the same monitoring occasion, T-DAI is all indicated as 4.

In FIGS. 4 and 5, the determination of the HARQ-ACK codebook is performed in a situation in which only one PUCCH containing HARQ-ACK information is transmitted in one slot. This is called mode 1. In an example of a method by which one PUCCH transmission resource is determined in one slot, when PDSCHs scheduled by different DCIs are multiplexed and transmitted to one HARQ-ACK codebook in the same slot, a PUCCH resource selected for transmitting the HARQ-ACK is determined as a PUCCH resource indicated by a PUCCH resource field indicated in DCI last scheduling the PDSCH. That is, a PUCCH resource indicated by the PUCCH resource field indicated in DCI scheduled before the DCI is ignored.

The following description defines a method and apparatuses for determining the HARQ-ACK codebook in a situation in which two or more PUCCHs containing HARQ-ACK information can be transmitted in one slot. This is called mode 2. The UE can operate only in mode 1 (transmit only one HARQ-ACK PUCCH in one slot) or only in mode 2 (transmits one or more HARQ-ACK PUCCHs in one slot). Alternatively, the UE supporting both mode 1 and mode 2 can be configured to operate in only one mode by higher signaling, or mode 1 and mode 2 can be implicitly determined by a DCI format, an RNTI, a DCI specific field value, scrambling, or the like. For example, a PDSCH scheduled in DCI format A and HARQ-ACK information associated therewith are based on mode 1, and a PDSCH scheduled in DCI format B and HARQ-ACK information associated therewith are based on mode 2.

Whether the HARQ-ACK codebook is the semi-static HARQ-ACK codebook of FIG. 4 or the dynamic HARQ-ACK codebook of FIG. 5 is determined by an RRC signal.

Figure 6:
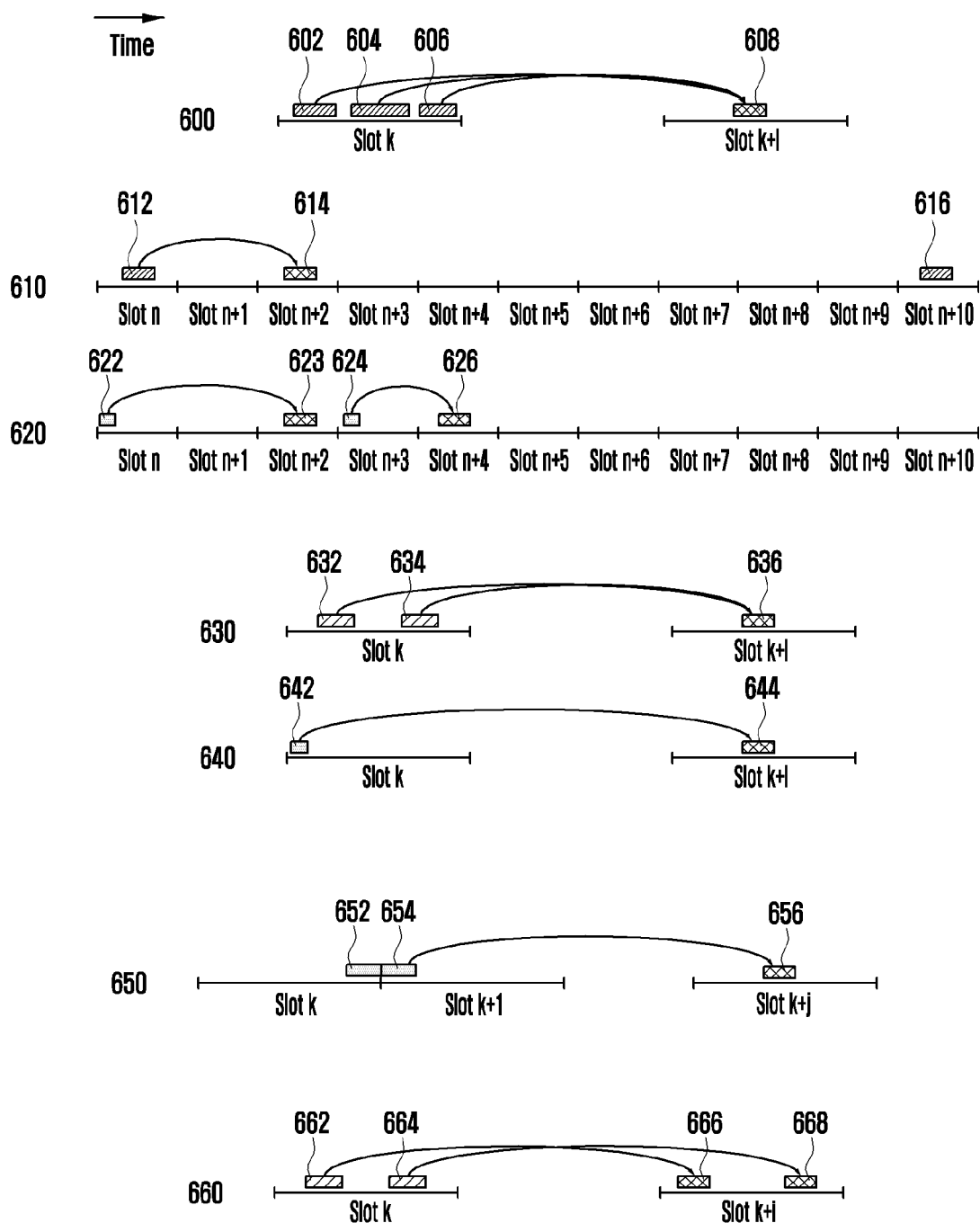
FIG. 6 illustrates a process of transmitting HARQ-ACK for downlink (DL) semi-persistent scheduling (SPS).

FIG. 6 illustrates an HARQ-ACK transmission process for DL SPS.

Reference numeral 600 of FIG. 6 shows a situation in which a maximum of PDSCHs 602, 604, and 606 which can be received are mapped while time resources do not overlap in slot k. For example, when the PDSCH-to-HARQ feedback timing indicator is not included in a DCI format for scheduling the PDSCH, the UE transmits HARQ-ACK information 608 in slot k+1 according to the value of 1 configured through higher-layer signaling. Accordingly, the size of a semi-static HARQ-ACK codebook of slot k+1 is the same as the maximum number of PDSCHs which can be transmitted in slot k, which is 3. Further, when HARQ-ACK information for each PDSCH is 1 bit, the HARQ-ACK codebook of reference numeral 608 may include a total of 3 bits of [X, Y, Z] in reference numeral 600 of FIG. 6, and X is HARQ-ACK information for the PDSCH 602, Y is HARQ-ACK information for the PDSCH 604, and Z is HARQ-ACK information for the PDSCH 606. When the PDSCH is successfully received, the corresponding information may be mapped to ACK, and otherwise, mapped to NACK. Further, when DCI does not actually schedule the corresponding PDSCH, the UE reports NACK. Specifically, the location of the HARQ-ACK codebook may vary depending on an SLIV of the PDSCH which can be scheduled by the DCI, and may be determined by [Table 7], [pseudo code 1], or [pseudo code 2]. Reference numeral 610 of FIG. 6 shows HARQ-ACK transmission in a situation in which DL SPS is activated. In Rel-15 NR, a minimum period of DL SPS is 10 ms and the length of one slot is 1 ms in subcarrier spacing of 15 kHz in reference numeral 610, and thus the SPS PDSCH 612 is transmitted in slot n and the SPS PDSCH 616 is transmitted in the following slot n+10.

Through the HARQ-ACK information for the SPS PDSCH, an SPS period, HARQ-ACK transmission resource information, an MCS table configuration, and the number of HARQ processes are informed by a higher signal, and then frequency resources, time resources, an MCS value, and the like are informed according to information included in a DCI format indicating the corresponding SPS activation. For reference, PUCCH resources for transmitting HARQ-ACK information may also be configured by a higher signal, and PUCCH resources have the following attributes.

The existence or nonexistence of hopping
PUCCH format (start symbol, symbol length, and the like)

Here, the MCS table configuration and the HARQ-ACK transmission resource information may not exist. When the HARQ-ACK transmission resource information exists, a PUCCH format 0 or 1 in which transmission up to 2 bits can be performed is supported in Rel-15 NR. However, a PUCCH format 2, 3, or 4 larger than or equal to 2 bits can be sufficiently supported in the release thereafter.

Since the HARQ-ACK transmission resource information is included in the DL SPS higher signal configuration, the UE can ignore a PUCCH resource indicator in the DCI format indicating DL SPS activation. Alternatively, the PUCCH resource indicator field may not exist in the corresponding DCI format. On the other hand, when there is no HARQ-ACK transmission resource information in the DL SPS higher signal configuration, the UE transmits HARQ-ACK information corresponding to DL SPS through PUCCH resources determined by the PUCCH resource indicator of the DCI format for activating DL SPS. Further, difference between the slot for transmitting the SPS PDSCH and the slot for transmitting the corresponding HARQ-ACK information is determined by a value indicated by the PDSCH-to-HARQ-ACK feedback timing indicator of the DCI format for activating DL SPS or, when there is no indicator, a specific value configured in advance by a higher signal is used. For example, when the PDSCH-to-HARQ-ACK feedback timing indicator is 2 as indicated by reference numeral 610 of FIG. 6, HARQ-ACK information for the SPS PDSCH 612 transmitted in slot n is transmitted through the PUCCH 614 of slot n+2. Further, the PUCCH for transmitting the corresponding HARQ-ACK information may be configured by a higher signal, or the corresponding resource may be determined by an L1 signal indicating DL SPS activation. When it is assumed that a maximum of three PDSCHs can be received as indicated by reference numeral 600 of FIG. 6 and time resources of the PDSCH 612 are the same as those of the PDSCH 604, the location of the HARQ-ACK codebook for the SPS PDSCH 612 transmitted by the PUCCH 614 corresponds to Y in [X Y Z].

When DCI indicating DL SPS release is transmitted, the UE should transmit HARQ-ACK information for the corresponding DCI to the BS. However, in the case of a semi-static HARQ-ACK codebook, the size and the location of the HARQ-ACK codebook are determined by the time resource area to which the PDSCH is allocated and a slot interval (PDSCH to HARQ-ACK feedback timing) between the PDSCH and the HARQ-ACK indicated by an L1 signal or a higher signal as described above. Therefore, when the DCI indicating DL SPS release is transmitted to the semi-static HARQ-ACK codebook, a specific rule is need instead of randomly determining the location within the HARQ-ACK codebook, and the location of the HARQ-ACK information for DCI indicating DL SPS release is mapped to be the same as the transmission resource area of the corresponding DL SPS PDSCH in Rel-15. For example, reference numeral 620 of FIG. 6 shows a situation in which DCI 622 indicating release of the activated DL SPS PDSCH is transmitted in slot n. When the PDSCH-to-HARQ-ACK feedback timing indicator included in the format of the corresponding DCI 622 indicates 2, HARQ-ACK information for the corresponding DCI 622 is transmitted through the PUCCH 623 of slot n+2 and the UE maps HARQ-ACK information for the DCI 622 indicating DL SPS release to the location of the HARQ-ACK codebook corresponding to the corresponding SPS PDSCH and transmits the same on the basis of the assumption that the pre-configured SPS PDSCH is scheduled in slot n. In connection with this, two methods below are possible, and the BS and the UE transmit and receive the corresponding DCI by the standard or a BS configuration through one method.

Method 6-1-1: transmits DCI indicting DL SPS release only in a slot in which a preconfigured SPS PDSCH is transmitted.

For example, when the SPS PDSCH is configured to be transmitted in slot n as indicated by reference numeral 620 of FIG. 6, the UE transmits the DCI 622 indicating SPS PDSCH release only in slot n and the location of a slot for transmitting HARQ-ACK information therefor is the same as the location the determined on the basis of the assumption that the SPS PDSCH is transmitted. In other words, when the slot for transmitting HARQ-ACK information for the SPS PDSCH is n+2, the slot for transmitting HARQ-ACK information for DCI indicating DL SPS PDSCH release is also n+2.

Method 6-1-2: transmits DCI indicating DL SPS release in a random slot regardless of the slot for transmitting the SPS PDSCH.

For example, when the SPS PDSCH is transmitted in slots n, n+10, n+20 . . . as indicated by reference numeral 620 of FIG. 6, the BS transmits the DCI 624 indicating the corresponding DL SPS PDSCH release in slot n+3 and, when a value indicated by the PDSCH-to-HARQ-ACK feedback timing indicator included in the corresponding DCI is 1 or there is no corresponding field and a pre-configured value by a higher signal is 1, HARQ-ACK information 626 for the DCI indicating DL SPS PDSCH release is transmitted and received in slot n+4.

A minimum period of DL SPS may become shorter than 10 ms. For example, when there is data wirelessly requiring high reliability and low latency and a transmission period of the corresponding data is regular and the period itself is short, different equipment in a factory should have a shorter period than the current period of 10 ms. Accordingly, a DL SPS transmission period may be determined in units of slots, symbols, or symbol groups rather than in units of ms regardless of subcarrier spacing. For reference, a minimum transmission period of the uplink configured grant PUSCH resource is two symbols.

Reference numeral 630 of FIG. 6 shows a situation in which a DL SPS transmission period is 7 symbols smaller than a slot. Since the transmission period is within one slot, a maximum of two SPS PDSCHs 632 and 634 can be transmitted in slot k. When there is no value indicated by the PDSCH-to-HARQ-ACK feedback timing indicator included in DCI indicating SPS activation or no corresponding field, HARQ-ACK information corresponding to the SPS PDSCH 632 and the SPS PDSCH 634 is transmitted in a slot according to a value configured in advance by a higher signal. For example, when the corresponding value is i, the UE transmits HARQ-ACK information 636 for the SPS PDSCH 632 and the SPS PDSCH 634 in slot k+1. For the location of the HARQ-ACK codebook included in the HARQ-ACK information, not only the TDRA which is time resource information for scheduling the SPS PDSCH but also the transmission period should be considered. Since only one SPS PDSCH could be conventionally transmitted per slot, the HARQ-ACK codebook location was determined on the basis of the TDRA which is time resource information without considering the transmission period, but when the DL SPS transmission period is smaller than a slot, both the TDRA which is time resource information and the transmission period should be considered to determine the HARQ-ACK codebook location. The TDRA is time domain resource allocation, and includes a transmission start symbol of the SPS PDSCH and length information. For example, when the DL SPS transmission period is 7 symbols, the start symbol of the DL SPS PDSCH determined by the TDRA is 2, and the length is 3, two DL SPS PDSCHs exist in one slot as indicated by reference numeral 630 of FIG. 6. That is, the first SPS PDSCH 632 is a PDSCH having OFDM symbol indexes 2, 3, and 4 determined by TDRA, and the second SPS PDSCH 634 is a PDSCH having OFDM symbol indexes 9, 10, and 11 considering the TDRA and the transmission period of 7 symbols. That is, the second SPS PDSCH within a slot has the same length as the first SPS PDSCH, but has an offset moving by the transmission period. In summary, in generation or determination of the semi-static HARQ-ACK codebook, the UE uses time resource allocation information to determine the location of the HARQ-ACK codebook for the SPS PDSCH within one slot when the SPS PDSCH transmission period is larger than one slot, and considers both the time resource allocation information and the SPS PDSCH transmission period when the SPS PDSCH transmission period is smaller than one slot.

When the SPS PDSCH transmission period is smaller than one slot, the SPS PDSCH may exist over the slot boundary according to a combination of the transmission period and the TDRA. Reference numeral 650 of FIG. 6 shows the corresponding example in which case the BS configures one SPS PDSCH beyond the slot boundary to be repeatedly transmitted while being divided into a PDSCH 652 and a PDSCH 654. At this time, the PDSCH 652 and the PDSCH 654 can always have the same length or different lengths. Further, only one piece of the HARQ-ACK information 656 for SPS PDSCHs including the PDSCH 652 and the PDSCH 654 is transmitted by the UE, and a slot which is the corresponding reference is based on slot k+1 repeatedly transmitted in the PDSCH 654.

Embodiment 6-1: Method of Mapping a Semi-Static HARQ-ACK Codebook for DCI Indicating DL SPS Release When the transmission period of the SPS PDSCH is smaller than one slot, the UE maps the HARQ-ACK codebook for the corresponding DCI by at least one of the following methods to transmit the HARQ-ACK information for the DCI requesting the corresponding SPS PDSCH release on the basis of the semi-static HARQ-ACK codebook.

Method 6-2-1: the location of the semi-static HARQ-ACK codebook for HARQ-ACK information for DCI indicating SPS PDSCH release is the same as the location of the HARQ-ACK codebook for the first located SPS PDSCH in terms of time resources among SPS PDSCHs received within one slot.

When the number of SPS PDSCHs of the slot for transmitting DCI indicating SPS PDSCH release is larger than or equal to 2, the UE maps HARQ-ACK information for the corresponding DCI to the location of the semi-static HARQ-ACK codebook for HARQ-ACK information of the temporally first SPS PDSCH and transmits the same.

For example, when the maximum number of PDSCHs which can be transmitted without simultaneous PDSCH reception is 4 including the SPS PDSCH in the slot for transmitting DCI indicating SPS PDSCH release, the size of the HARQ-ACK codebook for the corresponding slot is 4 and HARQ-ACK information for SPS PDSCH or PDSCH reception is mapped to each location of {1, 2, 3, 4}. When the corresponding AHRQ-ACK information is mapped to locations of {2} and {3} of two SPS PDSCHs, the HARQ-ACK information indicating DL SPS PDSCH release to the location of {2}.

Method 6-2-2: the location of the semi-static HARQ-ACK codebook for HARQ-ACK information for DCI indicating SPS PDSCH release is the same as the location of the HARQ-ACK codebook for the last located SPS PDSCH in terms of time resources among SPS PDSCHs received within one slot.

When the number of SPS PDSCHs of the slot for transmitting DCI indicating SPS PDSCH release is larger than or equal to 2, the UE maps HARQ-ACK information for the corresponding DCI to the location of the semi-static HARQ-ACK codebook for HARQ-ACK information of the temporally last SPS PDSCH and transmits the same.

For example, when the maximum number of PDSCHs which can be transmitted without simultaneous PDSCH reception is 4 including the SPS PDSCH in the slot for transmitting DCI indicating SPS PDSCH release, the size of the HARQ-ACK codebook for the corresponding slot is 4 and HARQ-ACK information for SPS PDSCH or PDSCH reception is mapped to each location of {1, 2, 3, 4}. When the corresponding AHRQ-ACK information is mapped to locations of {2} and {3} of two SPS PDSCHs, the HARQ-ACK information indicating DL SPS PDSCH release is mapped to the location of {3}.

Method 6-2-3: the location of the semi-static HARQ-ACK codebook for HARQ-ACK information for DCI indicating SPS PDSCH release is the same as locations of all HARQ-ACK codebooks for SPS PDSCHs received in one slot.

When the number of SPS PDSCHs of the slot for transmitting DCI indicating SPS PDSCH release is larger than or equal to 2, the UE repeatedly maps HARQ-ACK information for the corresponding DCI to the locations of the semi-static HARQ-ACK codebooks for HARQ-ACK information of all SPS PDSCHs and transmits the same.

For example, when the maximum number of PDSCHs which can be transmitted without simultaneous PDSCH reception is 4 including the SPS PDSCH in the slot for transmitting DCI indicating SPS PDSCH release, the size of the HARQ-ACK codebook for the corresponding slot is 4 and HARQ-ACK information for SPS PDSCH or PDSCH reception is mapped to each location of {1, 2, 3, 4}. When the corresponding AHRQ-ACK information is mapped to locations of {2} and {3} of two SPS PDSCHs, the HARQ-ACK information indicating DL SPS PDSCH release is repeatedly mapped to the locations of {2} and {3}. That is, the same HARQ-ACK information is mapped to the locations of {2} and {3}.

Method 6-2-4: as the location of the semi-static HARQ-ACK codebook for HARQ-ACK information for DCI indicating SPS PDSCH release, one of a plurality of locations of HARQ-ACK codebook candidates for SPS PDSCHs received in one slot is selected by the BS by a higher signal, an L1 signal, or a combination thereof.

When the number of SPS PDSCHs of the slot for transmitting DCI indicating SPS PDSCH release is two or more, the BS selects one of the locations of semi-static HARQ-ACK codebooks for HARQ-ACK information of SPS PDSCHs by a higher signal, an L1 signal, or a combination thereof, and the UE maps and transmits HARQ-ACK information for the corresponding DCI in the selected location.

For example, when the maximum number of PDSCHs which can be transmitted without simultaneous PDSCH reception is 4 including the SPS PDSCH in the slot for transmitting DCI indicating SPS PDSCH release, the size of the HARQ-ACK codebook for the corresponding slot is 4 and HARQ-ACK information for SPS PDSCH or PDSCH reception is mapped to each location of {1, 2, 3, 4}. In a situation in which corresponding HARQ-ACK information is mapped to locations of {2} and {3} of two SPS PDSCHs, the BS selects {2} by using DCI indicating DL SPS PDSCH release and the UE maps HARQ-ACK information indicating DL SPS PDSCH release to the location of {2} and transmits the same. A time resource allocation field, an HARQ process number, or a PDSCH-to-HARQ feedback timing indicator may be used for the DCI field for determining the location of the semi-static HARQ-ACK codebook. For example, the time resource allocation field within DCI indicating SPS PDSCH release may indicate time resource information of one of the SPS PDSCHs which can be transmitted in the corresponding slot, and the UE may transmit HARQ-ACK information of the corresponding DCI in the location of the semi-static HARQ-ACK codebook corresponding to the indicated SPS PDSCH.

Method 6-2-5: the location of the semi-static HARQ-ACK codebook for HARQ-ACK information for DCI indicting SPS PDACH release is indicated or configured by the BS through a higher signal, an L1 signal, or a combination thereof.

When the maximum number of SPS PDSCHs which can be received in the slot for transmitting DCI indicating SPS PDSCH release is two or more, the BS selects one of the locations of semi-static HARQ-ACK codebooks for HARQ-ACK information of the corresponding PDSCHs by a higher signal, an L1 signal, or a combination thereof, and the UE maps and transmits HARQ-ACK information for the corresponding DCI in the selected location.

A set of locations of semi-static HARQ-ACK codebooks which can be selected the BS through method 6-2-4 includes locations of semi-static HARQ-ACK codebooks to which HARQ-ACK information of the SPS PDSCH can be mapped, and a set of locations of semi-static HARQ-ACK codebooks which can be selected the BS through method 6-2-5 includes locations of semi-static HARQ-ACK codebooks to which HARQ-ACK information of all PDSCHs can be mapped.

For example, when the maximum number of PDSCHs which can be transmitted without simultaneous PDSCH reception is 4 including the SPS PDSCH in the slot for transmitting DCI indicating SPS PDSCH release, the size of the HARQ-ACK codebook for the corresponding slot is 4 and HARQ-ACK information for SPS PDSCH or PDSCH reception is mapped to each location of {1, 2, 3, 4}. The BS selects {1} by using DCI indicating DL SPS PDSCH release, and the UE maps HARQ-ACK information indicating DL SPS PDSCH release to the location of {1} and transmits the same. A time resource allocation field, an HARQ process number, or a PDSCH-to-HARQ feedback timing indicator may be used for the DCI field for determining the location of the semi-static HARQ-ACK codebook. For example, the time resource allocation field within DCI indicating SPS PDSCH release indicates time resource information of one of the PDSCHs which can be transmitted in the corresponding slot, and the UE transmits HARQ-ACK information of the corresponding DCI in the location of the semi-static HARQ-ACK codebook corresponding to the indicated SSP PDSCH.

The methods can be performed in a situation in which only one HARQ-ACK transmission is supported in one slot. When a higher configuration of code block group (CBG)- based transmission is performed through a DL SPS PDSCH, the UE may repeat HARQ-ACK information for DCI indicating DL SPS PDSCH release by the number of CBGs, map the HARQ-ACK information to semi-static HARQ-ACK codebook resources determined by at least one of the methods, and transmit the same. The method is described as a method of transmitting HARQ-ACK information for the DL SPS PDSCH indicating release of one SPS PDSCH transmission/reception, but can be sufficiently applied, without any change or correction, to a method of transmitting HARQ-ACK information for the DL SPS PDSCH simultaneously indicating two or more activated PDSCH transmissions/receptions in one cell/one BWP. For example, when one DL SPS PDSCH release signal is associated with a plurality of SPS PDSCHs activated in one cell/one BWP, SPS PDSCHs considered to select the location of the HARQ-ACK codebook may be SPS PDSCHs representatively belonging to one configuration or belonging to all configurations. At this time, when the SPS PDSCHs representatively belongs to one configuration, the representative configuration may be an SPS PDSCH configuration number having the lowest index or a first activated SPS PDSCH configuration. This is only an example, and other similar methods are sufficiently possible.

Embodiment 6-2: Method of Mapping a Dynamic HARQ-ACK Codebook for Multiple SPS PDSCHs Transmitted in One Slot In a dynamic HARQ-ACK codebook (or Type 2 HARQ-ACK codebook), the corresponding HARQ-ACK information is basically determined by total DAI and counter DAI included in DCI for scheduling the PDSCH. The total DAI informs the size of the HARQ-ACK codebook transmitted in slot n, and the counter DAI informs of the location of the HARQ-ACK codebook transmitted in slot n. The dynamic HARQ-ACK codebook is configured by [pseudo-code 3] in Rel-15 NR.

[pseudo-code 3 start]
If the UE transmits HARQ-ACK information in a PUCCH in slot n and for any PUCCH format, the UE determines the $\tilde{O}_0^{ACK}, \tilde{O}_1^{ACK}, ..., \tilde{O}_{O_{ACK}-1}^{ACK}$, for a total number of $O_{ACK}$ HARQ-ACK information bits, according to the following pseudo-code:
  Set m=0 - PDCCH with DCI format 1_0 or DCI format 1_1 monitoring occasion index: lower index corresponds to earlier PDCCH with DCI format 1_0 or DCI format 1_1 monitoring occasion
    Set j=0
    Set $V_{temp} = 0$
    Set $V_{temp2} = 0$
    Set $V_S = \emptyset$
    Set $N_{cells}^{DL}$ to the number of serving cells configured by higher layers for the UE
    Set M to the number of PDCCH monitoring occasion(s)
    while m<M
      Set c=0 - serving cell index: lower indexes correspond to lower RRC indexes of corresponding cell
      while $c < N_{cells}^{DL}$
        if PDCCH monitoring occasion m is before an active DL BWP change on serving cell c or an active UL BWP change on the PCell and an active DL BWP change is not triggered by a DCI format 1_1 in PDCCH monitoring occasion m
          c=c+1;
        else
          if there is a PDSCH on serving cell c associated with PDCCH in PDCCH monitoring occasion m, or there is a PDCCH indicating SPS PDSCH release on serving cell c
            if $V_{C-DAI,c,m}^{DL} \leq V_{temp}$
              j=j+1
            end if
            $V_{temp} = V_{C-DAI,c,m}^{DL}$
            if $V_{T-DAI,m}^{DL} = \emptyset$
              $V_{temp2} = V_{C-DAI,c,m}^{DL}$
            else
              $V_{temp2} = V_{T-DAI,m}^{DL}$
            end if
            if harq-ACK-SpatialBundlingPUCCH is not provided and m is a monitoring occasion for PDCCH with DCI format 1_0 or DCI format 1_1 and the UE is configured by maxNrofCodeWordsScheduledByDCI with reception of two transport blocks for at least one configured DL BWP of at least one serving cell,
              $\tilde{O}_{8j+2(V_{C-DAI,c,m}^{DL}-1)}^{ACK}$ = HARQ-ACK information bit corresponding to the first transport block of this cell
              $\tilde{O}_{8j+2(V_{C-DAI,c,m}^{DL}-1)+1}^{ACK}$ = HARQ-ACK information bit corresponding to the second transport block of this cell
              $V_s = V_s \cup \{8j + 2(V_{C-DAI,c,m}^{DL} - 1), 8j + 2(V_{C-DAI,c,m}^{DL} - 1) + 1\}$
            elseif harq-ACK-SpatialBundlingPUCCH is provided to the UE and m is a monitoring occasion for PDCCH with DCI format 1_1 and the UE is configured by maxNrofCodeWordsScheduledByDCI with reception of two transport blocks in at least one configured DL BWP of a serving cell,
              $\tilde{O}_{4j+V_{C-DAI,c,m}^{DL}-1}^{ACK}$ = binary AND operation of the HARQ-ACK information bits corresponding to the first and second transport blocks of this cell
              $V_s = V_s \cup \{4j + V_{C-DAI,c,m}^{DL} - 1\}$
            else
              $\tilde{O}_{4j+V_{C-DAI,c,m}^{DL}-1}^{ACK}$ = HARQ-ACK information bit of this cell
              $V_s = V_s \cup \{4j + V_{C-DAI,c,m}^{DL} - 1\}$

```
            end if
        end if
        c=c+1
    end if
            end while
            m=m+1
    end while
    if V_{temp2} < V_{temp}
        j=j+1
    end if
    if harq-ACK-SpatialBundlingPUCCH is not provided to the UE and the
UE is configured by maxNrofCodeWordsScheduledByDCI with reception of two transport blocks
for at least one configured DL BWP of a serving cell,
            O^{ACK} = 2 · (4 · j + V_{temp2})
    else
            O^{ACK} = 4 · j + V_{temp2}
    end if
    Õ_I^{ACK} =NACK for any i ∈ {0,1, ..., O^{ACK} − 1}\V_s
    Set c=0
    while c < N_{cells}^{DL}
        if SPS PDSCH reception is activated for a
UE and the UE is configured to receive SPS PDSCH in a slot n − K_{1,c} for serving cell c, where
K_{1,c} is the PDSCH-to-HARQ-feedback timing value for SPS PDSCH on serving cell c
            O^{ACK} = O^{ACK} + 1
            O_{O^{ACK}_{-1}}^{ACK} = HARQ-ACK information bit associated with
the SPS PDSCH reception
        end if
        c=c+1;
    end while
[pseudo-code 3 end]
```

[pseudo-code 3] is applied to the case in which the transmission period of the SPS PDSCH is larger than one slot, and when the transmission period of the DSPS PDSCH is smaller than one slot, the dynamic HARQ-ACK codebook is determined by [pseudo-code 4]. Alternatively, [pseudo-code 4] may be generally applied regardless of the SPS PDSCH transmission period or the number of SPS PDSCHs activated in one cell/one BWP.

```
[pseudo-code 4 start]
    If the UE transmits HARQ-ACK information in a PUCCH in slot n and for
any PUCCH format, the UE determines the Õ_0^{ACK}, Õ_1^{ACK}, ..., Õ_{O_{ACK}−1}^{ACK}, for a total number of O_{ACK}
HARQ-ACK information bits, according to the following pseudo-code:
    Set m=0 - PDCCH with DCI format 1_0 or DCI format 1_1 monitoring
occasion index: lower index corresponds to earlier PDCCH with DCI format 1_0 or DCI format
1_1 monitoring occasion
        Set j=0
        Set V_{temp} = 0
        Set V_{temp2} = 0
        Set V_S = Ø
        Set N_{cells}^{DL} to the number of serving cells configured by higher layers
for the UE
        Set M to the number of PDCCH monitoring occasion(s)
        while m<M
            Set c=0 - serving cell index: lower indexes
correspond to lower RRC indexes of corresponding cell
            while c < N_{cells}^{DL}
                if PDCCH monitoring occasion m is before an active DL BWP
change on serving cell c or an active UL BWP change on the PCell and an active DL BWP change
is not triggered by a DCI format 1_1 in PDCCH monitoring occasion m
                    c=c+1;
                else
                    if there is a PDSCH on serving cell c associated with
PDCCH in PDCCH monitoring occasion m, or there is a PDCCH indicating SPS PDSCH release
on serving cell c
                        if V_{C-DAI,c,m}^{DL} ≤ V_{temp}
                            j=j+1
                        end if
                        V_{temp} = V_{C-DAI,c,m}^{DL}
                        if V_{T-DAI,m}^{DL} = Ø
                            V_{temp2} = V_{C-DAI,c,m}^{DL}
                        else
                            V_{temp2} = V_{T-DAI,m}^{DL}
                        end if
                        if harq-ACK-SpatialBundlingPUCCH is not
``` provided and m is a monitoring occasion for PDCCH with DCI format 1_0 or DCI format 1_1 and
the UE is configured by maxNrofCodeWordsScheduledByDCI with reception of two transport
blocks for at least one configured DL BWP of at least one serving cell,
$$\tilde{O}_{8j+2(V_{C-DAI,c,m}^{DL}-1)} = \text{HARQ-ACK}$$
information bit corresponding to the first transport block of this cell
$$\tilde{O}_{8j+2(V_{C-DAI,c,m}^{DL}-1)+1}^{ACK} = \text{HARQ-ACK}$$
information bit corresponding to the second transport block of this cell
$$V_s = V_s \cup \{8j + 2(V_{C-DAI,c,m}^{DL} - 1), 8j + 2(V_{C-DAI,c,m}^{DL} - 1) + 1\}$$
    elseif harq-ACK-SpatialBundlingPUCCH is
provided to the UE and m is a monitoring occasion for PDCCH with DCI format 1_1 and the UE
is configured by maxNrofCodeWordsScheduledByDCI with reception of two transport blocks in
at least one configured DL BWP of a serving cell,
$$\tilde{O}_{4j+V_{C-DAI,c,m}^{DL}-1}^{ACK} = \text{binary AND operation}$$
of the HARQ-ACK information bits corresponding to the first and second transport blocks of this
cell
$$V_s = V_s \cup \{4j + V_{C-DAI,c,m}^{DL} - 1\}$$
    else
$$\tilde{O}_{4j+V_{C-DAI,c,m}^{DL}-1}^{ACK} = \text{HARQ-ACK}$$
information bit of this cell
$$V_s = V_s \cup \{4j + V_{C-DAI,c,m}^{DL} - 1\}$$
        end if
      end if
      c=c+1
    end if
      end while
      m=m+1
    end while
    if $V_{temp2} < V_{temp}$
      j=j+1
    end if
    if harq-ACK-SpatialBundlingPUCCH is not provided to the UE and the
UE is configured by maxNrofCodeWordsScheduledByDCI with reception of two transport blocks
for at least one configured DL BWP of a serving cell,
$$O^{ACK} = 2 \cdot (4 \cdot j + V_{temp2})$$
    else
$$O^{ACK} = 4 \cdot j + V_{temp2}$$
    end if
    $\tilde{O}_i^{ACK}$ =NACK for any i ∈ \{0,1, ..., $O^{ACK}$ − 1\}\\$V_S$
    Set c=0
    while c < $N_{cells}^{DL}$
      if SPS PDSCH reception is activated for a UE and the
UE is configured to receive multiple SPS PDSCHs in a slot n = $K_{1,c}$ for serving cell c, where
$K_{1,c}$ is the PDSCH-to-HARQ-feedback timing value for SPS PDSCH on serving cell c
        $O^{ACK} = O^{ACK} + k$ where k is the number of multiple SPS
PDSCHs in a slot n-K1,c
        $O_{O^{ACK}-1}^{ACK}$ = HARQ-ACK information bit associated with the SPS
PDSCH reception
      end if
      c=c+1;
    end while
[pseudo-code 4 end]

In [pseudo-code 4], a value of k which is the number of SPS PDSCHs in one slot may correspond to only one SPS PDSCH configuration or may include all SPS PDSCH configurations when a plurality of SPS PDSCH configurations are possible in one cell/one BWP.

[pseudo-code 3] or [pseudo-code 4] may be applied to a situation in which HARQ-ACK information transmission is limited to a maximum of one transmission per slot.

Embodiment 6-3: Method of Separately Transmitting HARQ-ACKs for Multiple SPS PDSCHs Transmitted in One Slot When the UE receives a configuration of a DL SPS transmission period smaller than one slot and transmission of only one HARQ-ACK per slot from the BS by a higher signal, the UE transmits HARQ-ACK information for the DL SPS PDSCH 632 and the DL SPS PDSCH 634 received in slot k through a PUCCH of slot k+i indicated in advance by a higher signal, an L1 signal, or a combination thereof as indicated by reference numeral 630 of FIG. 6. For example, the UE determines granularity for the PDSCH-to-HARQ-ACK timing indicator within the DCI format indicating DL SPS activation as a slot level, and the BS provides the UE with a difference value between a slot index for receiving the DL SPS PDSCH and a slot index for transmitting HARQ-ACK information and configures a PUCCH resource for transmitting the HARQ-ACK information in a slot indicated by L1 in the UE through a higher signal. Reference numeral 630 of FIG. 6 shows a situation in which PDSCH-to-HARQ-ACK timing indicates a value of i. The corresponding value can be directly selected by an L1 signal, or candidate values are configured by a higher signal and one thereof can be selected by an L1 signal.

When the UE or the BS desires to separately transmit and receive HARQ-ACK information for individually transmitted and received DL SPS PDSCHs, the BS may configure a DL SPS transmission period smaller than one slot and two or more HARQ-ACK transmissions per slot by a higher signal. For example, as indicated by reference numeral 660 of FIG. 6, HARQ-ACK information for the SPS PDSCH 662 received in slot k may be transmitted through the PUCCH 666 in slot k+i, and HARQ-ACK information for the SPS PDSCH 664 may be transmitted through the PUCCH 668 in slot k+i. In order to make it possible, for example, the UE determines granularity for the PDSCH-to-HARQ-ACK timing indicator within the DCI format indicating DL SPS activation as the symbol level, and the corresponding value means a total symbol length from a transmission end symbol (or a transmission start symbol) of the SPS PDSCH to a transmission start symbol (or transmission end symbol) of the PUCCH transmitting the corresponding HARQ-ACK information. In reference numeral 660 of FIG. 6, when the end symbol of the SPS PDSCH 662 is s0 and the start symbol of the PUCCH 666 for transmitting HARQ-ACK information for the SPS PDSCH 662 is s1, a value indicated by the PDSCH-to-HARQ-ACK timing indicator is "s1-s0", and the value can be directly selected by an L1 signal or candidate values are configured by a higher signal and then one thereof can be determined by an L1 signal. Through the information, the UE may determine the start symbol of the PUCCH to transmit HARQ-ACK information for the SPS PDSCH. Other PUCCH transmission information may be determined by a higher signal, an L1 signal, or a combination thereof. When a PUCCH resource indicator in an L1 or higher signal of Rel-15 is used, the UE may determine that a "starting symbol index" field of the value indicated by the corresponding indicator is not used. Alternatively, since the starting symbol for transmitting HARQ-ACK information has been already provided through the PDSCH-to-HARQ-ACK timing indicator, a signal including a new higher signal, a new L1 signal, or a combination thereof having no corresponding field may be provided to the UE. In summary, the UE may differently interpret the PDSCH-to-HARQ-ACK timing indicator field included in DCI indicating SPS PDSCH activation depending on the SPS PDSCH transmission period.

Method 6-3-1: makes a determination by a slot level
For example, when the SPS PDSCH transmission period is larger than one slot, the UE determines granularity of the PDSCH-to-HARQ-ACK timing indicator as the slot level.

Method 6-3-2: makes a determination by a symbol level
For example, when the SPS PDSCH transmission period is smaller than one slot, the UE determines granularity of the PDSCH-to-HARQ-ACK timing indicator as the symbol level.

Embodiment 6-4: Method of Changing a DL SPS/CG Period for Aperiodic Traffic

The DL SPS transmission period supported by the BS is in units of slot levels or symbol levels. When information sensitive to a delay time of equipment operating in a factor is periodically generated and the corresponding period is not a value or a multiple of the value in the standard supported by a 3GPP standard organization, the BS cannot configure an effective DL SPS transmission period. For example, when there is a traffic pattern having 2.5 symbol intervals, the BS cannot allocate only the DL SPS having a transmission period of 2 symbols or 3 symbols. Accordingly, it is required to configure an aperiodic DL SPS transmission period or introduce a signal for dynamically changing a transmission period. The UE can dynamically change the transmission period through at least one of the following methods.

Method 6-4-1: method of allocating an aperiodic DL SPS transmission period

The BS can configure the DL SPS transmission period in a bitmap type. For example, when the case in which bitmap information including 10 bits exists in a higher signal and is 1 means DL SPS transmission and the case in which the bitmap information is 0 means non-transmission of DL SPS, if a bit unit refers to a slot unit, a DL SPS transmission period in various patterns can be made though it is not a period for 10 slots. Further, the corresponding pattern may be repeated in units of 10 slots. Alternatively, an interval indicated by the bitmap size and the corresponding bit may be a slot, a symbol, or a symbol group. A range of the transmission interval in which the corresponding information can be independently configured by a higher signal or which can be indicated by each bit according to the bitmap size may vary. For example, a time range indicated by each bit may be a 7-symbol unit when the bitmap size is 20, and may be a slot unit when the bitmap size is 10.

Alternatively, the BS can configure in advance two or more DL SPS transmission periods by a higher signal and configure time difference of successively transmitted DL SPSs in the form of a pattern. For example, it is possible to determine a DL SPS transmission period having 2-symbol intervals or 3-symbol intervals for the 2.5-symbol traffic pattern. [Table 8] below is a table related to the aperiodic DL SPS transmission period configuration. Z is decimal having a first decimal place and has the relation of X<Z<X+1. For example, when Z is 3.2, X is 3. Gap 1 means a symbol interval between a first SPS PDSCH resource received by the UE and a second SPS PDSCH resource after DCI indicating SPS activation is received. Gap 2 means a symbol interval between the second SPS PDSCH resource and a third SPS PDSCH resource. That is, Gap i means a symbol interval between an ith SPS PDSCH resource and an (i+1)th SPS PDSCH resource. A configuration is a parameter for selecting one of various patterns, and [Table 8] shows a configuration having a total of 9 patterns. The corresponding parameter is provided to the UE by a higher signal or an L1 signal, and the UE may detect a DL SPS PDSCH transmission period pattern by a value indicated by the corresponding parameter. In another example, one value of the configurations can be implicitly determined according to a traffic generation period value. For example, when the BS and the UE transmits and receives the corresponding information in the 2.3-symbol traffic pattern by a higher signal, the BS and the UE may determine that configuration 3 is applied.

TABLE 8

| Configuration | 1 | 2 | 3 | 4 | 5 | 6 | 7 | 8 | 9 |
|---|---|---|---|---|---|---|---|---|---|
| Gap 1 | X + 1 | X + 1 | X + 1 | X + 1 | X + 1 | X + 1 | X + 1 | X + 1 | X + 1 |
| Gap 2 | X | X | X | X | X | X + 1 | X + 1 | X + 1 | X + 1 |
| Gap 3 | X | X | X | X + 1 | X + 1 | X | X + 1 | X + 1 | X + 1 |
| Gap 4 | X | X | X + 1 | X | X | X + 1 | X | X + 1 | X + 1 |
| Gap 5 | X | X | X | X | X + 1 | X | X + 1 | X | X + 1 |

TABLE 8-continued

| Configuration | 1 | 2 | 3 | 4 | 5 | 6 | 7 | 8 | 9 |
|---|---|---|---|---|---|---|---|---|---|
| Gap 6 | X | X + 1 | X | X + 1 | X | X + 1 | X + 1 | X + 1 | X + 1 |
| Gap 7 | X | X | X + 1 | X | X + 1 | X + 1 | X | X + 1 | X + 1 |
| Gap 8 | X | X | X | X + 1 | X | X | X + 1 | X + 1 | X + 1 |
| Gap 9 | X | X | X | X | X + 1 | X + 1 | X + 1 | X + 1 | X + 1 |
| Gap 10 | X | X | X | X | X | X | X | X | X |

Method 6-4-2: method of changing a dynamic DL SPS transmission period

Method 6-4-2-1: includes transmission period information in DCI indicating DL SPS activation A DL SPS transmission period value is included in information within the DCI. For the corresponding transmission period value, a set of candidate values are configured by a higher signal and a specific value is selected from the corresponding set by DCI. For example, 1 bit of a transmission period field is generated within DCI having the transmission period configured as {1 slot, 2 slots} by a higher signal, and the 1 bit informs whether the transmission period is 1 slot or 2 slots. That is, the number of DCI bits is determined according to a set of transmission periods configured by a higher signal, and when the number of sets is N, a total of ceil(log 2(N)) bits are configured within the DCI. The corresponding DCI corresponds to non-fallback DCI such as DCI format 1_1, and fixed bit values and period values associated for the respective corresponding bit values may be always applied when there is no corresponding fallback DCI field such as DCI format 1_0 or even though the field exists.

Method 6-4-2-2: uses the existing field within the DCI format indicating DL SPS activation 1

When one field within the DCI format indicating DL SPS activation indicates a specific value, a value of another field may be used to indicate the transmission period rather than indicating the originally indicated value. For example, when all bit values in a field indicating an HARQ process number indicate "1", a field indicating time resource information may be used to indicate one DL SPS transmission period in a set of DL SPS transmission periods configured in advance by a higher signal.

Method 6-4-2-3: uses the existing field within the DCI format indicating DL SPS activation 2

In the case of a DCI format indicating DL SPS activation, a specific field itself in the corresponding DCI format is a field always indicating the transmission period or a specific value in the specific field within the corresponding DCI can indicate the transmission period. For example, when the time resource allocation field of the DCI format is verified as a format indicating SPS PDSCH activation, it is determined that the corresponding time resource allocation field is used to indicate an SPS PDSCH transmission period rather than conventionally indicating the start symbol and the length of the SPS PDSCH.

Method 6-4-2-4: implicitly configures transmission period information based on a search space A transmission period is dynamically changed according to a search space for transmitting DCI indicating DL SPS activation. For example, the UE may implicitly determine that DCI indicating DL SPS activation transmitted in a common search space has transmission period A and DCI indicating DL SPS activation transmitted in a UE-specific search space has transmission period B. Transmission period A and transmission period B may be configured in advance by the UE through a higher signal.

Method 6-4-2-5: implicitly configures transmission period information based on a DCI format A transmission period value is dynamically changed according to a DCI format indicating DL SPS activation. For example, the UE may implicitly determine that DCI indicating DL SPS activation transmitted in DCI format 1_0 corresponding to fallback DCI has transmission period A and DCI indicating DL SPS activation transmitted in DCI format 1_1 corresponding to non-fallback DCI has transmission period B. Transmission period A and transmission period B may be configured in advance by the UE through a higher signal.

In the disclosure, the UE does not expect reception of a configuration or an indication of DL SPS PDSCH time resource information out of the DL SPS transmission period and, when the corresponding configuration or indication is transmitted, considers the configuration or indication as an error and ignores the same.

Figure 7:
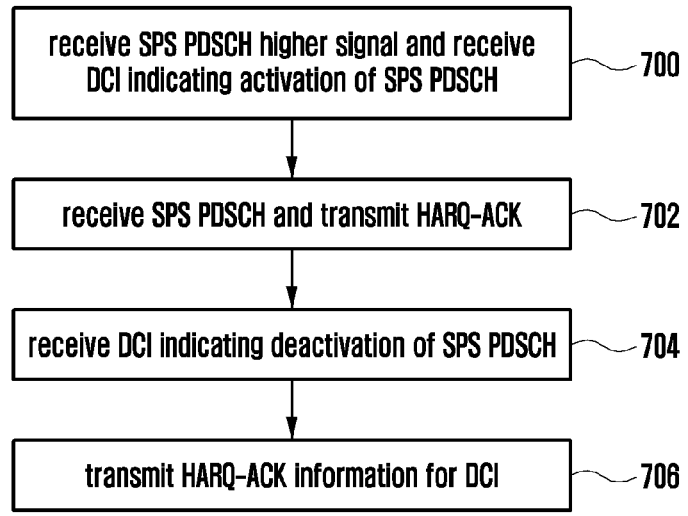
FIG. 7 is a block diagram illustrating a process in which the UE transmits semi-static HARQ-ACK codebook-based HARQ-ACK information for downlink control information (DCI) indicating SPS physical downlink shared channel (PDSCH) deactivation.

FIG. 7 is a block diagram illustrating a process in which the UE transmits semi-static HARQ-ACK codebook-based HARQ-ACK information for DCI indicating SPS PDSCH deactivation.

The UE receives SPS PDSCH configuration information by a higher signal. At this time, information configured by the higher signal may include a transmission period, an MCS table, HARQ-ACK configuration information, and the like. After receiving the higher signal, the UE receives DCI for activating the SPS PDSCH from the BS in operation 700. After receiving the DCI indicating activation, the UE periodically receives the SPS PDSCH and transmits HARQ-ACK information corresponding thereto in operation 702. Thereafter, when there is no downlink data to be periodically transmitted and received any more, the BS transmits DCI indicating SPS PDSCH deactivation to the UE and the UE receives the same in operation 704. The UE transmits HARQ-ACK information for the DCI indicating SPS PDSCH deactivation according to an SPS PDSCH transmission period in operation 706. For example, when the transmission period is larger than one slot, the UE inserts HARQ-ACK information for DCI indicating SPS PDSCH deactivation into the HARQ-ACK codebook location for HARQ-ACK information corresponding to the SPS PDSCH and transmits the same. The HARQ-ACK information can be transmitted by at least one of method 6-1-1 or method 6-1-2 described in FIG. 6. When the transmission period is smaller than one slot, the UE may transmit HARQ-ACK information for DCI indicating SPS PDSCH deactivation by at least one of method 6-2-1 to method 6-2-5. The description made with reference to FIG. 7 corresponds to an operation applied to the case in which the UE receives a configuration a semi-static HARQ-ACK codebook in advance from the BS by a higher signal. Further, the description made with reference to FIG. 7 can be applied to only the case in which the UE receives a configuration in advance such that only one HARQ-ACK is transmitted per slot by a higher signal, standard, or UE capability.

Figure 8:
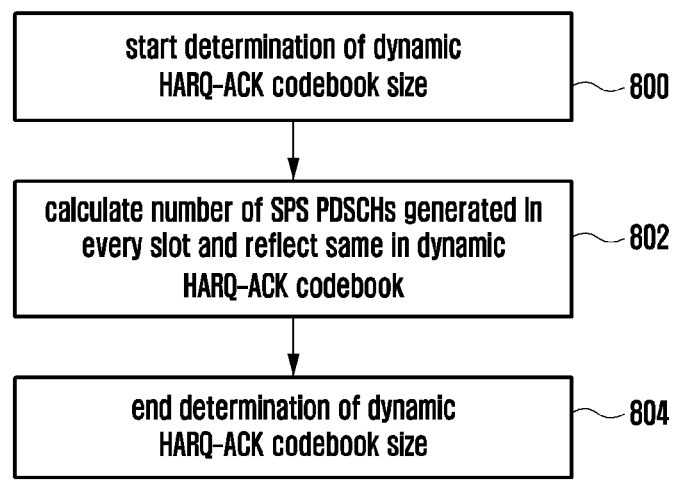
FIG. 8 is a block diagram illustrating a method by which the UE determines a dynamic HARQ-ACK codebook for SPS PDSCH reception.

FIG. 8 is a block diagram illustrating a method by which the UE determines a dynamic HARQ-ACK codebook for SPS PDSCH reception.

When the UE receives a configuration in advance to operate on the basis of the dynamic HARQ-ACK codebook by a higher signal, the UE starts determining the size of the HARQ-ACK codebook for HARQ-ACK information to be transmitted in a specific slot in operation 800. The UE not only determines the size of the HARQ-ACK codebook for the dynamically scheduled PDSCH but also calculates a total number of SPS PDSCHs generated in the slot corresponding to the slot to transmit HARQ-ACK information, and reflects the same in the size of the HARQ-ACK codebook in operation 802. The UE can configure the dynamic HARQ-ACK codebook by at least one of [pseudo-code 3] or [pseudo-code 4] described with reference to FIG. 6. Thereafter, the UE ends determining of the size of the HARQ-ACK codebook in operation 804 and transmits the HARQ-ACK information in the corresponding slot. Further, the description made with reference to FIG. 8 can be applied to only the case in which the UE receives a configuration in advance such that only one HARQ-ACK is transmitted per slot by a higher signal, standard, or UE capability. For reference, when one SPS PDSCH is repeatedly transmitted over the slot boundary as indicated by reference numeral 650 of FIG. 6, the UE determines the size of the HARQ-ACK codebook on the basis of a slot in which the SPS PDSCH is lately repeatedly transmitted to determine the dynamic HARQ-ACK codebook. Specifically, in the case of slot k, the SPS PDSCH 652 is transmitted as indicated by reference numeral 650 of FIG. 6, but the UE determines the size of the dynamic HARQ-ACK codebook for the SPS PDSCH 654 transmitted in slot k+1 instead of not calculating the number of effective SPS PDSCHs to determine the size of the dynamic HARQ-ACK codebook. Further, in the determination of the size of the dynamic HARQ-ACK codebook in a specific slot in [pseudo-code 4], when the number (k) of SPS PDSCHs per slot is determined, the number of effective SPS PDSCHs is calculated in a slot (or end slot) to which the end symbol of the last SPS PDSCH belongs among repeatedly transmitted SPS PDSCHs.

Figure 9:
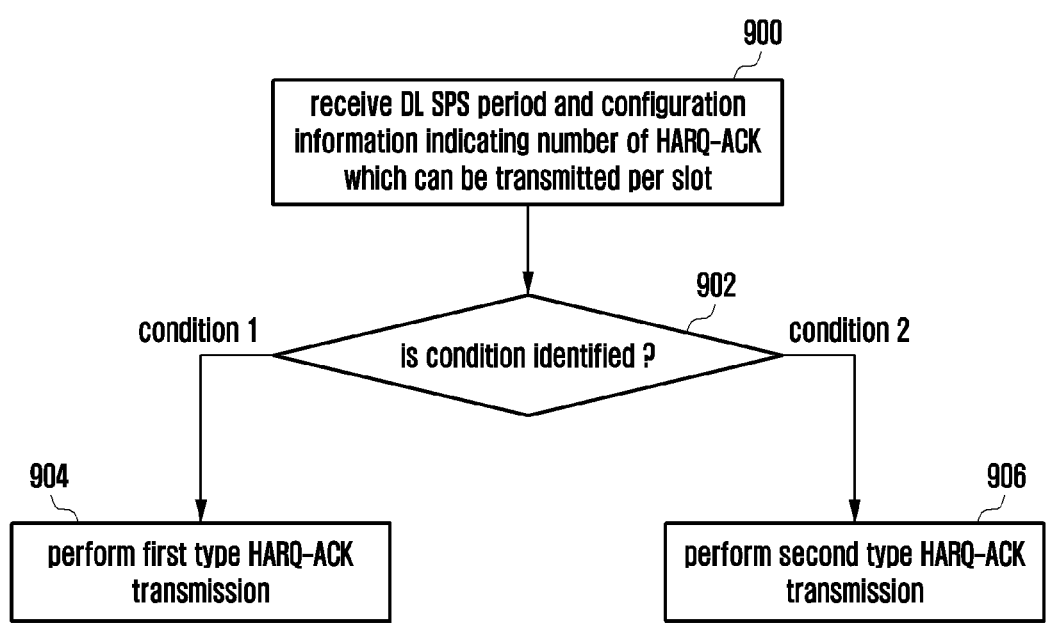
FIG. 9 is a block diagram illustrating a method by which the UE transmits HARQ-ACK information according to a DL SPS transmission period.

FIG. 9 is a block diagram illustrating a method by which the UE transmits HARQ-ACK information according to a DL SPS transmission period.

The UE receives a DL SPS transmission period or a maximum number of pieces of configuration information for AHRQ-ACK information transmission per slot provided by a higher signal or an L1 signal in operation 900. Further, the UE identifies the DL SPS transmission period and an HARQ-ACK information transmission condition per slot in operation 902. When condition 1 is satisfied, the UE transmits first type HARQ-ACK information in operation 904. When condition 2 is satisfied, the UE transmits second type HARQ-ACK information in operation 906. Condition 1 may be at least one of the following conditions.

The transmission period of the DL SPS PDSCH is larger than one slot

A maximum of one HARQ-ACK transmission is possible per slot

Condition 2 may be at least one of the following conditions.

The transmission period of the DL SPS PDSCH is smaller than one slot

Two or more HARQ-ACK transmissions are possible per slot

The first type HARQ-ACK information transmission includes the following fields within a DCI format indicating activation of the DL SPS PDSCH.

PDSCH to HARQ-ACK feedback timing indicator: indicates a slot-unit interval between a slot for transmitting the PDSCH and a slot for transmitting HARQ-ACK information. When one SPS PDSCH is repeatedly transmitted over the slot boundary as indicated by reference numeral 650 of FIG. 6, a reference of the slot for transmitting the PDSCH is a slot of the SPS PDSCH which is lastly repeatedly transmitted.

PUCCH resource indicator: the number of symbols, a start symbol, a PRB index, a PUCCH format, and the like Through the information, the UE may configure a PUCCH transmission resource and a transmission format for transmission of HARQ-ACK information for the DL SPS PDSCH. Further, the two field values may have a set of values which can be configured in advance by a higher signal, and one thereof is selected by DCI.

The second type HARQ-ACK information transmission includes the following fields within a DCI format indicating activation of the DL SPS PDSCH.

PDSCH to HARQ-ACK feedback timing indicator: indicates a symbol-unit interval between an end symbol of the PDSCH and a start symbol for transmitting HARQ-ACK information.

PUCCH resource indicator: the number of symbols, a PRB index, a PUCCH format, and the like Through the information, the UE may configure a PUCCH transmission resource and a transmission format for transmission of HARQ-ACK information for the DL SPS PDSCH. Further, the two field values may have a set of values which can be configured in advance by a higher signal, and one thereof is selected by DCI.

Figure 10:
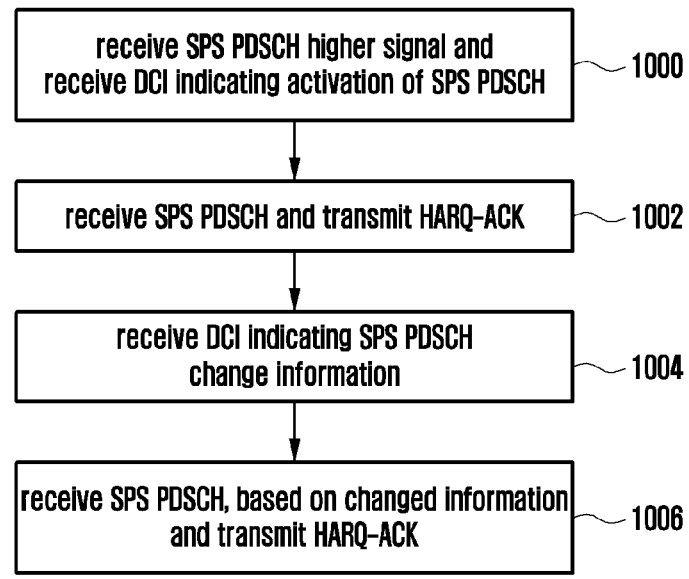
FIG. 10 is a block diagram illustrating a UE operation for dynamically changing a DL SPS transmission period.

FIG. 10 is a block diagram illustrating a UE operation for dynamically changing a DL SPS transmission period.

The UE receives SPS PDSCH higher information including a transmission period, an MAC table, and HARQ-ACK information. Thereafter, the UE receives DCI indicating activation of the SPS PDSCH in operation 1000. The UE receives the SPS PDSCH in a resource area determined by a higher signal and an L1 signal and transmits HARQ-ACK information corresponding thereto in operation 1002. The UE receives DCI indicating SPS PDSCH change information in operation 1004. The change information may include an SPS PDSCH transmission period value as well as an MCS value or the frequency and time resource area size. For reference, available methods for changing the SPS PDSCH transmission period may include at least one of method 6-4-1 to method 6-4-2 described with reference to FIG. 6. After receiving the DCI, the UE receives the SPS PDSCH through the changed information and transmits HARQ-ACK information corresponding thereto in operation 1006. When the SPS PDSCH transmission period is changed by the higher signal or the L1 signal, if an SPS PDSCH beyond a slot boundary which can be generated according to the transmission period and the time resource area in which the SPS PDSCH is transmitted and received is generated, the UE may transmit and receive the corresponding SPS PDSCH by at least one of the following methods.

Method 10-1: not transmit and receive the corresponding SPS PDSCH

For example, when the SPS PDSCH is allocated over slot k and slot k+1 as indicated by reference numeral 650 of FIG. 6, the UE considers that the allocated SPS PDSCH is incorrectly configured and does not receive the same, and also does not transmit HARQ-ACK information corresponding thereto.

Method 10-2: separately and repeatedly transmits and receives the corresponding SPS PDSCH on the basis of the slot boundary For example, when the SPS PDSCH is allocated over slot k and slot k+1 as indicated by reference numeral 650 of FIG. 6, the UE determines that the SPS PDSCH is divided into an SPS PDSCH 652 and an SPS PDSCH 654 and repeatedly received. Further, the UE transmits only one piece of HARQ-ACK information therefor on the basis of the last SPS PDSCH 654.

Method 10-3: transmits and receives the corresponding part of the SPS PDSCH only in a slot before the slot boundary For example, when the SPS PDSCH is allocated over slot k and slot k+1 as indicated by reference numeral 650 of FIG. 6, the UE determines that an effective SPS PDSCH is allocated and receives the SPS PDSCH only for the SPS PDSCH 652. That is, the UE does not transmit and receive the SPS PDSCH 654. Further, the UE transmits only one piece of HARQ-ACK information on the basis of the SPS PDSCH 652.

Method 10-4: transmits and receives the corresponding part of the SPS PDSCH only in a slot beyond the slot boundary For example, when the SPS PDSCH is allocated over slot k and slot k+1 as indicated by reference numeral 650 of FIG. 6, the UE determines that an effective SPS PDSCH is allocated and receives the SPS PDSCH only for the SPS PDSCH 654. That is, the UE does not transmit and receive the SPS PDSCH 652. Further, the UE transmits only one piece of HARQ-ACK information on the basis of the SPS PDSCH 654.

Figure 11:
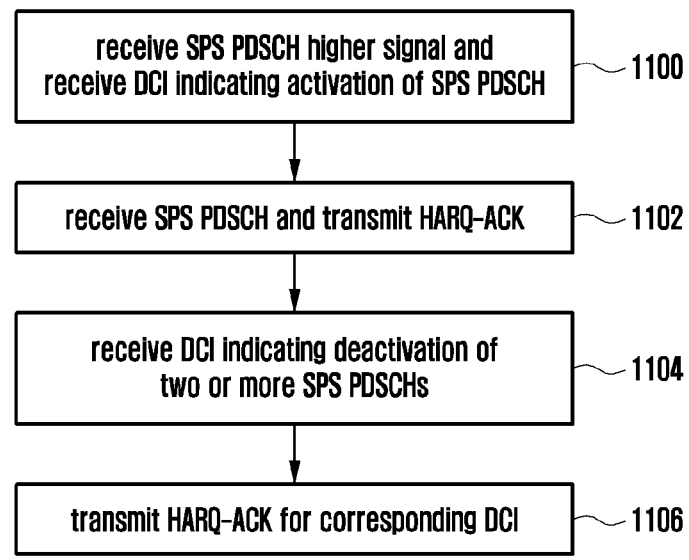
FIG. 11 illustrates a method by which the UE transmits HARQ-ACK information for SPS release in a situation in which two or more DL SPSs are activated.

FIG. 11 illustrates an operation of the UE showing an HARQ-ACK information transmission method for SPS release in a situation in which two or more DL SPSs are activated.

When the UE can operate two or more activated DL SPSs in one cell/one BWP, the BS may configure two or more DL SPSs in one UE. The reason why two or more DL SPS configurations are supported is that, when the UE supports various traffics, the respective traffics may have different MCSs or time/frequency resource allocations or periods, and thus it is advantageous to configure the DL SPS suitable for each purpose.

The UE receives the following higher signal configuration information for the DL SPS.

Periodicity: DL SPS transmission period nrofHARQ-Processes: the number of HARQ processes configured for the DL SPS n1PUCCH-AN: HARQ resource configuration information for DL SPS mcs-Table: MCS table configuration information applied to DL SPS SPS index: index of SPS configured in one cell/one BWP In the higher signal configuration information, the SPS index may be used to inform which SPS is indicated by DCI (L1 signaling) providing activation or deactivation of SPS. Specifically, in a situation in which two SPS are configured by a higher signal in one cell/one BWP, the UE needs index information informing which SPS activation is indicated by the DCI indicating SPS activation among the two SPSs in the index information. For example, an HARQ process number field within the DCI indicating SPS activation or deactivation may indicate a specific SPS index, and activation or deactivation is possible therethrough. Specifically, when DCI including CRC scrambled by a CG-RNTI includes the following information a shown in [Table 9] and a new data indicator (NDI) field of the corresponding DCI indicates 0, the UE determines that pre-activated specific SPS PDSCH release (deactivation) is indicated.

TABLE 9

|  | DCI format 0_0 | DCI format 1_0 |
|---|---|---|
| HARQ process number | SPS index | SPS index |
| Redundancy version | set to '00' | set to '00' |
| Modulation and coding scheme | set to all '1's | set to all '1's |
| Frequency domain resource assignment | set to all '1's | set to all '1's |

In [Table 9] above, one HARQ process number can indicate one SPS index or a plurality of SPS indexes. One or a plurality of SPS index(s) can be indicated by another DCI fields (a time resource field, a frequency resource field, an MCS, an RV, a PDSCH-to-HARQ timing field) as well as the HARQ process number field. Fundamentally, one SPS may be activated or deactivated by one DCI. The location of the type 1 HARQ-ACK codebook for HARQ-ACK information for DCI indicating SPS PDSCH release is the same as the location of the type 1 HARQ-ACK codebook corresponding to the reception location of the corresponding SPS PDSCH. When the location of the HARQ-ACK codebook corresponding to candidate SPS PDSCH reception within the slot is k1, the location of the HARQ-ACK codebook for DCI indicating release of the corresponding SPS PDSCH is also k1. Accordingly, when the DCI indicating SPS PDSCH release is transmitted in slot k, the UE does not expect receiving scheduling of the PDSCH corresponding to the HARQ-ACK codebook location k1 in slot k and, when such a situation occurs, considers the situation as an error case.

In [Table 9], DCI formats 0_0 and 1_0 are described as examples, but [Table 9] can be applied to DCI formats 0_1 and 1_1 and expanded to and sufficiently applied to DCI formats 0_x and 1_x. The UE receives the SPS PDSH higher signal and DCI indicating activation of the SPS PDSCH by the described operation, thereby simultaneously operating one or more SPS PDSCHs in one cell/one BWP in operation 1100. Thereafter, the UE periodically receives the activated SPS PDSCH within one cell/one BWP and transmits HARQ-ACK information corresponding thereto in operation 1102. HARQ-ACK information corresponding to the SPS PDSCH is determined by the UE through accurate time and frequency information within the corresponding slot and PUCCH format information on the basis of slot interval information by PDSCH-to-HARQ-ACK timing included in activated DCI information and n1PUCCH-AN information included in SPS higher configuration information. When there is no PDSCH-to-HARQ-ACK timing field included in DCI information, the UE assumes that one value configured in advance by a higher signal is a default value and determines that the corresponding value is applied.

In a situation in which the type 1 HARQ-ACK codebook is configured, when the UE receives DCI indicating deactivation of one SPS PDSCH in operation 1104, the UE inserts the location of the HARQ-ACK codebook for HARQ-ACK information for the corresponding DCI into the location of the HARQ-ACK codebook corresponding to the corresponding SPS PDSCH reception and transmits the HARQ-ACK information. When deactivation of two or more SPS PDSCHs are indicated by one DCI, the UE determines the HARQ-ACK codebook location into which the HARQ-ACK information for the corresponding DCI is inserted to be transmitted, which may be a problem. In order to solve the problem, the UE transmits the HARQ-ACK through at least one of the following methods in operation 1106.

Method a-1: lowest index (or highest index)

When two or more SPS PDSCHs are activated by DCI indicating deactivation, the method includes HARQ-ACK information corresponding to the DCI indicating the deactivation in the HARQ-ACK codebook location corresponding to SPS PDACH reception having the lowest value (or the highest value or an intermediate value) among indexes of the corresponding SPS PDSCHs. For example, when SPS PDSCH index 1, SPS PDSCH index 4, and SPS PDSCH index 5 are simultaneously deactivated by one DCI, the UE inserts HARQ-ACK information for the DCI into the HARQ-ACK codebook location corresponding to SPS PDSCH index 1 (or 5) and transmits the same.

Method a-2: earliest HARQ-ACK codebook occasion (latest HARQ-ACK codebook occasion)

When two or more SPS PDSCHs are deactivated by DCI indicating deactivation, the method includes HARQ-ACK information corresponding to the DCI indicating the deactivation in the HARQ-ACK codebook earliest (or latest) among the HARQ-ACK codebook locations of the corresponding SPS PDSCHs. For example, in a situation in which SPS PDSCH index 1, SPS PDSCH index 4, and SPS PDSCH index 5 are simultaneously deactivated by one DCI, when the HARQ-ACK codebook location corresponding PDSCH reception of SPS PDSCH index 1 is k1, the HARQ-ACK codebook location corresponding PDSCH reception of SPS PDSCH index 2 is k2, the HARQ-ACK codebook location corresponding PDSCH reception of SPS PDSCH index 3 is k3, and k1<k2<k3, the UE inserts the HARQ-ACK information corresponding to the DCI into k1 (or k3) and transmits the same. When HARQ-ACK codebook locations for PDSCH reception of two or more SPS PDSCHs are the same, the UE considers them as one and performs the operation.

Method a-3: All HARQ-ACK codebook occasions

When two or more SPS PDSCHs are deactivated by DCI indicating deactivation, the method includes HARQ-ACK information for the DCI in all HARQ-ACK codebook locations and transmits the same instead of selecting the HARQ-ACK codebook location according to method a-1 or a-2. For example, when SPS PDSCH index 1, SPS PDSCH index 4, and SPS PDSCH index 5 are simultaneously deactivated by one DCI, the UE inserts HARQ-ACK information for the DCI into the HARQ-ACK codebook locations corresponding to SPS PDSCH indexes 1, 4, and 5 and transmits the same. When two or more HARQ-ACK codebook locations among the SPS PDSCHs are the same, the UE considers them as one and transmits HARQ-ACK information. In another example, in a situation in which SPS PDSCH index 1, SPS PDSCH index 4, and SPS PDSCH index 5 are simultaneously deactivated by one DCI, when the HARQ-ACK codebook location corresponding PDSCH reception of SPS PDSCH index 1 is k1, the HARQ-ACK codebook location corresponding PDSCH reception of SPS PDSCH index 2 is k2, the HARQ-ACK codebook location corresponding PDSCH reception of SPS PDSCH index 3 is k3, and k1<k2<k3, the UE inserts the HARQ-ACK information corresponding to the DCI into k1, k2, and k3 and transmit the same. When HARQ-ACK codebook locations for PDSCH reception of two or more SPS PDSCHs are the same, the UE considers them as one and performs the operation.

Method a-4: gNB configuration

The method means that the BS first determines methods a-1 to a-3 by a higher signal. Second, the BS can directly determine the HARQ-ACK codebook location by a higher signal or an L1 signal as well as methods a-1 to a-3. At this time, when two or more SPS PDSCHs are deactivated by one DCI, the HARQ-ACK codebook locations which can be determined by the BS may be determined by a higher or L1 signal within available HARQ-ACK codebook location candidates of the corresponding SPS PDSCHs or the HARQ-ACK codebook locations can be determined by a higher or L1 signal regardless thereof.

When receiving DCI indicating release or deactivation of one or a plurality of SPS PDSCHs, the UE does not expect that the HARQ-ACK codebook location to which HARQ-ACK information for the corresponding DCI is transmitted is the same as the HARQ-ACK codebook location to which HARQ-ACK information for PDSCHs scheduled by other DCI, and when receiving such scheduling, considers that the scheduling is an error case and performs a random operation.

Figure 12:
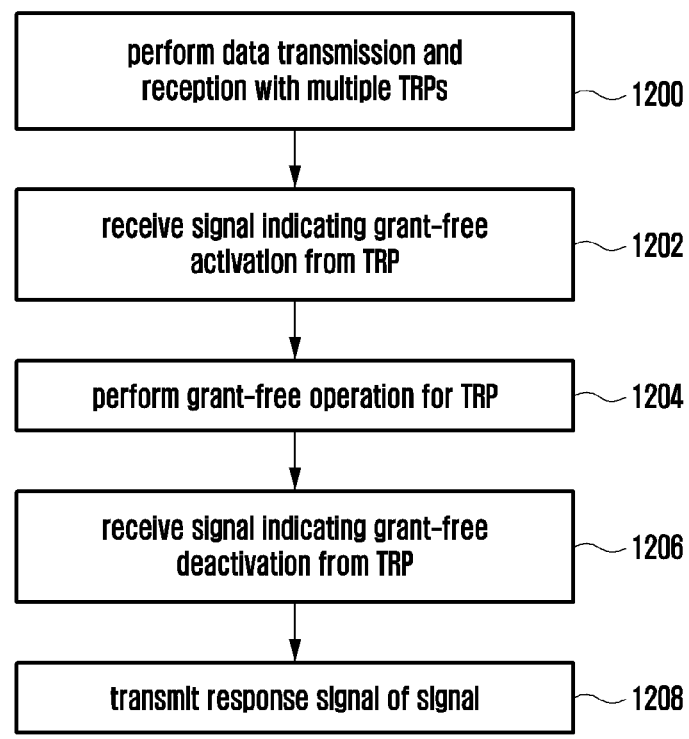
FIG. 12 illustrates a grant-free operation in a situation in which the UE is connected to two or more transmission and reception points (TRPs).

FIG. 12 is a block diagram illustrating a grant-free operation in a situation in which one UE is connected to two or more transmission and reception points (TRPs).

The UE may transmit and receive data to and from multiple TRPs in operation 1200. Here, the term "TRP" may be interchangeably used with the term "base station". In such a situation the UE receives a signal indicating grant-free activation from one or a plurality of TRPs in operation 1202. At this time, the signal may be a higher signal or an L1 signal. Thereafter, after receiving the signal indicating activation information, the UE transmits or receives data to or from one or a plurality of TRPs in grant-free resources in operation 1204. Further, the UE can receive a configuration of one or more grant-free resources within one cell or one BWP. Thereafter, the UE receives a signal indicating grant-free deactivation/release from one or a plurality of TRPs in operation 1206. At this time, the signal may be a higher signal or an L1 signal. The UE transmits a response signal of the signal in operation 1208. For example, when grant-free is SPS, the signal is DCI in which case the UE transmits HARQ-ACK information for the DCI. In another example, when grant-free is configured grant type 2, the signal is DCI in which case the UE transmits confirmation information as response information for the DCI to the TRP through a MAC CE.

The grant-free operation largely includes configured grant type 1 and configured grant type 2 in the uplink and semi persistent scheduling (SPS) in the downlink. Configured grant resources are configured, activated, and deactivated by a higher signal in configured grant type 1, and some pieces of resource configuration information are transmitted through a higher signal and the remaining configured grant resources are configured, activated, and deactivated through DCI (L1 signal) in configured grant type 2. In the corresponding description, they are all expressed as grant-free. In a situation in which two or more grant-free configurations are possible within one cell or one BWP, when the UE can transmit and receive data to and from two or more TRPs, one grant-free resource is associated with one TRP and allows data transmission and reception. For example, when grant-free resource A is configured, the UE determines that the corresponding grant-free resource is associated with TRP 1 and receives or transmits data to or from TRP1 in periodic grant-free resource.

Specifically, since the configuration, activation, or deactivation of the configured grant resource is indicated by only a higher signal without an L1 signal in configured grant type 1, the higher signal information may include information informing of a TRP from which the corresponding configured grant is transmitted. For example, in higher information for the configured grant type, the following parameters may exist.

TRP index (or Spatial domain information): TRP information associated with configured grant The number of TRPs associated with on configured grant may be one or plural. Specifically, when the number of TRPs associated with the configured grant is plural, the case may be subdivided into the following situations.

Situation b-1: specific configured grant resources are associated with different TRPs. For example, one configured grant resource is periodically configured, and when the UE is connected to two TRPs, the odd-numbered configured grant can be associated with TRP1 and the even-numbered configured grant can be associated with TRP 2 from a time point at which the configured grant is activated. In generalization thereof, an associated TRP for each specific configured grant may be determined by an equation of "configured grant index" mod "TRP number"="TRP index".

Situation b-2: two or more TRPs are associated for each of all the configured grant resources. The UE can transmit data to a plurality of TRPs for each configured grant occasion.

Situation b-3: a transmission period is determined for each TRP regardless of a configured grant index, and thus a specific configured grant may be associated with one TRP and another configured grant may be associated with a plurality of TRPs. For example, in a situation in which the UE is connected to two TRPs, when TRP 1 is associated with all configured grant resources and TRP 2 is associated with even-numbered configured grant resources, the UE transmits data only to TRP 1 in odd-numbered configured grant resources if the data is generated, and transmits data to TRP 1 and TRP 2 in even-numbered configured grant resources if the data is generated.

The above-described situations can be applied to all grant-free operations including SPS. Information indicating that the one grant-free resource is associated with a plurality of TRPs can be configured by a higher or L1 signal. In SPS, after receiving configuration information and activation information of configured grant type 1, the UE transmits data in a configured grant resource configured for a TRP indicated by a TRP index without a separate grant if the data is generated.

In configured grant type 2, some pieces of information are transmitted by a higher signal and the remaining configuration information, activation, and deactivation are indicated by an L1 signal. When there is TRP index information in the higher signal, the UE receives the L1 signal indicating activation of configured grant type 2 according to the corresponding information and then, when there is data to be transmitted to the TRP indicated by the TRP index provided by the corresponding higher configuration information through the configured grant resource, transmits the corresponding data without a separate grant. On the other hand, when there is no information on the TRP index in the higher configuration information, the UE implicitly determines a TRP to which data is transmitted in resources configured by the configured grant according to a TRP associated with a CORESET in which DCI indicating activation of configured grant type 2 is transmitted. For example, when the CORESET for transmitting the DCI indicating activation of configured grant type 2 is transmitted from TRP 1 and data is generated for the corresponding activated configured grant resource, the UE transmits the corresponding data to TRP 1 without a separate grant. The TRP for transmitting DCI indicating deactivation of configured grant type 2 may be determined by at least one of the two methods.

Method b-1: release of a configured grant resource associated with TRP 1 can be indicated by only DCI transmitted in the CORESET of TRP 1. When one DCI simultaneously supports two or more configured grant resources, all of the two or more configured grants should be associated with TRP 1 according to the method.

Method b-2: DCI transmitted in a CORESET associated with another TRP other than TRP 1 may also indicate release of the corresponding configured grant unlike in method 1. When one DCI simultaneously supports two or more configured grant resources, the two or more configured grants can be associated with different TRPs according to the method.

In SPS, a detailed operation is mostly similar to configured grant type 2 and has only difference in that the UE receives data for activated SPS resources and reports HARQ-ACK information therefor. When the corresponding SPS resource is associated with TRP 1, the UE transmits HARQ-ACK information for the data received through the corresponding SPS resource to TRP 1. When the SPS resource is associated with two or more TRPs, a TRP to which the UE transmits the HARQ-ACK information may be determined according to the above-described situations. When a specific SRS resource is received from TRP 1 in one SPS configuration, the UE transmits HARQ-ACK information for a PDSCH received from the corresponding SPS to TRP 1. When a specific SPS resource is received from TRP 1 and TRP 2 in one SPS configuration, the UE transmits HARQ-ACK information for a PDSCH received from the SPS to TRP 1 or TRP 2 by a higher signal configuration or an L1 signal indication. Alternatively, when a specific SPS resource is received from TRP 1 and TRP 2 in one SPS configuration, the UE transmits HARQ-ACK information for a PDSCH received from the SPS to TRP 1 having the lowest index (or TRP 1 when TRP 1 is a master TRP).

In another example, in a situation in which DCI indicating activation is transmitted to a CORSET associated with TPR 1 in configured grant type 2 or SPS, the TRP associated with corresponding configured grant type 2 or SPS can be sufficiently another TRP rather than TPR 1. Specifically, when the UE determines TRP association information for configured grant type 2 or SPS in advance by a higher signal, the operation may be performed. Alternatively, a field directly indicating TRP information may be added within DCI information indicating activation, or the TRP information may be indirectly indicated using an HARQ process number or an RV value within the DCI.

In another example, when different grant-free resources associated with one TRP overlaps, the UE should select one thereof and transmit or receive data through the grant-free resource. At this time, a selection method may be implemented by the UE, or in grant-free resources, a priority value may be transmitted by a higher signal configuration or an L1 signal indication and the UE may transmit or receive data through a grant-free resource having a high priority on the basis of the corresponding priority value. When different grant-free resources associated with different TRPs overlap, the UE can transmit or receive data for the grant-grant free resources without applying the selection method.

Figure 13:
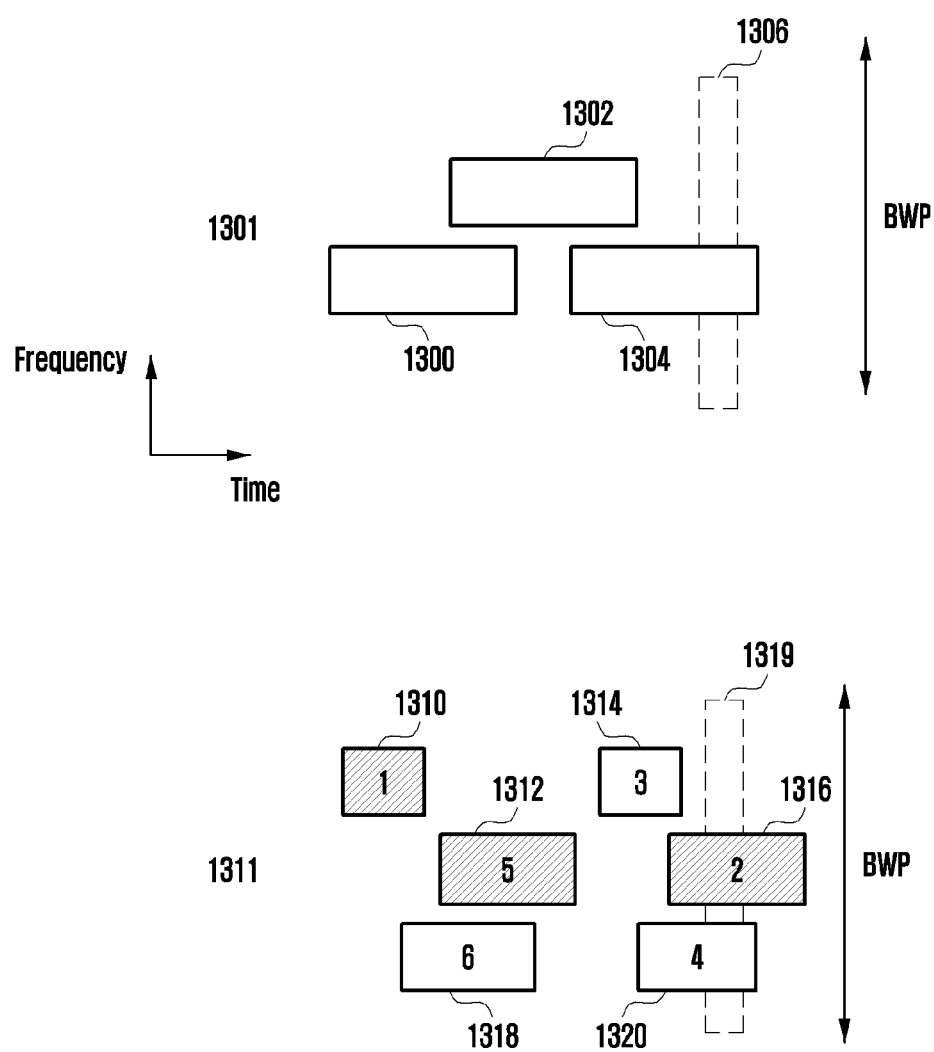
FIG. 13 illustrates a DL SRS reception operation of the UE in a situation in which two or more DL SPSs temporally overlap.

FIG. 13 illustrates a DL SRS reception operation of the UE in a situation in which two or more DL SPSs temporally overlap. Although the description is made for DL SPS reception, the description can be equally applied to UL SPS. In this case, configuration information transmission and activation by DCI are still transmitted from the BS to the UE, but an operation related to TB reception in an overlapping situation may be performed by the BS rather than the UE.

The DL SPS is described in the disclosure, section 10.2 of 3GPP standard TS38.213, section 5.3 of TS38.321, and section 6.3.2 of TS38.331 are cited. In FIG. 13, the UE can receive two different pieces of DL SPS higher signal configuration information within one activated BWP and activate the same. In Rel-16 NR, a maximum of 8 DL SPS configurations can be made within one BWP. The disclosure is not limited thereto and can be applied to 8 or more DL SPS configurations within the BWP. Different DL SPS PDSCHs (hereinafter, DL SPSs) may be identified by index information configured/indicated in advance by a higher signal or an L1 signal. For example, index information may be explicitly included in configuration information transmitted by a higher signal. The configuration information may include at least one of periodicity for the DL SPS configuration, nrofHARQ-Processes, n1PUCCH-AN, and mcs-Table information. Further, index information for identifying DL SPS may be included. In another example, the index information may be included in control information transmitted by a higher signal and/or an L1 signal. In another example, the index information may be implicitly configured. The index information may be configured to sequentially increase in the order of DL SPS configuration information included in the configuration information transmitted by the higher signal. In another example, the index information may be configured to sequentially increase in the order of activation of control information transmitted by an L1 signal after a higher configuration. When a plurality of DL SPSs are activated in the control information, the index information may be configured to sequentially increase in the order of DL SPSs included in the higher signal.

Further, two or more different activated DL SPS resources may partially overlap in terms of time resources. Here, activation means a state configured by a higher signal or a state of an actual operation by an L1 message after the configuration. Alternatively, activation may refer to both the former and the latter. Further, the time resources may be configured or allocated to information included in the higher signal or configured or allocated using a time point at which information included in the L1 message or the L1 message is transmitted. For example, when transmission periods of two or more DL SPS resources are different, the time resources of the different DL SPS resources may overlap in a specific time interval or slot as shown in FIG. 13. Reference numeral 1301 of FIG. 13 shows a situation in which three different DL SPS resources overlap in terms of time resources. When the UE can receive only one DL SPS resource at a time, the UE receives only one DL SPS resource among the overlapping DL SPS resources. Accordingly, there may be a method by which the UE randomly selects one of the overlapping DL SPS resources, but a method of selecting DL SPS resources predefined between the BS and the UE is needed since the BS does not know which DL SPS is received by the UE among the overlapping DL SPSs and which HARQ-ACK information therefor is transmitted. In order to solve the problem, a least one of the following methods or a combination of the plurality of methods can be applied.

Method 13-1: indicates a method of prioritizing a DL SPS resource having the lowest index among temporally overlapping DL SPS resources. For example, when a DL SPS resource having an index value of 1 and a DL SPS resource having an index value of 3 overlap each other, the UE receives a transport block (TB) transmitted from the BS through the DL SPS resource having the index value of 1 and does not receive the DL SPS resource having the index value of 3. Accordingly, the UE demodulates/decodes the TB received through the DL SPS resource having the index value of 1 and transmits HARQ-ACK information therefor through a PUCCH resource configured in advance for the DL SPS resource. Even in a situation in which three or more DL SPSs temporally overlap, the UE receives a TB transmitted through the DL SPS resource having the lowest index value. In another example, in an temporally overlapping situation, the UE does not receive TBs transmitted through DL SPS resources except for the DL SPS resource having the lowest index value or may operate on the basis of the assumption that the BS transmits no TB through the corresponding resources. For example, no demodulation/decoding operation may be performed in the corresponding DL SPS resources. In another example, feedback information for the corresponding DL SPS resources, for example, Ack/Nack information may not be transmitted.

Method 13-2: indicates a method of prioritizing a DL SPS resource having the highest index among temporally overlapping DL SPS resources. For example, when a DL SPS resource having an index value of 1 and a DL SPS resource having an index value of 3 overlap each other, the UE receives a transport block (TB) transmitted from the BS through the DL SPS resource having the index value of 3 and does not receive the DL SPS resource having the index value of 1. Accordingly, the UE demodulates/decodes the TB received through the DL SPS resource having the index value of 3 and transmits HARQ-ACK information therefor through a PUCCH resource configured in advance for the DL SPS resource. Even in a situation in which three or more DL SPSs temporally overlap, the UE receives a TB transmitted through the DL SPS resource having the highest index value. In another example, in a temporally overlapping situation, the UE does not receive TBs transmitted through DL SPS resources except for the DL SPS resource having the highest index value or may operate on the basis of the assumption that the BS transmits no TB through the corresponding resources. For example, no demodulation/decoding operation may be performed in the corresponding DL SPS resources. In another example, feedback information for the corresponding DL SPS resources, for example, Ack/Nack information may not be transmitted.

Method 13-3: indicates a method of prioritizing a DL SPS resource in the time order in addition to method 13-1 (or method 13-2). In other words, it is a method of adding except of a DL SPS resource determined to have the lowest priority when resource priorities are determined through index comparison from the priority determination according to overlapping with other resources. At this time, the determination about whether the resource is prioritized is sequentially performed in the time order (or the inverse order of time within a specific time domain). The specific time domain may be a specific transmission interval or slot. Specifically, it is determined whether the DL SPS resource temporally overlaps another DL SPS resource. When they overlap, it is assumed that no reception operation is performed or the BS transmits no TB in the DL SPS resource having the lower priority. Further, the DL SPS having the lower priority is excluded from the operation of determining whether there is overlapping in the future. Reference numeral 1301 of FIG. 13 shows a situation in which three DL SPSs differently overlap. When an index value configured in the DLS PS 1300 is 1, an index value configured in the DL SPS 1302 is 3, and an index value configured in the DL SPS 1304 is 5, the UE does not receive the DL SPS 1304 since the DL SPS 1304 has a higher index value than the DL SPS 1302 and does not receive the DL SPS 1302 since the DL SPS 1302 has a higher index value than the DL SPS 1300 according to method 13-1. Accordingly, the UE may receive only the DL SPS 1300 according to method 13-1 even though the DL SPS 1300 and the DL SPS 1304 do not temporally overlap in reference numeral 1301 of FIG. 13. In the situation in which the lower index value has the higher priority like in method 13-1, an operation of determining the priority of the DL SPS resource only through the resource in which the DL SPS is configured and the index information and receiving the DL SPS having the higher priority by the UE may be inefficient. In method 13-3, in order to solve the problem, the UE determines whether the DL SPS temporally overlaps other effective DL SPSs at a time point at which the DL SPS is actually received, and when the DL SPSs overlap, excludes the DL SPS(s) having the low priority from the determination of whether DL SPSs temporally overlap without receiving the DL SPS(s) having the lower priority. Thereafter, the UE performs an operation of determining whether DL SPS(s), which are not excluded from the determination of whether the DL SPSs temporally overlap, overlap. A scheme shown in [Table 10] below may be applied.

1304. It is determined whether there are effective DL SPS resources overlapping the DL SPS 1304 like in step 2. Since the DL SPS 1302 is not effective DL SPS resources any more, the UE determines that there is no overlapping resource and moves to step 3. Further, the UE receives the DL SPS 1304. Method 13-2 can be applied in the same way. Further, [Table 10]applies the operation in consideration of the chronological order of DL SPS, but an inverse method can be used.

Method 13-4: determines a priority in consideration of time resources to which DL SPS is allocated in addition to method 13-1 (or method 13-2). In other words, it is a method of adding except of a DL SPS resource determined to have the lowest priority when resource priorities are determined through index comparison from the priority determination according to overlapping with other resources. At this time, the determination of the priority is sequentially performed from the DL SPS having the lowest index (or the DL SPS having the highest index) within a specific time domain. The specific time domain may be a specific transmission interval or slot. Specifically, it is determined whether the DL SSP resource overlaps another DL SPS in an ascending order of the index within the specific time domain. When they overlap, it is assumed that no reception operation is performed or the BS transmits no TB in the DL SPS resource having the lower priority. Further, the DL SPS having the lower priority is excluded from the operation of determining whether there is overlapping in the future. Referring to method 13-3, when an index value configured in the DL SPS 1300 is 5, an index value configured in the DL SPS 1302 is 3, and an index value configured in the DL SPS 1304 is 1 in reference numeral 1301 of FIG. 13, the UE may not receive the DLS SPS 1300 and may receive the

TABLE 10

Step 1: identifies DL SPS transmission resources which are effective in a specific transmission interval or slot and activated, and ends when there is no effective and activated DL SPS transmission resource any more
Step 2: identifies whether there is another DL SPS resource temporally overlapping a DL SPS first scheduled among the valid and activated DL SPS transmission resource(s) in step 1
Step 3: when the resources do not overlap in step 2, the UE receives a first scheduled DL SPS and considers the corresponding DL SPS resource as an ineffective DL SPS resource, and then moves to step 1
Step 4: when the resources overlap in step 3, receives a DL SPS transmission resource having the highest priority among the overlapping DL SPS transmission resources, does not receive the remaining DL SPS transmission resources, and considers all of the overlapping DL SPS resources as ineffective DL SPS resources, and then moves to step 1

When an index value configured in the DL SSP 1300 is 1, an index value configured in the DL SPS 1302 is 3, and an index value configured in the DL SPS 1304 is 5 in reference numeral 1301 of FIG. 13 through the above method, the UE determines that all of the DL SPS resources 1300, 1302, and 1304 activated in a specific transmission interval or slot are effective DL SPS resources like in step 1. Like in step 2, the UE may determine whether there are other overlapping DL SPS(s) before receiving the DL SPS 1300 which is chronologically first scheduled. Like in step 4, since the DL SPS 1300 overlaps the DL SPS 1302, the DL SPS 1300 having a higher priority (having the index value of 1) is received, and the DL SPS 1302 having a lower priority (having the index value of 3) is not received. The DL SPS 1300 and the DL SPS 1302 are determined as ineffective DL SPS, and the UE moves to step 1 and identifies the next first DL SPS DL SPS 1302 even if the DL SPS 1302 overlaps the DL SPS 1303 and has a low priority. Accordingly, the chronological order may have a problem. Therefore, the UE determines to receive the DLS SPS (A) having the highest priority except for DL SPSs overlapping at least one symbol of the DL SPS (A) having the highest priority in terms of time resources in consideration of the time resource area to which all DL SPSs activated in a specific transmission period or slot are allocated. Further, the UE determines to receive the DL SPS (B) except for DL SPSs overlapping at least one symbol of the DL SPS (B) having the highest priority among the remaining DL SPS resources, which have not been excluded, in terms of time resources. The UE continues the process until there is no DL SPS which is not determined to be received or has not been excluded.

The UE receives the determined DL SPSs determined to be received in the specific interval or slot and transmits HARQ-ACK information therefor to the BS. Alternatively, a method shown in [Table 11] below may be applied.

TABLE 11

Step 1: identifies DL SPS transmission resources determined to be received or not received among DL SPS resources activated in a specific transmission interval or slot, and moves to step 2 when there is at least one DL SPS transmission resource which has not determined to be received or not received and otherwise moves to step 3
Step 2: determines to receive the DL SPS resource having the highest priority among DL SPS transmission resources which have not been determined to be received or not received, determines not to receive DL SPS resources having at least one symbol overlapping the DL SPS resource by the UE, and moves to step 1
Step 3: receives DL SPS resources determined to be received by the UE, reports HARQ-ACK information therefor to the BS, and does not receive DL SPS resources determined to be not received by the UE.

In a situation 1311 of FIG. 13, DL SPSs 1310, 1312, 1314, 1316, 1318, and 1320 having 6 different indexes are activated and scheduled in one slot. When the DL SPS having the lowest index value has the highest priority, the UE receives the DL SPS 1310 having an index of 1 and does not receive the DLS SPS 1318 having an index of 6 which overlaps the DL SPS 1310 according to method 13-4. The UE receives the DL SPS 1316 having an index of 2 which has the next highest priority and does not receive the DL SPS 1314 having an index of 3 and the DL SPS 1320 having an index of 4 which overlap the DL SPS 1316. The UE receives the DL SPS 1312 having an index of 5 which has the next highest priority. Accordingly, the UE finally receives the DL SPSs 1310, 1312, and 1316, demodulates/decodes the DL SPSs, and then reports HARQ-ACK information therefor to the BS.

Method 13-5: determines a priority in consideration of symbol direction information within a specific transmission interval or slot in TDD according to method 13-3 or method 13-4. The symbol direction is one of downlink, uplink, and flexible. In TDD, section 11.1 of 3GPP standard TS 38.213 is referred to for a method indicating the symbol direction information. Basically, the UE receives the DL SPS only when all symbol in the resource area to which the DL SPS is allocated are indicated as downlink (DL) by a higher or L1 signal. Alternatively, when at least one symbol in the resources to which the DL SPS is allocated is configured/indicated as uplink symbols or flexible symbols by a higher or L1 signal, the UE does not receive the DL SPS. Accordingly, method 13-3 or method 13-4 can be considered by the same. In method 13-3, the following conditions may be added to [Table 10].

DL SPS transmission resources are considered as effective DL SPS resources only when all the DL SPS transmission resources are indicated as downlink by a higher or L1 signal. Alternatively, DL SPS resources having at least one symbol overlapping the symbol configured/indicated as the uplink symbol or the flexible symbol are considered as ineffective resources by a higher or L1 signal, and the UE does not receive the DL SPS resources. In reference numeral 1301 of FIG. 13, the DL SPS 1304 overlaps the symbol 1306 configured/indicated as the uplink symbol or the flexible symbol by a higher or L1 signal, and thus the UE does not receive the DL SPS 1304.

In other words, it is determined whether each DL SPS resource overlaps the uplink symbol or the flexible symbol before method 13-3 is performed. The UE operates on the basis of the assumption that no reception is performed and the BS transmits no TB in overlapping DL SPS resources. Thereafter, method 13-3 is performed after the corresponding DL SPS is excluded from the priority determination.

In method 13-4, the following conditions may be added to [Table 11].

The UE determines not to receive DL SPS resources having at least one symbol overlapping the symbol configured/indicated as the uplink symbol or the flexible symbol by a higher or L1 signal. In reference numeral 1311 of FIG. 13, the DL SPSs 1316 and 1320 overlap the symbol 1319 configured/indicated as the uplink symbol or the flexible symbol by a higher or L1 signal, and thus the UE does not receive the DL SPSs 1316 and 132. Accordingly, in such a case, the UE receives the DL SPSs 1310, 1312, and 1314 according to method 13-4 and reports HARQ-ACK information therefor. The UE does not receive the DL SPSs 1318, 1316, and 1320 according to method 13-4 and method 13-5.

In other words, it is determined whether each DL SPS resource overlaps the uplink symbol or the flexible symbol before method 13-4 is performed. The UE operates on the basis of the assumption that no reception is performed or the BS transmits no TB in the overlapping DL SPS resources. Thereafter, method 13-4 is performed after the corresponding DL SPS is excluded from the priority determination.

Figure 14:
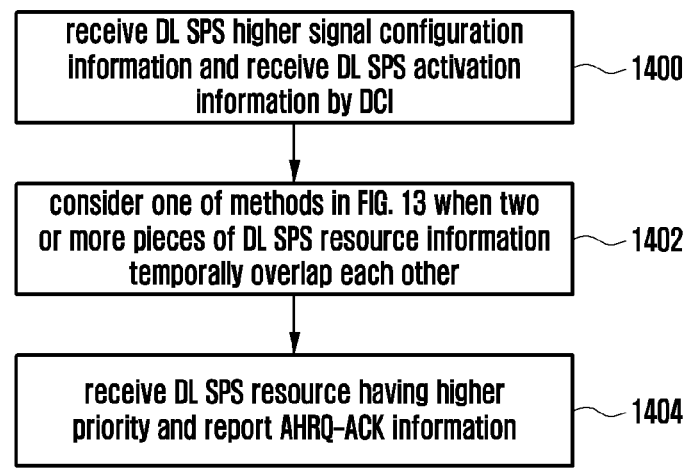
FIG. 14 is a block diagram illustrating a reception operation of the UE in a situation in which two or more DL SPSs temporally overlap.

FIG. 14 is a block diagram illustrating a reception operation of the UE in a situation in which two or more DL SPSs temporally overlap.

In FIG. 14, the UE receives DL SPS configuration information in advance through a higher signal (RRC). At this time, the UE also may receive index information for DL SPS or the index information may be indirectly configured. Highly configured DL SPS information by DCI including CRC scrambled by a CS-RNTI is activated separately or into groups in operation 1400. Here, the DL SPSs can be activated through reception of configuration information of the higher signal alone in which case reception of DCI including CRC scrambled by the CS-RNTI may be omitted. The UE periodically receives information on DL SPSs in resources configured in advance. When DL SPSs having two or more different indexes temporally overlap, the UE considers or performs at least one of the methods (methods 13-1 to 13-5) described with reference to FIG. 13 in operation 1402. Accordingly, the UE receives only a DL SPS having the highest priority (for example, the lowest index value) and reports HARQ-ACK information in operation 1404. Other DL SPSs having a low priority (for example, a high index value) are not received by the UE, and the UE does not report HARQ-ACK information or even does not generate HARQ-ACK information itself. When the UE receives two or more DL SPS resources within one slot, the UE can use one of the two methods to configure the HARQ-ACK codebook.

Method 14-1: maps sequentially from HARQ-ACK information for DL SPS resource having the lowest index. For example, when the UE receives DL SPS of index 1, DL SPS of index 3, and DL SPS of index 5 in one slot, the UE configures the HARQ-ACK codebook as [HARQ-ACK information for DL SPS index 1, HARQ-ACK information for DL SPS index 3, HARQ-ACK information for DL SPS index 5].

Method 14-2: maps sequentially from HARQ-ACK information for first received DL SPS in consideration of a time resource area of DL SPSs actually received by the UE in the slot. For example, when the UE receives DL SPS of index 1 in symbols 1 to 3, DL SPS of index 3 in symbols 10 to 11, and DL SPS of index 5 in symbol 4 to 6, respectively, the UE configures the HARQ-ACK codebook as [HARQ-ACK information for DL SPS index 1, HARQ-ACK information for DL SPS index 5, HARQ-ACK information for DL SPS index 3] in terms of time resources in which the SPS PDSCH is actually transmitted and received. Alternatively, the UE uses an applied time domain resource allocation (TDRA) value to activate the DL SPS. That is, for DL SPSs received in one slot, the UE generates the HARQ-ACK codebook with reference to 9.1.2 of 3GPP standard TS 38.213 using the TDRA value for the corresponding DL SPSs.

Figure 15:
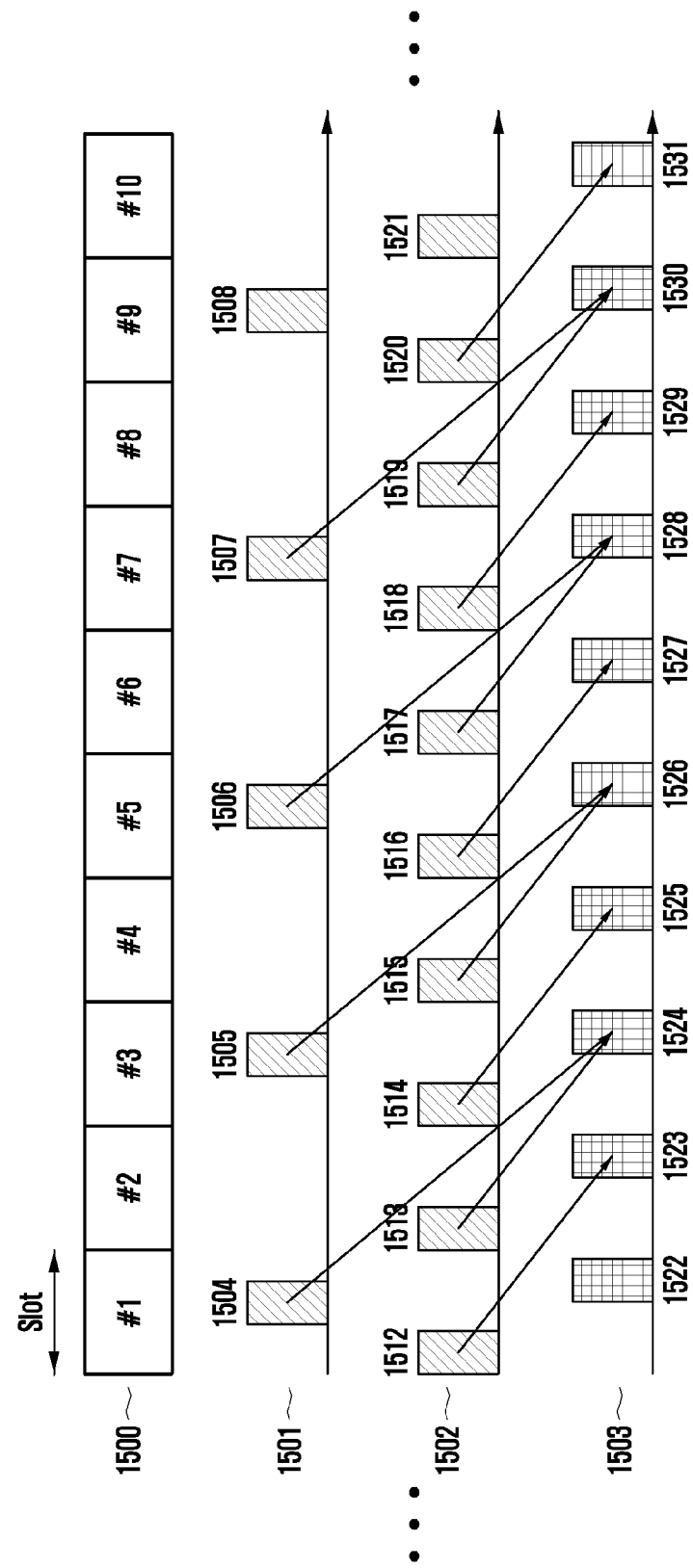
FIG. 15 illustrates HARQ-ACK transmission/reception for DL SPS reception according to an embodiment.

FIG. 15 illustrates HARQ-ACK transmission/reception for DL SPS reception according to an embodiment.

In a situation in which a plurality of DL SPSs are received in one BWP, the UE may report HARQ-ACK information for reception of the plurality of DL SPSs. DL SPS higher configuration information may include at least the information shown in [Table 12] below.

DCI includes CRC scrambled by a CS-RNTI. FIG. 15 illustrates a situation in which the UE receives two DL SPSs in a slot structure as indicated by reference numeral 1500 and transmits a PUCCH or a PUSCH including HARQ-ACK information for one or two DL SPSs in reference numeral 1503. Reference numeral 1501 is DL SPS having a value of index 0, and reference numeral 1502 is DL SPS having a value of index 1. In reference numeral 1503, HARQ-ACK information for DL SPS received in reference numerals 1501 and 1502 is transmitted. The DL SPS in reference numeral 1501 has a transmission period of two slots and k1 of two slots. The DL SPS in reference numeral 1502 has a transmission period of on slot and k1 of one slot. k1 denotes a slot offset value between received DL SPS and transmitted HARQ-ACK. k1 is applied in common to all DL SPSs periodically transmitted and received in one piece of DL SPS configuration information. Accordingly, reference numeral 1523 includes HARQ-ACK information for one DL SPS 1512. Similarly, HARQ-ACKs 1525, 1527, 1529, and 1531 include only HARQ-ACK information for one DL SPS. Reference numeral 1524 includes HARQ-ACK information for two DL SPSs 1504 and 1513. Similarly, HARQ-ACKs 1524, 1526, 1528, and 1530 include HARQ-ACK information for two DL SPSs. In Rel-15 NR, only one DL SPS configuration is possible within a cell associated with one PUCCH group, and thus HARQ-ACK information only for DL SPS needs just one bit. However, a plurality of DL SPS configurations are possible within one cell/BWP, and the UE needs a method of generating HARQ-ACK codebook information for the DL SPSs in a situation in which the plurality of DL SPSs can be received. Information required for configuring the HARQ-ACK codebook largely includes DL SPS index information, cell index information for transmitting and receiving DL SPS, and slot index information

TABLE 12

* sps-ConfigIndex-r16: index information of configured SPS
* SPS-ConfigDeactivationStateList-r16: table configuration information for SPS release, wherein each state in the table includes one piece of a plurality of pieces of SPS configuration information (index)
* SPS-ConfigDeactivationState-r16: includes one piece of a plurality of pieces of SPS configuration information (index) in one state
* SPS-PUCCH-AN-List: configures a list of PUCCH resource IDs per HARQ-ACK codebook, wherein each PUCCH resource ID includes a payload size and is applied to all pieces of SPS configuration information in common, and n1PUCCH-AN configuration information is ignored when the corresponding information is configured
* SPS-PUCCH-AN-ResourceID: PUCCH resource ID configuration information
* MaxPayloadSize: maximum payload size for each PUCCH resource ID
- Periodicity: DL SPS transmission period
* NrofHARQ-processes: the number of HARQ processes configured for the DL SPS
* n1PUCCH-AN: PUCCH resource ID, wherein the PUCCH resource ID is determined by separate PUCCH higher configuration information and time/frequency resource information for transmitting the PUCCH, a PUCCH format, and hopping information are included for each PUCCH resource ID
* mcs-Table: indicates whether MCS table 3(QAM64LowSE) is used The UE may receive one or a plurality of SPSs within one BWP through higher signal configuration information of [Table 12] above. Other SPS configuration information is included in DCI for activating the corresponding SPS. The for transmitting and receiving DL SPS. Through such information, HARQ-ACK codebook information may be configured in a situation in which only DL SPS is received by [pseudo code 15-1] below.

[pseudo code 15-1]

Set $N_c^{D,L}$ to the number of DL or flexible slots for SPS PDSCH reception on serving cell c with HARQ-ACK information multiplexed on the PUCCH
Set j=0 - HARQ-ACK information bit index

[pseudo code 15-1]

```
Set c=0 - serving cell index: lower indexes correspond to lower RRC indexes
of corresponding cell
    while c<N_cells^{DL}
    Set s=0 - SPS PDSCH configuration index: lower indexes correspond to lower
RRC indexes of corresponding SPS configurations
        while s<N_c^{SPS}
            Set n_D=0 - slot index
            while n_D<N_c^{DL}
                if UE receives SPS PDSCH in slot n_D for SPS PDSCH
configuration s on serving cell c
                õ_j^{ACK} = HARQ-ACK information bit for this SPS PDSCH reception
                j = j + 1;
                    Otherwise,
                    õ_j^{ACK} = NACK
                        j = j + 1;
                end if
                    n_D = n_D + 1;
                end while
                s = s + 1;
            end while
            c = c + 1;
        end while
```

Alternatively, HARQ-ACK codebook information may be configured in a situation in which only DL SPS is received by [pseudo code 15-2] below.

[pseudo code 15-2]

```
Set N_c^{DL} to the number of DL slots for SPS PDSCH reception on serving cell
c with HARQ-ACK information multiplexed on the PUCCH
Set j=0 - HARQ-ACK information bit index
Set c=0 - serving cell index: lower indexes correspond to lower RRC indexes
of corresponding cell
    while c<N_cells^{DL}
    Set s=0 - SPS PDSCH configuration index: lower indexes correspond to lower
RRC indexes of corresponding SPS configurations
        while s<N_c^{SPS}
            Set n_D=0 - slot index
            while n_D<N_c^{DL}
                if UE receives SPS PDSCH in slot n_D for SPS PDSCH
configuration s on serving cell c
                õ_j^{ACK} = HARQ-ACK information bit for this SPS PDSCH reception
                j = j + 1;
                end if
                    n_D = n_D + 1;
                end while
                s = s + 1;
            end while
            c = c + 1;
        end while
```

In [pseudo code 15-1], candidate DL SPSs considered to configure the HARQ-ACK codebook are DL SPSs transmitted in a DL slot and a flexible slot. The DL slot means that symbols to which transmitted and received DL SPS belongs are indicated in advance as downlink symbols by a higher signal. The flexible slot may mean that symbols of transmitted and received DL SPS are indicated in advance as flexible symbols by a higher signal or at least one of the symbols of transmitted and received DL SPS is indicated in advance as flexible symbols by a higher signal. DL SPS transmitted and received in the DL slot is received by the UE, but DL SPS transmitted and received in the flexible slot is received by the UE only when symbols for transmitting and receiving DL SPS are indicated as downlink symbols by a slot format indicator (SFI) transmitted and received through an L1 signal. On the other hand, the UE does not receive the corresponding DL SPS when symbols for transmitting and receiving DL SPS are indicated as flexible symbols or uplink symbols by an SFI. Accordingly, in this case, the UE does not receive the corresponding DL SPS and thus maps NACK information to the HARQ-ACK codebook location corresponding to the corresponding DL SPS. Basically, [pseudo code 15-1] first considers all slots of DL SPS transmitted and received by one piece of HARQ-ACK information for a specific DL SPS index and then considers all DL SPS indexes transmitted and received in one cell in order to configure the HARQ-ACK codebook. Further, the same is applied to all cell indexes. In summary, the HARQ-ACK codebook is configured in order of slot index for transmitting and receiving DL SPS (ascending order)→cell index (ascending order).

On the other hand, [pseudo code 15-2] is similar to [pseudo code 15-1], but when the UE does not receive SFI monitoring configuration information, the UE does not receive DL SPS in the flexible slot or the UL slot and thus configures HARQ-ACK information only for DL SPS received in the DL slot. Accordingly, the UE always can assume and use [pseudo code 15-1] or [pseudo code 15-2]. Alternatively, the UE can apply one of [pseudo code 15-1] or [pseudo code 15-2] to the HARQ-ACK information configuration according to the existence or nonexistence of an SF1 monitoring configuration. For example, the UE applies [pseudo code 15-1] when receiving the SF1 monitoring configuration, and applies [pseudo code 15-2] when not receiving the SF1 monitoring configuration information.

FIG. 15 basically illustrates that reference numerals 1501 and 1502 are downlink and reference numeral 1503 is uplink in consideration of the FDD system, but can be sufficiently applied to a TDD condition. For example, when #1 is a slot including only downlink symbols, #2 is a slot including only flexible symbols, and #3 is a slot including only uplink symbols in the slot structure 1500, candidate DL SPSs included in the HARQ-ACK codebook 1524 transmitted in slot #3 may vary depending on whether the UE additionally performs SF1 monitoring on the slot including flexible symbols of #2.

According to [pseudo code 15-1], the HARQ-ACK codebook information 1524 transmitted in slot #3 may basically include HARQ-ACK information for DL SPS 1504 having a value of SPS index 0 and DL SPS 1513 having a value of SPS index 1. Since DL SPS 1513 is transmitted and received in slot #2 including the flexible symbols, if the UE receives SF1 monitoring configuration information and symbols for transmitting the corresponding DL SPS are indicated as at least downlink symbols, the UE receives the DL SPS 1513. When the UE does not receive SF1 monitoring configuration information or the UE receives SF1 monitoring configuration information but at least one of the symbols for transmitting DL SPS are indicated as symbols other than the downlink symbols or the UE fails to search for the SF1, the UE does not receive the DL SPS 1513. Accordingly, HARQ-ACK information according to a demodulation/decoding result of a TB included in the DL SPS 1513 is mapped to the HARQ-ACK codebook location corresponding to the DL SPS 1513 when the DL SPS 1513 is received, and an NACK value is mapped to the HARQ-ACK codebook location corresponding to the DL SPS 1513 when the DL SPS 1513 is not received. A PUCCH or a PUSCH including the HARQ-ACK codebook information is transmitted and received in reference numeral 1524 of slot #3.

According to [pseudo code 15-2], slot #2 for transmitting and receiving the DL SPS 1513 is not the DL slot, and thus there is no HARQ-ACK codebook corresponding to the DL SPS 1513 and only HARQ-ACK codebook information corresponding to the DL SPS 1504 is transmitted and received in reference numeral 1524 through the PUSCH or the PUCCH in slot #3.

Alternatively, instead of [pseudo code 15-2], the UE may use [pseudo code 15-3] in order to configure the HARQ-ACK codebook for reception of a plurality of DL SPSs.

[pseudo code 15-3]

Set $N_c^{D,L}$ to the number of DL slots for SPS PDSCH reception on serving cell c with HARQ-ACK information multiplexed on the PUCCH where DL slot means consists of only flexible symbol(s) and downlink symbol(s) configured by high-layer signaling for SPS PDSCH reception
    Set j=0 - HARQ-ACK information bit index
    Set c=0 - serving cell index: lower indexes correspond to lower RRC indexes of corresponding cell
    while $c<N_{cells}^{D,L}$
        Set s=0 - SPS PDSCH configuration index: lower indexes correspond to lower RRC indexes of corresponding SPS configurations
        while $s<N_c^{SPS}$
            Set $n_D=0$ - slot index
            while $n_D<N_c^{D,L}$
                if UE receives SPS PDSCH in slot $n_D$ for SPS PDSCH configuration s on serving cell c
                $\tilde{o}_j^{ACK}$ = HARQ-ACK information bit for this SPS PDSCH reception
                j = j + 1;
            end if
                $n_D = n_D + 1$;
            end while
        s = s + 1;
        end while
    c = c + 1;
    end while In FIG. 15, it is considered that respective DL SPSs are transmitted and received while being included in different pieces of HARQ-ACK information within one DL SPS index. That is, it is not possible to include HARQ-ACK information for two or more DL SPSs in one piece of HARQ-ACK information. This is because slot (or subslot including a plurality of symbols) offsets for transmission of the DL SPS and HARQ-ACK information corresponding thereto are indicated as the same value. Accordingly, DL SPSs transmitted and received in different times will transmit and receive HARQ-ACK information through different PUCCHs or PUSCHs. In the case of a TDD structure in which there are downlink slots including downlink symbols and uplink slots including uplink symbols in every slot, the UE receives DL SPS in the downlink slot but may not transmit HARQ-ACK information due to a slot other than the uplink slot. Accordingly, in order to solve the problem, when DL SPS having a small period is supported in the TDD structure, TDD should be configured to frequently alternate the downlink symbols and the uplink symbols to transmit DL SPS and HARQ-ACK information. However, frequent symbol direction switching needs time (or symbols) required for the switching and thus decreases frequency and time resource use efficiency. Subsequently, FIG. 16 proposes an HARQ-ACK information transmission method for reception of two or more DL SPSs to solve the problem.

Figure 16:
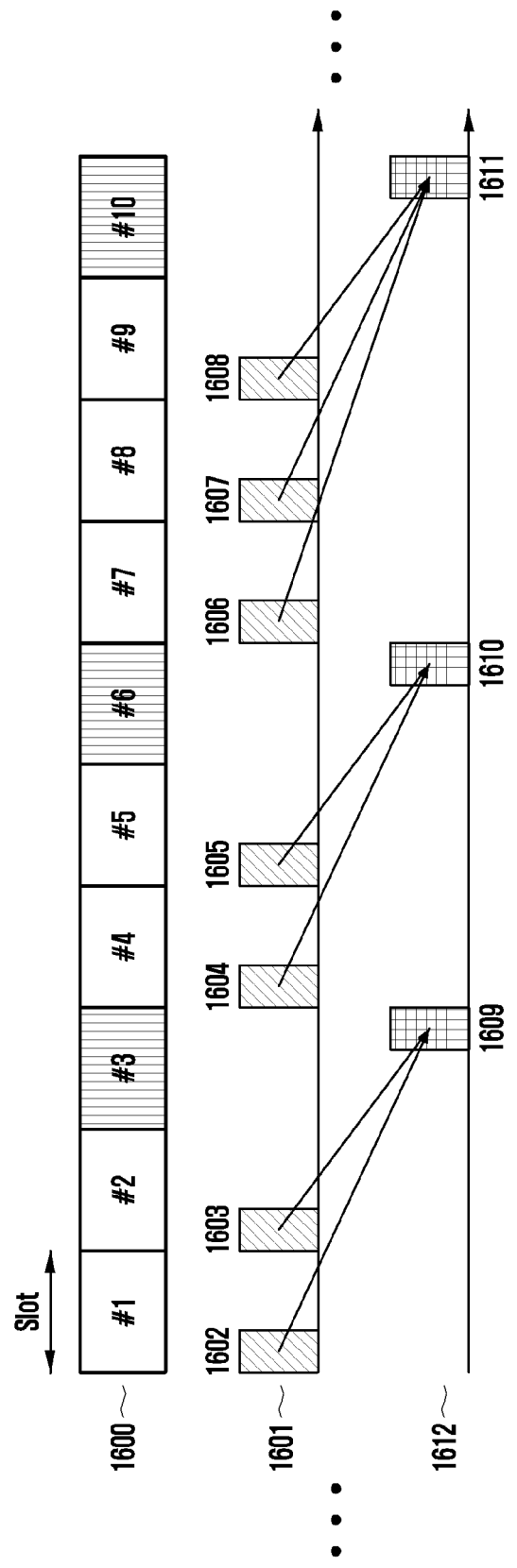
FIG. 16 illustrates transmission of HARQ-ACK information for a plurality of DL SPSs according to an embodiment.

FIG. 16 illustrates transmission of HARQ-ACK information for a plurality of DL SPSs according to an embodiment.

In FIG. 16, reference numeral 1600 is a TDD slot structure in which slots #1, #2, #4, #5, #7, #8, and #9 are slots including downlink symbols and slots #3, #6, and #10 are slots including uplink symbols among a total of 10 slots. Specifically, one or a plurality of symbols right before the uplink symbol can be flexible symbols rather than downlink symbols in consideration of an RF switching time between the downlink and the uplink and a transmission/reception delay between the BS and the UE in the TDD structure. Reference numeral 1601 shows DL SPS transmission/reception information according to SPS configuration information having one index value and has a one-slot period. For reference, the UE does not receive DL SPS in a slot indicated as uplink symbols, and thus the slot is omitted in FIG. 16. Reference numeral 1612 shows a situation in which a PUCCH or a PUSCH including HARQ-ACK information reporting a DL SPS reception result is transmitted and received. One PUCCH or PUSCH may include HARQ-ACK information for one or a plurality of DL SPSs. For example, a PUCCH or PUSCH 169 includes HARQ-ACK ACK information for DL SPS after slot n+k1. For example, SPS 1601 is transmitted and received according to a one-slot period in FIG. 16, and when a slot offset value K1 for transmission of HARQ-ACK information for respective DL SPSs is one slot, HARQ-ACK information of DL SPS 1602 received in slot #1 should be transmitted in slot #2 in the FDD condition. However, since slot #2 is configured in advance as downlink symbols by a higher signal, the HARQ-ACK information cannot be transmitted. Accordingly, next slot #3 is configured as uplink symbols and the HARQ-ACK information is transmitted in slot #3. HARQ-ACK information included in a PUCCH or PUSCH transmitted in slot #3 is for DL SPS 1602 received in slot #1 and DL SPS 1603 received in slot #2. Therefore, [pseudo code 16-1] may be defined in the 3GPP standard to support such procedures.

[pseudo code 16-1]

Set $N_c^{DL}$ to the number of DL or flexible slots for SPS PDSCH reception on serving cell c with HARQ-ACK information multiplexed on the i-th PUCCH in where SPS PDSCH has been received within [n1, n1] slots. n0 is the slot index of (m1-k1-k+1) and n1 is the
slot index of (m1-k1) where m1 is the slot index for i-th PUCCH, k1 is the PDSCH-to-HARQ-ACK timing indicator, and k is slot offset between (i-1)-th PUCCH and i-th PUCCH.
  Set j=0 - HARQ-ACK information bit index
  Set c=0 - serving cell index: lower indexes correspond to lower RRC indexes
of corresponding cell
    while c<$N_{cells}^{DL}$
    Set s=0 - SPS PDSCH configuration index: lower indexes correspond to lower
RRC indexes of corresponding SPS configurations
      while s<$N_c^{SPS}$
        Set $n_D$=O - slot index
        while $n_D$<$N_c^{DL}$
          if UE receives SPS PDSCH in slot $n_D$ for SPS PDSCH
configuration s on serving cell c
          $õ_j^{ACK}$ = HARQ-ACK information bit for this SPS PDSCH reception
          j = j + 1;
            Otherwise,
            $õ_j^{ACK}$ = NACK
              j = j + 1;
          end if
          $n_D$ = $n_D$ + 1;
        end while
        s = s + 1;
      end while
    c = c + 1;
  end while information for DL SPSs 1602 and 1603, a PUCCH or PUSCH 1610 includes HARQ-ACK information for DL SPSs 1604 and 1605, and a PUCCH or PUSCH 1611 includes DL SPSs 1606, 1607, and 1608. As illustrated in FIG. 15, a slot offset value between transmission and reception of DL SPS and HARQ-ACK is basically determined by a K1 value included in DCI for activating SPS, and thus all DL SPSs have different HARQ-ACK transmission time points. Accordingly, as illustrated in FIG. 16, at least one of the following methods can be performed to make a K1 value between DL SPS and HARQ-ACK actually different.

Method 16-1: HARQ-ACK is transmitted in a k lth slot (n+kl) after a DL SPS reception slot (n), wherein when at least one symbol in PUCCH or PUSCH time resources to include HARQ-ACK information to be transmitted in slot n+kl is indicated as flexible symbols or downlink symbols by a higher signal including slot format information, HARQ-ACK information for the corresponding DL SPS is transmitted in a first located resource among resources for transmitting HARQ- In a description of [pseudo code 16-1] by way of example with reference to FIG. 16, the UE determines a DL SPS transmission period on the basis of slot format information configured by a higher signal within one cell and a resource area for transmitting actual HARQ-ACK information on the basis of a K1 value for transmission of HARQ-ACK information. Accordingly, in FIG. 16, HARQ-ACK information should be transmitted in all sots as scheduled, but the HARQ-ACK information may be transmitted only in a PUCCH resource indicated as uplink symbols by a higher signal in an aspect of actual transmission. Therefore, the UE determines the number of slots for receiving DL SPSs for each of the actually transmitted PUCCHs on the basis thereof. In FIG. 16, when a PUCCH 1609 is an (i-2)th PUCCH, a PUCCH 1610 is an (i-1)th PUCCH, and a PUCCH 1611 is an ith PUCCH, candidate DL SPSs included in HARQ-ACK information transmitted in the PUCCH 1611 are DL SPSs received between slot #6 and slot #9 according to [pseudo code 16-1]. Slot #6 is indicated as an uplink slot, and thus the UE actually does not receive DL SPS. Therefore, the UE configures an HARQ-ACK codebook for DL SPSs received in slots #7 to #9 and transmits the same in the PUCCH 1611. At this time, for the PUCCH 1611, values of m1, k1, and k may be 10, 1, and 4, respectively. In [pseudo code 16-1], when the HARQ-ACK codebook is configured, DL SPSs in which at least one symbol is indicated in advance as uplink symbols by a higher signal are excluded. Further, the UE does not receive DL SPSs in which at least one symbol is indicated in advance as flexible symbols by a higher signal or an L1 signal but maps NACK information to the HARQ-ACK codebook. Alternatively, instead of [pseudo code 16-1], [pseudo code 16-2] below may be used.

10 exist in FIG. 16. When at least one symbol in PUCCH time resources including HARQ-ACK information for the DL SPS is indicated as downlink symbols or flexible symbols by a higher signal or an L1 signal, the UE does not transmit the PUCCH. Further, similarly, when the HARQ-ACK codebook is configured, DL SPSs in which at least one symbol is indicated in advance as uplink symbols by a higher signal are excluded. Further, the UE does not receive DL SPSs in which at least one symbol is indicated in advance as

[pseudo code 16-2]

Set $N_c^{DL}$ to the number of DL for SPS PDSCH reception on serving cell c with HARQ-ACK information multiplexed on the i-th PUCCH in where SPS PDSCH has been received within [n0, n1] slots. n0 is the slot index of (m1-k1-k+1) and n1 is the slot index of (m1-k1) where m1 is the slot index for i-th PUCCH, k1 is the PDSCH-to-HARQ-ACK timing indicator, and k is slot offset between (i-1)-thPUCCH and i-th PUCCH.
   Set j=0 - HARQ-ACK information bit index
   Set c=0 - serving cell index: lower indexes correspond to lower RRC indexes of corresponding cell
     while c<$N_{cells}^{DL}$
   Set s=0 - SPS PDSCH configuration index: lower indexes correspond to lower RRC indexes of corresponding SPS configurations
     while s<$N_c^{SPS}$
       Set $n_D$=O - slot index
     while $n_D$<$N_c^{DL}$
       if UE receives SPS PDSCH in slot $n_D$ for SPS PDSCH configuration s on serving cell c
     $\tilde{o}_j^{ACK}$ = HARQ-ACK information bit for this SPS PDSCH reception
     j = j + 1;
     end if
       $n_D$ = $n_D$ + 1;
       end while
       s = s + 1;
     end while
     c = c + 1;
   end while In [pseudo code 16-2], when the HARQ-ACK codebook is configured, DL SPSs in which at least one symbol is indicated in advance as flexible symbols or uplink symbols by a higher signal are excluded.

Method 16-2: indicates a method of configuring or indicating the number of DL SPS bundling. The method is available when two or more DL SPSs within the same SPS index are transmitted through one piece of HARQ-ACK information. That is, the number of DL SPS bundling may be included in a higher signal or DCI information indicating activation of SPS and transmitted through an L1 signal. When the UE receives the corresponding information, the UE also transmits HARQ-ACK information for DL SPSs corresponding to the number of DL SPS bundling. Accordingly, with respect to the number of DL SPS bundling, DL SPS candidates including uplink symbols are excluded in the slot format structure configured by a higher signal. For example, when only slot #1 to slot #6 are configured in FIG. 16, the UE transmits HARQ-ACK information for DL SPSs received in slots #1 and #2 through the PUCCH 1609 and HARQ-ACK information for DL SPSs received in slots #4 and #5 through the PUCCH 1610 in a situation in which the number of DL SPS bundling is 2. The corresponding method is a method of making the size of HARQ-ACK codebooks transmitted and received in all PUCCHs the same, and different HARQ-ACK codebook sizes for respective PUCCHs cannot be supported in a situation in which slots #1 to #10 exist in FIG. 16.

flexible symbols by a higher signal or an L1 signal but maps NACK information to the HARQ-ACK codebook.

Method 16-3: designates in advance a PUCCH including HARQ-ACK information. That is, in an example of FIG. 16, when [0010010001] is indicated in a method of designating a PUCCH transmission slot for transmitting HARQ-ACK information for DL SPS in units of 10 slots by a bitmap, the UE transmits HARQ-ACK information for DL SPS in slot #3, slot #6, and slot #10. Accordingly, when DL SPS is received, HARQ-ACK information for the received DL SPS is included in a PUCCH which can be first transmitted after the K1 value is included. When at least one symbol in PUCCH time resources including HARQ-ACK information for the DL SPS is indicated as downlink symbols or flexible symbols by a higher signal or an L1 signal, the UE does not transmit the PUCCH. Although it is assumed that a period of the bitmap for transmitting the PUCCH is 10 slots in the example, the period is not limited thereto and may be configured in units of other numbers of slots or units of time by the BS. Further, similarly, when the HARQ-ACK codebook is configured, DL SPSs in which at least one symbol is indicated in advance as uplink symbols by a higher signal are excluded. In addition, the UE does not receive DL SPSs in which at least one symbol is indicated in advance as flexible symbols by a higher signal or an L1 signal but maps NACK information to the HARQ-ACK codebook.

In FIG. 16, when the UE receives a PDSCH without a first DCI format and receives PDSCH-to-HARQ feedback timing which cannot be applied from dl-DataToUL-ACK corresponding to a higher signal as a DCI format for activating the PDSCH, the UE does not multiplex HARQ-AC information for the PDSCH to the PUCCH or PUSCH. When the UE receives the PDSCH without a second DCI format and provides a value which can be applied by the corresponding PDSCH-to-HARQ feedback timing, the UE multiplexes the HARQ-ACK information to the corresponding PUCCH or PUSCH. The dl-DataToUL-ACK is an RRC signal and provides candidate values for PDSCH-to-HARQ feedback timing, and a unit thereof is a slot. The PDSCH-to-HARQ feedback timing is a DCI field within the DCI format. In the case of DL SPS (that is, PDSCH without any DCI format), a PDSCH-to-HARQ feedback timing value follows a value indicated by PDSCH-to-HARQ feedback timing of the DCI format for activating SPS. The PDSCH without the first DCI format and the PDSCH without second DCI format may have the same PDSCH-to-HARQ feedback timing. Further, the PDSCH without the first DCI format and the PDSCH without second DCI format have the same SPS index higher signal value. In addition, the PDSCH without the first DCI format and the PDSCH without second DCI format have the same priority index value. The priority index value may be determined by a DCI format, a field within the DCI format, or a higher signal. For example, the UE may determine the priority index value by the DCI format itself when the UE receives a configuration to monitor a DCI format for scheduling two PDSCHs except DCI format 1_0, and a field for identifying the priority index value may be added to the DCI format so as to indicate the priority index when the UE receives a configuration to monitor a DCI format for scheduling one PDSCH except for DCI format 1_0. The priority index value of SPS activated by DCI format 1_0 is 0, and priority index values of SPS activated by the other DCI formats may be determined by the DCI format or the field within the DCI format as described above.

Figure 17:
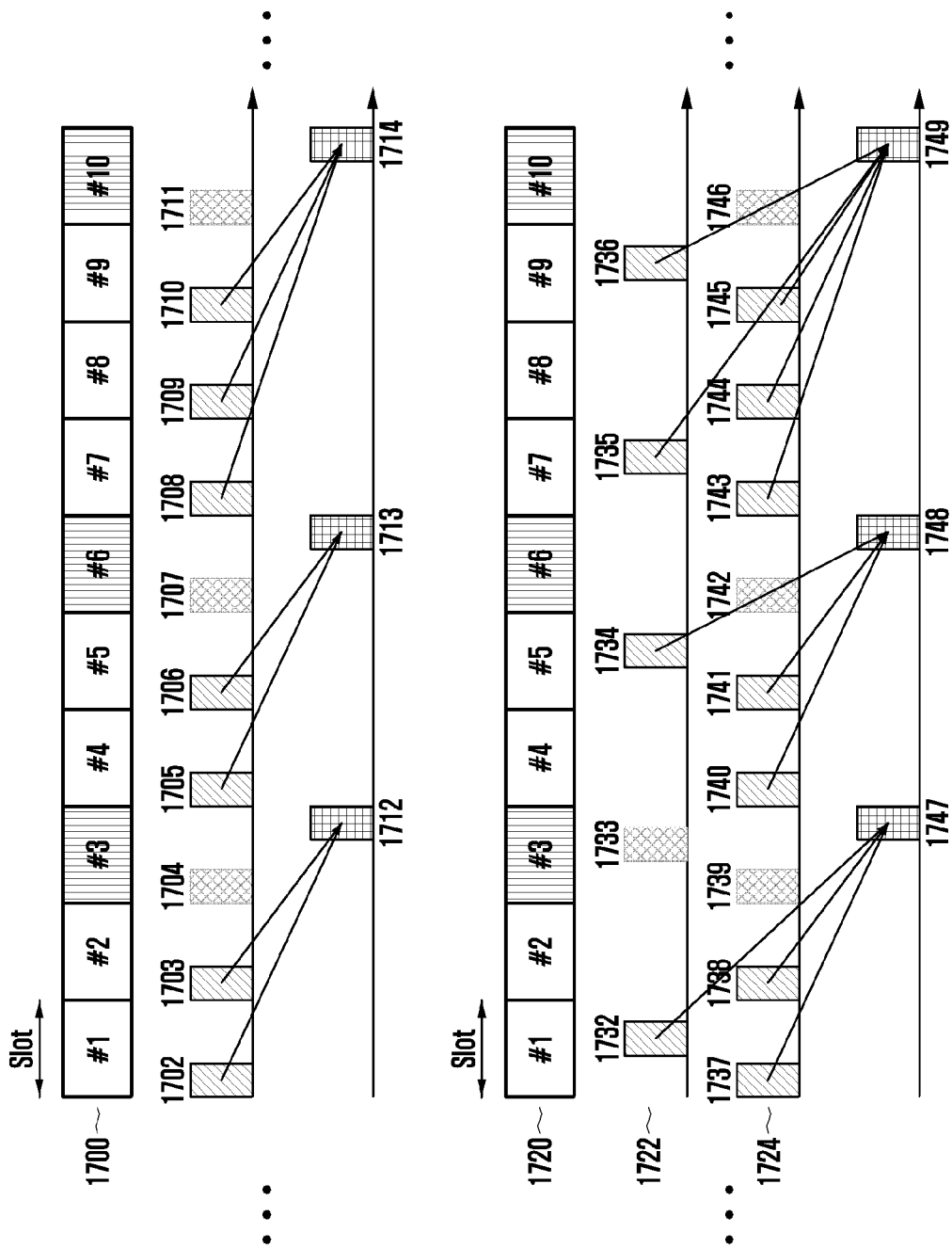
FIG. 17 illustrates transmission of HARQ-ACK information for DL SPS considering an HARQ process ID according to an embodiment.

FIG. 17 illustrates transmission of HARQ-ACK information for DL SPS considering an HARQ process ID according to an embodiment.

In NR, the UE supports a maximum of 16 HARQ process IDs for each cell, and the number of HARQ processes is configured by a higher signal (RRC), and, in the 3GPP standard, is nrofHARQ-ProcessesForPDSCH within PDSCH-ServingcellConfig and is configured as at least one value of 2, 4, 6, 10, 12, and 16 by a higher signal. When nrofHARQ-ProcessesForPDSCH is not configured, the UE uses 8 HARQ processes.

When DL SPS is configured, an HARQ process identification (ID) is determined by the following equation. [Equation 17-1] is implemented when harq-procID-offset is not configured, and [Equation 17-2] is implemented when harq-procID-offset is configured.

HARQ Process ID=[floor (CURRENT_slot×10/
(numberOfSlotsPerFrame×periodicity))] modulo
nrofHARQ-Processes　　　[Equation 17-1]

HARQ Process ID=[floor (CURRENT_slot/periodicity)] modulo nrofHARQ-Processes+harq-procID-offset where CURRENT_slot=[(SFN×numberOfSlotsPerFrame)+slot number in the frame] and numberOfSlotsPerFrame refers to the number of consecutive slots per frame　　　[Equation 17-2]

Parameters used in [Equation 17-1] and [Equation 17-2] above have the following meanings and include higher signal (RRC) configuration information. Respective SPS indexes have different pieces of RRC configuration information.

nrofHARQ-Processes: the number of configured HARQ processes for SPS;
harq-procID-offset: Offset of HARQ process for SPS;
periodicity: periodicity of configured downlink assignment for SPS.

Reference number 1700 of FIG. 17 shows an example of a method of determining an HARQ process ID in DL SPS based on the same SPS index through [Equation 17-2]. In a slot structure in reference numeral 1700, slots #1, #2, #4, #5, #7, #8, and #9 are downlink slots including downlink symbols, and slots #3, #6, and #10 are uplink slots including uplink symbols. Before the uplink slot, some symbols can be configured as flexible symbols rather than downlink symbols in order to maintain RF switching time between the BS and the UE and uplink/downlink frame arrangement. When a higher configuration is performed such that harq-procID-offset=0, nrofHARQ-Processes=3, periodicity=1 slot, the HARQ process ID is determined for each DL SPS as shown in [Table 13] below. Further, in [Table 13], a situation in which HARQ=ACK information for two or more DL DPSs is included in one PUCCH resource according to the method described with reference to FIG. 16 is considered for convenience of description.

TABLE 13

| DL SPS | HARQ process ID | PUCCH |
|---|---|---|
| 1702 | 1 = ([floor (1/1)] mod 3 + 0) | 1712 |
| 1703 | 2 = ([floor (2/1)] mod 3 + 0) | 1712 |
| 1705 | 1 = ([floor (4/1)] mod 3 + 0) | 1713 |
| 1706 | 2 = ([floor (5/1)] mod 3 + 0) | 1713 |
| 1708 | 1 = ([floor (7/1)] mod 3 + 0) | 1714 |
| 1709 | 2 = ([floor (8/1)] mod 3 + 0) | 1714 |
| 1710 | 0 = ([floor (9/1)] mod 3 + 0) | 1714 |

For DL SPSs having the same HARQ process ID, the UE determines new transmission of different TBs rather than repeated transmission of the same TB on the basis of [Table 13] above. For example, when the UE receives DL SPS 1702 and then receives DL SPS 1705 having the same HARQ process ID, the UE removes the received DL SPS 1702 from a buffer of the UE, store the DL SPS 1705 in the corresponding buffer, and demodulates/decodes the same. When the UE reports NACK in response to the DL SPS 1702, the UE may receive scheduling of retransmission in a DCI format for scheduling downlink data scrambled by a CS-RNTI. The DCI format has the HARQ process ID of 1 like the DL SPS 1702 and an NDI is 1. When a higher configuration is performed such that harq-procID-offset=0, nrofHARQ-Processes=2, periodicity=1 slot, the HARQ process ID is determined for each DL SPS as shown in [Table 14] below. Further, in [Table 14], a situation in which HARQ=ACK information for two or more DL DPSs is included in one PUCCH resource according to the method described with reference to FIG. 16 is considered for convenience of description.

TABLE 14

| DL SPS | HARQ process ID | PUCCH |
|---|---|---|
| 1702 | 1 = ([floor (1/1)] mod 2 + 0) | 1712 |
| 1703 | 0 = ([floor (2/1)] mod 2 + 0) | 1712 |
| 1705 | 1 = ([floor (4/1)] mod 2 + 0) | 1713 |
| 1706 | 0 = ([floor (5/1)] mod 2 + 0) | 1713 |

TABLE 14-continued

| DL SPS | HARQ process ID | PUCCH |
|---|---|---|
| 1708 | 1 = ([floor (7/1)] mod 2 + 0) | 1714 |
| 1709 | 0 = ([floor (8/1)] mod 2 + 0) | 1714 |
| 1710 | 1 = ([floor (9/1)] mod 2 + 0) | 1714 |

While HARQ process IDs of DL SPSs transmitted through the PUCCH are all different in [Table 13], DL SPS 1708 and DL SPS 1710 among HARQ-ACK information transmitted through a PUCCH 1714 include the same HARQ process IDs in [Table 14]. In the light of a configuration of an HARQ-ACK codebook, HARQ-ACK information for the PUCCH 1714 includes [HARQ-ACK for DL SPS 1708, HARQ-ACK for DL SPS 1709, HARQ-ACK for DL SPS 1710], but information on HARQ-ACK for DL SPS 1708 cannot be actually used. Since the DL SPS 1708 and the DL SPS 1710 have the same HARQ process ID, the UE removes data on the received DL SPS 1708 from the buffer when receiving the DL SPS 1710. Accordingly, even though the BS schedules retransmission of the corresponding HARQ process ID, only the DL SPS 1710 can be scheduled since a TB for the DL SPS 1708 does not exist in the UE buffer. A probability that associated DL SPSs within one PUCCH transmission have the same HARQ process IDs may become smaller by increasing the number of nrof-HARQ-Processes in order to solve the problem of the SPS configuration of a single index. However, the UE may receive a plurality of pieces of SPS configuration information within one cell/BWP and perform transmission and reception, and thus a larger problem may occur in a situation like reference numeral 1720 of FIG. 17. A slot structure in reference numeral 1720 is basically the same as that in reference numeral 1700, but two different SPSs are activated. SPS 1722 has a value of index 0 and an SPS period is two slots. SPS 1724 has a value of index 1 and an SPS period is one slot. According to at least one of the methods described with reference to FIG. 16, the HARQ-ACK codebook transmitted in the PUCCH 1747 includes [HARQ-ACK for DL SPS 1732, HARQ-ACK for DL SPS 1737, HARQ-ACK for 1738]. When the SPS 1722 has a configuration of harq-procID-offset=0, nrofHARQ-Processes=2, and periodicity=2 slot and the SPS 1722 has a configuration of harq-procID-offset=1, nrofHARQ-Processes=3, and periodicity=1 slot, the HARQ process ID is determined for each DL SPS as shown in [Table 15] below.

TABLE 15

| DL SPS index | DL SPS | HARQ process ID | PUCCH |
|---|---|---|---|
| 0 | 1732 | 0 = ([floor (1/2)] mod 2 + 0) | 1747 |
| 0 | 1734 | 0 = ([floor (5/2)] mod 2 + 0) | 1748 |
| 0 | 1735 | 1 = ([floor (7/2)] mod 2 + 0) | 1749 |
| 0 | 1736 | 0 = ([floor (9/2)] mod 2 + 0) | 1749 |
| 1 | 1737 | 2 = ([floor (1/1)] mod 3 + 1) | 1747 |
| 1 | 1738 | 3 = ([floor (2/1)] mod 3 + 1) | 1747 |
| 1 | 1740 | 2 = ([floor (4/1)] mod 3 + 1) | 1748 |
| 1 | 1741 | 3 = ([floor (5/1)] mod 3 + 1) | 1748 |
| 1 | 1743 | 2 = ([floor (7/1)] mod 3 + 1) | 1749 |
| 1 | 1744 | 3 = ([floor (8/1)] mod 3 + 1) | 1749 |
| 1 | 1745 | 1 = ([floor (9/1)] mod 3 + 1) | 1749 |

According to [Table 15], DL SPSs 1743, 1744, and 1745 all have different HARQ process IDs in the light of SPS index 1, but the DL SPS 1735 and the DL SPS 1745 have the same process ID when another SPS index 2 is also considered in an HARQ-ACK codebook transmitted through a PUCCH 1749. In other words, the HARQ-ACK codebook transmitted through the PUCCH 1749 is [HARQ-ACK for DL SPSs having index 0, HARQ-ACK for DL SPSs having index 1]=[HARQ-ACK for DL SPS 1735, HARQ-ACK for DL SPS 1736, HARQ-ACK for DL SPS 1743, HARQ-ACK for DL SPS 1744, HARQ-ACK for DL SPS 1745] according to the method described with reference to FIG. 16. However, since the DL SPS 1735 and the DL SPS 1745 have the same HARQ process ID, the UE removes the existing DL SPS 1735 from the buffer when receiving the DL SPS 1745. Accordingly, in spite of retransmission of the DL SPS 1735, the UE cannot perform combining since there is no corresponding TB information. Reference numeral 1720 of FIG. 17 shows a situation in which two SPSs are activated, but a probability that HARQ process IDs are duplicated becomes higher as the number of activated SPSs is larger and a larger number of DL SPSs within the same SPS index are mapped to HARQ-ACK information within the same PUCCH. Further, as the number of HARQ processes supported by the UE in a specific cell, a probability that HARQ process IDs are duplicated becomes higher. In order to solve the problem, at least one of the following methods can be applied by the BS and the UE.

Method 17-1: adds constraints when a higher signal is configured. The number of HARQ processes which can be configured for each DL SPS is limited according to the number of DL SPSs configured for one cell/one BWP. For example, when 8 SPSs are configured, the RRC standard may be limited to have a maximum of two HARQ processes for each SPS. Accordingly, the BS can support the number of HARQ processes that are not duplicated for each SPS index by the HARQ process ID offset values. In generalization thereof, when the number of SPSs configured in one cell/one BWP is x, the number of HARQ processes corresponding to a maximum number of floor (16/x) can be applied for each SPS configuration. In the above equation, 16 may be replaced with another value, and may be configured and determined by another higher signal value.

Method 17-2: limits a maximum number of DL SPSs which can be included in one PUCCH for each SPS. In FIG. 16, for SPSs having the same index in one PUCCH, HARQ-ACK information for two or more DL SPSs is included, and the number of HARQ-ACKs for DL SPSs may vary depending on TDD configuration information in each PUCCH. For example, in reference numeral 1700 of FIG. 17, when the BS limits the number of DL SPSs which can be included in one PUCCH to 2 when the SPSs having a slot period of 1 are configured, DL SPS candidates which can be included in the HARQ-ACK codebook to be transmitted through the PUCCH 1714 are two DL SPSs among DL SPSs 1708, 1709, and 1710. In the light of time or HARQ process ID, DL SPSs to be included in the HARQ-ACK codebook are determined in an ascending order or a descending order. In the case of an ascending order in terms of time, the DL SPSs 1708 and 1709 are included in the HARQ-ACK codebook to be transmitted through the PUCCH 1714 and the UE does not receive the DL SPS 1710 and does not include the corresponding DL SPS in the HARQ-ACK codebook even though the UE can receive the same in terms of resources. [pseudo code 17-1] considering the same is described below. This is only an example, and a descending order can be sufficiently considered.

[pseudo code 17-1]

Set $N_c^{DL}$ to the number of DL or flexible slots for SPS PDSCH reception on
serving cell c with HARQ-ACK information multiplexed on the i-th PUCCH in where SPS
PDSCH has been received within [n0, n1] slots. n0 is the slot index of (m1-k1-k+1) and n1 is
the
slot index of (m1-k1) where m1 is the slot index for i-th PUCCH, k1 is the PDSCH-to-HARQ-
ACK timing indicator, and k is slot offset between (i-1)-th PUCCH and i-th PUCCH.
  Set j=0 - HARQ-ACK information bit index
  Set c=0 - serving cell index: lower indexes correspond to lower RRC indexes
of corresponding cell
  while $c<N_{cells}^{DL}$
    Set s=0 - SPS PDSCH configuration index: lower indexes correspond to lower
RRC indexes of corresponding SPS configurations
    while $s<N_c^{SPS}$
      Set $N_{max}$= Maximum number of slots per SPS PDSCH configuration
        if $N_c^{DL}>N_{max}$
      $N_c^{DL} = N_{max}$
      end if
        Set $n_D$=0 - slot index
      while $n_D<N_c^{DL}$
        if UE receives SPS PDSCH in slot $n_D$ for SPS PDSCH
configuration s on serving cell c
      $\tilde{o}_j^{ACK}$ = HARQ-ACK information bit for this SPS PDSCH reception
      j = j + 1;
        Otherwise,
          $\tilde{o}_j^{ACK}$ = NACK
          j = j + 1;
      end if
        $n_D = n_D + 1$;
      end while
      s = s + 1;
    end while
    c = c + 1;
  end while Method 17-3: limits a maximum number of DL SPSs which can be included in one PUCCH for all activated DL SPSs. While method 17-2 limits the number of DL SPSs which can be included in one PUCCH for each SPS index, method 17-3 considers all of the DL SPSs included in one PUCCH regardless of an SPS index and determines that only a DL SPS transmitted/received first (or last) in chronological order among DL SPSs duplicated in terms of the HARQ process ID is transmitted/received by the BS and the UE, and the UE does not include HARQ-ACK information for DL SPSs which are not transmitted/received in the HARQ-ACK codebook. Alternatively, all of the DL SPSs included in one PUCCH are considered regardless of the SPS index, and it is determined that only a DL SPS associated with an SPS having the smallest SPS index (or the largest SPS index) among DL SPSs duplicated in terms of HARQ process ID is transmitted/received by the BS and the UE, and the UE does not include HARQ-ACK information for DL SPSs which are not transmitted/received in the HARQ-ACK codebook. Alternatively, HARQ-ACK information for DL SPSs which are not transmitted/received is included in the HARQ-ACK information but NACK information can be mapped.

Method 17-4: the BS and the UE consider that all DL SPSs having the same HARQ process ID among DL SPSs associated with the HARQ-ACK codebook included in one PUCCH transmission transmit and receive the same TB. For example, in reference numeral 1700 of FIG. 17, when the DL SPS 1708 and the DL SPS 1710 have the same HARQ process ID in HARQ-ACK information transmitted through the PUCCH 1714, the UE determines that TBs transmitted and received in the DL SPS 1708 and the DL SPS 1710 are the same as each other. This may be limited and applied to transmission of DL SPSs transmitted and received within the same SPS index. Alternatively, this may be commonly applied to DL SPSs transmitted and received regardless of the SPS index within one cell/ one BWP. At this time, one of the methods of configuring the HARQ-ACK codebook by the UE, such as methods 17-1, 17-2, and 17-3 may be performed or the HARQ-ACK codebook configuration described with reference to FIG. 16 may be performed.

Method 17-5: reconfigures HARQ process IDs for DL SPS sets transmitted through one PUCCH. [Equation 17-1] and [Equation 17-2] above determine the HARQ process ID in consideration of a higher configuration of nrofHARQ-Processes and periodicity configured on the basis of a slot index for transmission and reception of DL SPS without considering PUCCH resources for DL SPS. [Equation 17-2] determines the HARQ process ID additionally considering harq-procID-offset. The HARQ process ID is one DL SPS configuration reference and thus there is no determination of the HARQ process ID for another DL SPS configuration. Accordingly, when there are a plurality of DL SPSs and HARQ-ACK information for a plurality of DL SPS PDSCHs is included in one PUCCH for one DL SPS configuration as illustrated in FIG. 17, it is required to consider a new equation considering the same as well as [Equation 17-1] or [Equation 17-2]. [pseudo code 17-2] provides HARQ process IDs for DL SPS PDSCHs included in the PUCCH.

[pseudo code 17-2]

Step 1) determines a DL SPS set allocated to PUCCH i
Step 2) chronologically allocates an HARQ process ID for each DL SPS

[pseudo code 17-2] is a method of allocating the HARQ process ID for each PUCCH resource. In an example of FIG. 17, sets of DL SPS PDSCHs for transmitting HARQ-ACK information in the PUCCH 1747 are 1732, 1737, and 1738. Accordingly, the UE can chronologically allocate HARQ process ID 1 to 1737, HARQ process ID 2 to 1732, and HARQ process ID 3 to 1738. Further, sets of DL SPS PDSCHs for transmitting HARQ-ACK information in the PUCCH 1748 are 1734, 1740, and 1741. Accordingly, the UE can chronologically allocate HARQ process ID 1 to 1741, HARQ process ID 2 to 1734, and HARQ process ID 3 to 1740. Further, sets of DL SPS PDSCHs for transmitting HARQ-ACK information in the PUCCH 1749 are 1735, 1736, 1743, 1744, and 1745. Accordingly, the UE can chronologically allocate HARQ process ID 1 to 1743, HARQ process ID 2 to 1735, HARQ process ID 3 to 1744, HARQ process ID 4 to 1745, and HARQ process ID 5 to 1736. While [pseudo code 17-2] calculates DL SPS sets for one PUCCH resource, the DL SPS sets can be calculated for a plurality of PUCCH resources. [pseudo code 17-3] is a method of determining HARQ process IDs considering the same.

---

[pseudo code 17-3]

Step 1) determines DL SPS sets allocated to PUCCH i,i+1,...,i+k
Step 2) chronologically allocates an HARQ process ID for each DL SPS

---

[pseudo code 17-3] is a method of simultaneously determining HARQ process IDs of DL SPSs included in a plurality of PUCCHs, and FIG. 17 is described as an example thereof. For example, in the case of k=1, all DL SPS sets associated with the PUCCHs 1747 and 1748 are considered, and sets of DL SPS PDSCHs correspond to 1732, 1734, 1737, 1738, 1740, and 1741. Accordingly, the UE can chronologically allocate HARQ process ID 1 to 1737, HARQ process ID 2 to 1732, HARQ process ID 3 to 1738, HARQ process ID 4 to 1740, HARQ process ID 51 to 1741, and HARQ process ID 6 to 1734.

[pseudo code 17-2] and [pseudo code 17-3] are methods of chronologically allocating HARQ process IDs in consideration of all pieces of DL SPS configuration information as one DL SPS configuration regardless of DL SPS index. Other available methods allocate the HARQ process ID for each low or high DL SPS index. [pseudo code 17-4] is a method transformed from [pseudo code 17-2] considering the part.

In a description of [pseudo code 17-4] as the example of FIG. 17, sets of DSL SPS PDSCHs for transmitting HARQ-ACK information in the PUCCH 1747 are 1732, 1737, and 1738. 1732 belongs to a DL SPS index 1722, and 1737 and 1738 belong to a DL SPS index 1724. When the DL SPS index 1722 is smaller than the DL SPS index 1724, the UE can allocate HARQ process ID 1 to 1732, HARQ process ID 2 to 1737, and HARQ process ID 3 to 1738 in consideration of the DL SPS index and time order. Further, sets of DL SPS PDSCHs for transmitting HARQ-ACK information in the PUCCH 1748 are 1734, 1740, and 1741, 1734 belongs to the DL SPS index 1722, and 1740 and 1741 belong to the DL SPS index 1724. Accordingly, the UE can chronologically allocate HARQ process ID 1 to 1734, HARQ process ID 2 to 1740, and HARQ process ID 3 to 1741 in consideration of the DL SPS index and the time order. Sets of DL SPS PDSCHs for transmitting HARQ-ACK information in the PUCCH 1749 are 1735, 1736, 1743, 1744, and 1745, 1735 and 1736 belong to the DL SPS index 1722, and 1743, 1744, and 1745 belong to the DL SPS index 1724. Accordingly, the UE can allocate HARQ process ID 1 to 1735, HARQ process ID 2 to 1736, HARQ process ID 3 to 1743, HARQ process ID 4 to 1744, and HARQ process ID 5 to 1745 in consideration of the DL SPS index and the time order.

[pseudo code 17-5] is a combination of [pseudo code 17-4] and [pseudo code 17-3]. That is, it is a scheme for chronologically allocating the HARQ process ID for each DL SPS index with respect to a plurality of PUCCHs.

---

[pseudo code 17-5]

Step 1) determines DL SPS indexes allocated to PUCCH i, PUCCH i+1,... ,PUCCH i+k and a DL SPS set for each DL SPS index
Step 2) allocates an HARQ process ID for each DL SPS chronologically from the lowest DL SPS index
Step 3) for the next highest DL SPS index, chronologically allocates and repeats the HARQ process ID for each DL SPS

---

[pseudo code 17-5] is described as the example of FIG. 17. For example, in the case of k=1, all DL SPS sets associated with the PUCCHs 1747 and 1748 are considered, and sets of DL SPS PDSCHs correspond to 1732, 1734, 1737, 1738, 1740, and 1741. The DL SPS index 1722 corresponds to 1732 and 1734, and the DL SPS index 1724 corresponds to 1737, 1738, 1740, and 1741. Accordingly, the UE can allocate HARQ process ID 1 to 1732, HARQ process ID 2 to 1734, HARQ process ID 3 to 1737, HARQ process ID 4 to 1738, HARQ process ID 5 to 1740, and HARQ process ID 6 to 1741 in consideration of the DL SPS index and the time order.

In [pseudo code 17-4] and [pseudo code 17-5], the HARQ process IDs are determined sequentially from the lowest DL SPS index to the highest DL SPS index, but the HARQ process IDs can be inversely determined sequentially from the highest DL SPS index to the lowest DL SPS index. In [pseudo code 17-2], [pseudo code 17-3], [pseudo code

---

[pseudo code 17-4]

Step 1) determines DL SPS index allocated to PUCCH i and a DL SPS set for each DL SPS index
Step 2) allocates an HARQ process ID for each DL SPS chronologically from the lowest DL SPS index
Step 3) for the next highest DL SPS index, chronologically allocates and repeats the HARQ process ID for each DL SPS 17-4], and [pseudo code 17-5], when the HARQ process IDs are determined, the HARQ process IDs are chronologically determined in the order of DL SPSs from the first transmitted/received DL SPS to the last transmitted/received DL SPS, but the HARQ process IDs can be sufficiently determined in the inverse order of DL SPSs from the last transmitted/received DL SPS to the just previous transmitted/received DL SPS.

Method 17-6: corresponds to transformation of method 17-4. While the BS and the UE consider that all DL SPSs having the same HARQ process ID among DL SPS associated with the HARQ-ACK codebook included in one UPCCH transmission transmit and receive the same TB in method 17-4, the UE may receive only a chronologically first existing DL SPS or a DL SPS having the lowest index value among DL SPSs having the same HARQ process in method 17-6. In a description of the example of FIG. 17, when HARQ process IDs of 1732 and 1738 are the same among DL SPSs 1732, 1737, and 1738 included in the PUCCH 1747, the UE receives only one SPS PDSCH among 1732 and 1737. Specifically, the UE can receive only the DL SPS 1732 having a lower DL SPS index or receive the DL SPS 1737 which chronologically first exists. For the SPS PDSCH which has not been received, the BS may not actually transmit the corresponding resource. Accordingly, the UE does not transmit HARQ-ACK information for the SPS PDSCH which has not been received.

Figure 18:
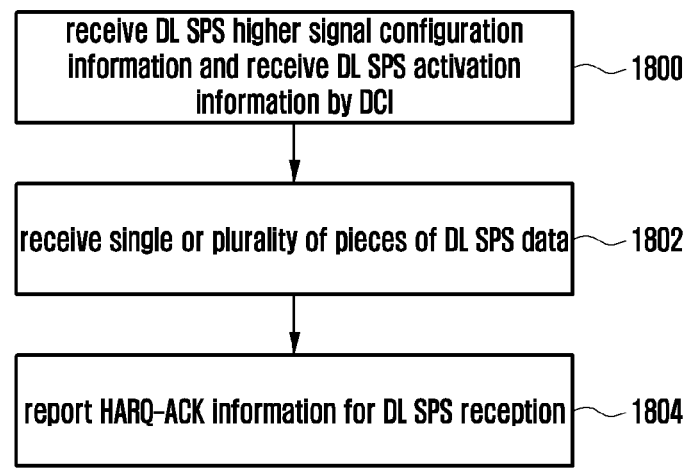
FIG. 18 is a block diagram illustrating an HARQ-ACK information report by the UE according to DL SPS transmission/reception.

FIG. 18 is a block diagram illustrating an HARQ-ACK information report by the UE according to DL SPS transmission/reception.

The UE may first receive one or more pieces of DL SPS configuration information for one cell/one BWP and separately receive DCI for activating DL SPS in operation 1800. Thereafter, the UE transmits and receives data through a single or a plurality of activated DL SPS in operation 1802. The UE reports HARQ-ACK information for DL SPS reception according to the method described in FIGS. 16 to 18 in operation 1804.

Figure 19:
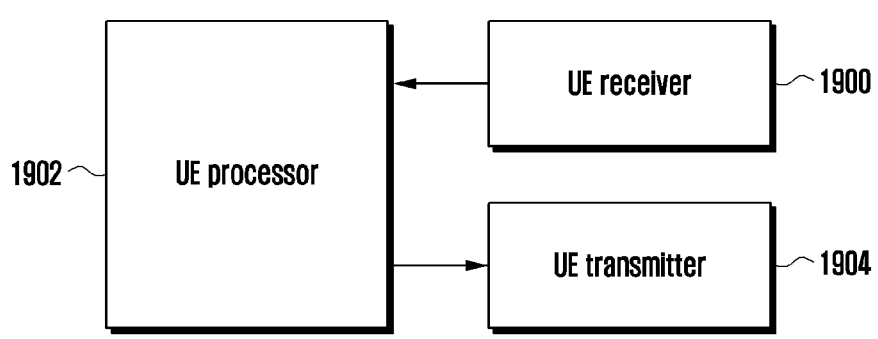
FIG. 19 is a block diagram illustrating a structure of the UE capable of implementing embodiments of the disclosure.

FIG. 19 is a block diagram illustrating a structure of the UE capable of implementing embodiments of the disclosure.

Referring to FIG. 19, the UE according to the disclosure may include a UE receiver 1900, a UE transmitter 1904, and a UE processor 1902. The UE receiver 1900 and the UE transmitter 1904 are commonly called a transceiver in an embodiment. The transceiver may transmit and receive a signal to and from the BS. The signal may include control information and data. To this end, the transceiver may include an RF transmitter that up-converts and amplifies the frequency of a transmitted signal, an RF receiver that low-noise amplifies a received signal and down-converts the frequency, and the like. Further, the transceiver may receive a signal through a radio channel, output the signal to the UE processor 1902, and transmit the signal output from the UE processor 1902 through the radio channel. The UE processor 1902 may control a series of processes so that the UE can operate according to the embodiments.

Figure 20:
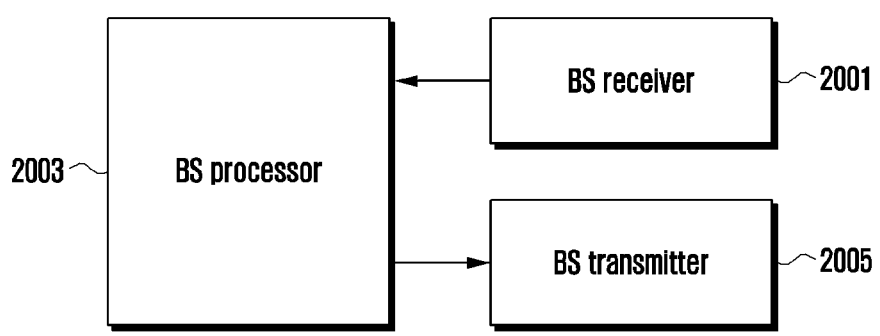
FIG. 20 is a block diagram illustrating a structure of the BS capable of implementing embodiments of the disclosure.

FIG. 20 is a block diagram illustrating a structure of the BS capable of implementing embodiments of the disclosure.

Referring to FIG. 20, in an embodiment, the BS may include at least one of a BS receiver 2001, a BS transmitter 2005, and a BS processor 2003. The BS receiver 2001 and the BS transmitter 2005 are commonly called a transceiver in embodiments of the disclosure. The transceiver may transmit and receive a signal to/from the UE. The signal may include control information and data. To this end, the transceiver includes an RF transmitter that up-converts and amplifies a frequency of a transmitted signal, an RF receiver that low-noise amplifies a received signal and down-converts the frequency, and the like. Further, the transceiver may receive a signal through a radio channel, output the signal to the UE processor 2003, and transmit the signal output from the UE processor 2003 through a radio channel. The BS processor 2003 may control a series of processes so that the BS can operate according to the above-described embodiments of the disclosure.

Figure 21:
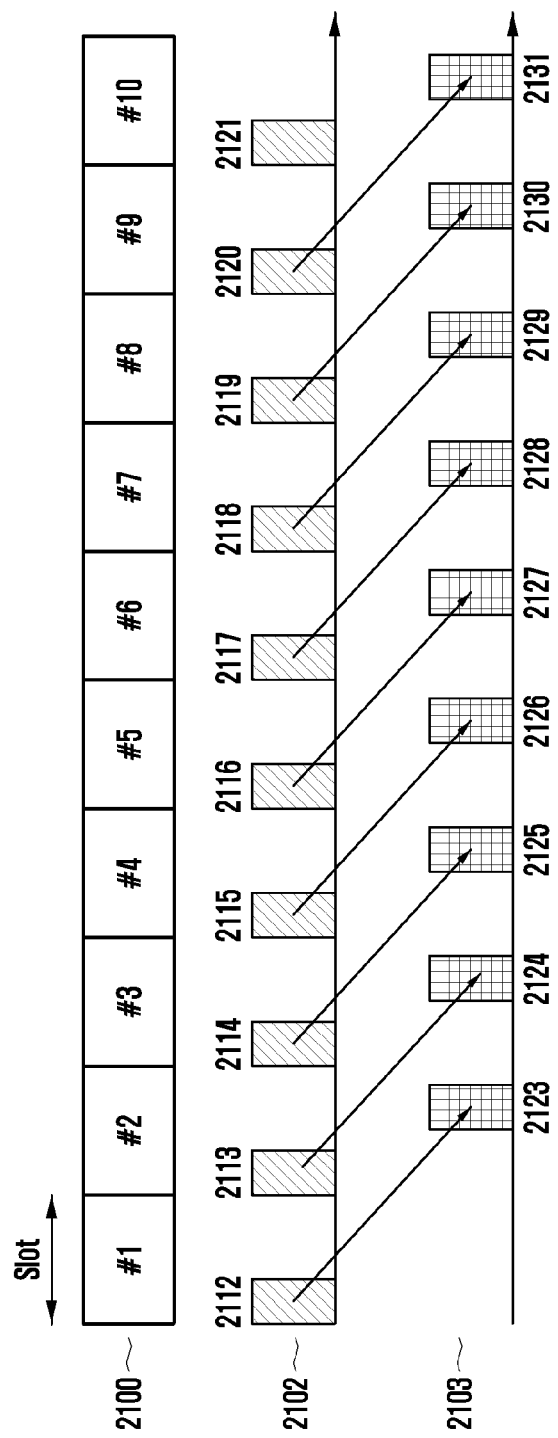
FIG. 21 illustrates HARQ-ACK transmission/reception for DL SPS reception according to an embodiment.

FIG. 21 illustrates HARQ-ACK transmission/reception for DL SPS reception according to an embodiment.

As described above, the DL SPS means repetitive transmission/reception of the same time and frequency resources according to a specific period. The time and frequency resources may be indicated through a time resource allocation field and a frequency resource allocation field within a DCI format for activating DL SPS. The period information may be configured through a higher signal. FIG. 21 shows a situation in which DL SPS is configured as one slot period. For convenience of description, reference numeral 2112 is SPS PDSCH 1, reference numeral 2113 is SPS PDSCH 2, reference numeral 2114 is SPS PDSCH 3, reference numeral 2115 is SPS PDSCH 4, reference numeral 2116 is SPS PDSCH 5, reference numeral 2117 is SPS PDSCH 6, reference numeral 2118 is SPS PDSCH 7, reference numeral 2119 is SPS PDSCH 8, reference numeral 2120 is SPS PDSCH 9, and reference numeral 2121 is SPS PDSCH 10.

A slot in which a PUCCH including HARQ information (ACK or NACK) for each of SPS PDSCHs 1 to 10 is indicated through 'PDSCH-to-HARQ-ACK feedback timing (k1)' information within the DCI format for activating the DL SPS. A unit of k1 may be a subslot configured in units smaller than a slot or 14 symbols. FIG. 21 shows a situation in which k1 is indicated as one slot. HARQ-ACK information for SPS PDSCH 1 2112 transmitted/received in slot #1 2100 is transmitted/received in a PUCCH 2123 of slot #2, HARQ-ACK information for SPS PDSCH 2 2113 transmitted/received in slot #2 is transmitted/received in a PUCCH 2124 of slot #3, HARQ-ACK information for SPS PDSCH 3 2114 transmitted/received in slot #3 is transmitted/received in a PUCCH 2125 of slot #4, and HARQ-ACK information for SPS PDSCH X transmitted/received in slot #X in such a manner is transmitted/received in a PUCCH of slot #(X+1). X+1 is an example in the case in which K1 is indicated as 1, and X+1 may be X+N if K1 is N.

The PUCCH including HARQ-ACK information within a slot indicated to transmit HARQ-ACK information may be pre-configured through a higher signal, and the signal may include time and frequency resources of the PUCCH and PUCCH format information. When the PUCCH overlaps another PUSCH, HARQ-ACK information included in the PUCCH may be included in the PUSCH and transmitted from the UE to the BS.

The above description of FIG. 21 can be applied to a situation in which a frequency band in which the SPS PDSCH is transmitted/received is different from a frequency band in which the PUCCH including HARQ-ACK information. This is called a frequency division duplex (FDD) system. Accordingly, the SPS PDSCH or the PUCCH including HARQ-ACK information therefor has little chance of being dropped (or canceled) by another specific signal. Drop (or cancel) means that the UE transmits or receives no data. The drop (or cancel) may be indicated by a higher signal or an L1 signal. For example, when L1 signal (for example, slot format indicator) information indicates a symbol which is not a downlink symbol (uplink symbol or flexible symbol) in some symbols of the corresponding resources in the resource areas for receiving the SPS PDSCH, the UE does not receive the corresponding SPS PDSCH. Similarly, when L1 signal information in the resource areas for transmitting the PUCCH (or PUCCH configured by a higher signal) for the SPS PDSCH indicates a symbol which is not an uplink symbol (downlink symbol or flexible symbol) in some symbols of the corresponding resources, the UE does not transmit the corresponding PUCCH. Specifically, the UE may transmit or may not transmit the PUCCH included in a predetermined interval right after a time point at which the L1 signal is received and does not transmit the PUCCH after a predetermined interval right after the time point at which the L1 signal is received.

In a time division duplex (TDD) system, when the SPS PDSCH is periodically configured but there is the possibility that the SPS PDSCH is dropped by another higher signal or the L1 signal, there is also the possibility that the PUCCH including HARQ-ACK information is dropped by another higher signal or the L1 signal. Accordingly, when both the SPS PDSCH and the PUCCH including HARQ-ACK information corresponding thereto are dropped, there is no big problem in the light of the BS and the UE. This is because there is no data transmitted and received therebetween.

Meanwhile, when the SPS PDSCH is dropped but the PUCCH including HARQ-ACK information is not dropped, it may be sensible not to transmit the corresponding PUCCH. This is because the UE has received no data and thus will transmit NACK and the BS is aware of a data reception state of the UE even though the PUCCH is not transmitted. Accordingly, the UE can obtain a power consumption gain by transmitting no PUCCH.

Further, when the SPS PDSCH is not dropped but the PUCCH including HARQ-ACK information is dropped, the UE receives data included in the SPS PDSCH but has no chance to transmit HARQ-ACK information therefor. Accordingly, the UE may not receive the SPS PDSCH, and the BS cannot receive HARQ-ACK and thus may not transmit the SPS PDSCH to the UE. Alternatively, the SPS PDSCH is transmitted, but the PUCCH including HARQ-ACK information can be received in a resource other than the conventionally dropped resource.

In an example of FIG. 21, when the PUCCH 2123 including HARQ-ACK information for SPS PDSCH 1 2112 is dropped, the UE may insert the HARQ-ACK information for SPS PDSCH 1 2112 into the PUCCH 2124 which is a non-dropped PUCCH resource thereafter to transmit the same. At this time, the PUCCH 2124 may include HARQ-ACK information for both SPS PDSCH 1 2112 and SPS PDSCH 2 2113. Such a scheme may be called an HARQ-ACK shift method, a group SPS PDSCH HARQ-ACK report method, or the like. In the disclosure, for convenience of description, it is called a shift method. The shift method may be configured by a higher signal or an L1 signal, and information informing of whether the corresponding SPS supports the shift method may be included in the SPS configuration. When the shift method is supported, the UE determines which PUCCHs are dropped and not dropped on the basis of at least one piece of the following information and determines an SPS PDSCH of which HARQ-ACK information is to be included in the non-dropped PUCCH.

TDD configuration information indicated by a higher signal (tdd-UL-DL-ConfigurationCommon or tdd-UL-DL-ConfigurationDedicated)
 TDD configuration information indicated by an L1 signal (DCI format 2_0, slot format indicator)
 K1 information (PDSCH-to-HARQ-ACK feedback timing)
 SPS period information
 Time and frequency resource information The UE may determine that a PUCCH resource for the SPS PDSCH including only uplink symbols indicated by TDD configuration information indicated through a higher signal is not dropped. The reason is that the uplink symbol cannot be changed to a flexible symbol or a downlink symbol and thus the PUCCH can be always transmitted. Alternatively, the UE may determine that a PUCCH resource for the SPS PDSCH including uplink symbols or flexible symbols indicated by TDD configuration information indicated through a higher signal is not dropped, and the reason is that the uplink symbol and the flexible symbol can be applied for PUCCH transmission. Alternatively, when at least one symbol of the PUCCH resource for the SPS PDSCH is indicated as downlink symbols according to TDD configuration information indicated by a higher signal, the UE may determine that the PUCCH for the corresponding SPS PDSCH is dropped, and the reason is that the UE cannot transmit uplink information in a resource area indicated by the downlink symbol. Alternatively, when at least one symbol of the PUCCH resource for the SPS PDSCH is indicated as downlink symbols according to TDD configuration information indicated by a higher signal, the UE may determine that the PUCCH for the corresponding SPS PDSCH is dropped, and the reason is that the UE cannot transmit uplink information in a resource area indicated by the downlink symbol. Alternatively, when at least one symbol of the PUCCH resource for the SPS PDSCH is indicated as downlink symbols or flexible symbols according to TDD configuration information indicated by a higher signal, the UE may determine that the PUCCH for the corresponding SPS PDSCH is dropped, and the reason is that the flexible symbols can be indicated as the downlink symbol by another L1 signal, and at this time, the UE cannot transmit the PUCCH. In another reason is that, when the resource area to which the PUCCH for the SPS PDSCH belongs is indicated in advance as the flexible symbol by a higher signal in a situation in which the UE monitors DCI format 2_0, the UE cannot perform the corresponding PUCCH transmission even when the UE does not monitor DCI format 2_0. When the shift method is applied thereto, a valid PUCCH resource configuration for the SPS PDSCH that the UE and the BS understand may be different, which causes a different determination of an SPS PDSCH set configuration included for each PUCCH.

For example, in FIG. 21, when the PUCCH 2123, the PUCCH 2127, and the PUCCH 2131 are all resources indicated by the uplink symbol according to TDD configuration information indicated by a higher signal and the other PUCCHs are resources in which at least one symbol is indicated as downlink symbols or flexible symbols according to TDD configuration information indicated by a higher signal, the UE may determine that the PUCCH 2123, the PUCCH 2127, and the PUCCH 2131 are dropped and the other PUCCHs are not dropped in a situation in which the shift method for the PUCCH 2123, the PUCCH 2127, and the PUCCH 2131 is configured. When the shift method is configured, the UE may map and transmit HARQ-ACK feedback for SPS PDSCHs only in the PUCCH 2123, the PUCCH 2127, and the PUCCH 2131, and HARQ-ACK feedback information of the SPS PDSCHs included in the PUCCHs may be determined by at least one of an SPS transmission period, K1, and TDD configuration information indicated by a higher signal.

In FIG. 21, when a K1 value is one slot, and an SPS transmission period is one slot, and all of the resources of SPS PDSCHs are configured as downlink symbols or flexible symbols according to TDD configuration information indicated by a higher signal, the PUCCH 2123 may include HARQ-ACK feedback information for SPS PDSCH 1, the PUCCH 2127 may include HARQ-ACK feedback information for SPS PDSCH 2, SPS PDSCH 3, SPS PDSCH 4, and SPS PDSCH 5, and the PUCCH 2131 may include HARQ-ACK feedback information for SPS PDSCH 6, SPS PDSCH 7, SPS PDSCH 8, and SPS PDSCH 9. In generalization thereof, HARQ-ACK feedback resources included in specific PUCCH i may be for SPS PDSCHs received in {(Nd−Nd_offset−k1+1)~(Nd−k1)} slots. At this time, respective parameters are described below, and PUCCH i−1 means a PUCCH resource which is not dropped right before PUCCH i.

Nd+PUCCH i slot

Nd_offset=difference between PUCCH i slot and PUCCH i−1 slot

K1=PDSCH to HARQ-ACK feedback timing

In an example of FIG. 21, in a situation in which a slot of the PUCCH 2127 is #6 and a slot of a PUCCH which is not dropped right before #6 is #2, Nd_offset is 4 and K1 is one slot, and thus the UE may include HARQ-ACK feedback information for SPS PDSCHs received in slots #(2=6−4−1+1) to #(5=6−1). When SPS PDSCH 2 has at least one symbol which is uplink symbols according to TDD configuration information indicated by a higher signal, the UE may not include HARQ-ACK feedback for SPS PDSCH 3 in the PUCCH 2127, which may be applied in common regardless of whether or not shift information is configured.

When the shift method is not configured and all symbols in all SPS PDSCHs are downlink or flexible symbols according to TDD configuration information indicated by a higher signal, the UE may include HARQ-ACK feedback information for SPS PDSCH 1 in the PUCCH 2123, HARQ-ACK feedback information for SPS PDSCH 2 in the PUCCH 2124, HARQ-ACK feedback information for SPS PDSCH 3 in the PUCCH 2125, HARQ-ACK feedback information for SPS PDSCH 4 in the PUCCH 2126, HARQ-ACK feedback information for SPS PDSCH 5 in the PUCCH 2127, HARQ-ACK feedback information for SPS PDSCH 6 in the PUCCH 2128, HARQ-ACK feedback information for SPS PDSCH 7 in the PUCCH 2129, HARQ-ACK feedback information for SPS PDSCH 8 in the PUCCH 2130, and HARQ-ACK feedback information for SPS PDSCH 9 in the PUCCH 2131 regardless of PUCCH drop.

When at least one symbol of a specific SPS PDSCH resource among periodically transmitted and received SPS PDSCHs is indicated as uplink symbols according to TDD configuration information indicated by a higher signal, the UE does not receive the corresponding SPS PDSCH and also does not generate HARQ-ACK feedback information corresponding thereto.

In another example, the UE can receive an indication of a plurality of K1 values when the SPS PDSCH operates. For the plurality of K1 values, sets of plurality of K1 values may be indicated by an L1 signal or one K1 value indicated by an L1 signal and K1 offset values indicated in advance by a higher signal may be configured as sets of a plurality of K1 values. In the former, a K1 field included in DCI field indicating SPS PDSCH activation can indicate information such as {k1, k2, k3}, and a first K1 value (k1) may be used as a value of the K1 field in the case of DCI for dynamic scheduling (or DCI scrambled by a C-RNTI) and it may be considered that values of {k1, k2, k3} are applied to the SPS PDSCH in the case of DCI indicating SPS PDSCH activation (or DCI scrambled by a CS-RNTI and DCI having a specific NDI, RV, or HARQ process number as described above). In the latter, when only one value of k1 is received for DCI but information of {k1', k2', k3'} is configured by a higher signal, the UE may simultaneously apply k1 and {k1', k2', k3'} indicated by the higher signal and consider that {k1+k1', k1+k2', k1+k3'} are applied. In both the former and the latter, HARQ-ACK feedback for one SPS PDSCH can be transmitted by a plurality of PUCCHs, and a PUCCH including HARQ-ACK feedback for the actual SPS PDSCH is a PUCCH first existing among PUCCHs having at least one symbol which is not indicated as downlink symbols or flexible symbols according to TDD configuration information indicated by a higher signal among the PUCCHs indicated by a plurality of k1 values.

In an example of FIG. 21, in situation in which the k1 value is configured as {1,2,3}, HARQ-ACK information for SPS PDSCH 1 may be included in the PUCCH 2123, the PUCCH 2124, and the PUCCH 2125. When at least one symbol is indicated as downlink symbols or flexible symbol in the PUCCH 2123 according to higher signal TDD configuration information and all symbols are indicated as uplink symbols in the PUCCH 2124 and the PUCCH 2125, the UE may include corresponding information in the PUCCH 2124. Such a method is called a second shift method. One of the shift method and the second shift method may be configured in advance by a higher signal. Alternatively, in the second shift method, a specific k1 value may mean the shift method. For example, {2,−1} is indicated, the UE may consider that −1 means the shift method and determine that a value of {2} is the k1 value. When a k1 set having no −1 is configured, the UE may determine that the second shift method is applied. −1 is only an example, and other values may be used.

The shift method may be described in [pseudo code 20-1] of [Table 16] below.

TABLE 16

Set $N_{cells}^{DL}$ to the number of serving cells configured to the UE
Set $N_c^{SPS}$ to the number of SPS PDSCH configuration configured to the UE for serving cell c
Set $N_c^{DL}$ to the number of DL slots for SPS PDSCH reception on serving cell c with HARQ-ACK information multiplexed on the PUCCH if "shift" is not provided, i-th PUCCH based on k1 and the (i-1)-th PUCCH which is available PUCCH resource to transmit HARQ-ACK feedback right before the i-th PUCCH if "shift" is provided,
Set j = O - HARQ-ACK information bit index
Set c = O - serving cell index: lower indexes correspond to lower RRC indexes of corresponding cell
while c < $N_{cells}^{DL}$
Set s = O - SPS PDSCH configuration index: lower indexes correspond to lower RRC indexes of corresponding SPS configurations

TABLE 16-continued

```
    while s < N_c^SPS
       Set n_D = O - slot index
          while n_D < N_c^DL
             if {
                a UE is configured to receive SPS PDSCHs from slot n_D - N_PDSCH^repeat + 1 to
slot
n_D for SPS PDSCH configuration s on serving cell c, excluding SPS PDSCHs that are
not required to be received in any slot among overlapping SPS PDSCHs, if any according
to [6, TS 38.214], or based on a UE capability for a number of PDSCH receptions in a
slot according to [6, TS 38.214], or due to overlapping with a set of symbols indicated as
uplink by tdd-UL-DL-ConfigurationCommon or by tdd-UL-DL-ConfigurationDedicated
where N_PDSCH^repeat is provided by pdsch-AggregationFactor in sps-Config or, if pdsch-
AggregationFactor is not included in sps-Config, in pdsch-config, and
                HARQ-ACK information for the SPS PDSCH is associated with the PUCCH
    }
          õ_j^ACK = HARQ-ACK information bit for this SPS PDSCH reception
          j = j + 1;
       end if
          n_D = n_D + 1;
       end while
       s = s + 1;
    end while
    c = c + 1;
end while
```

Figure 22:
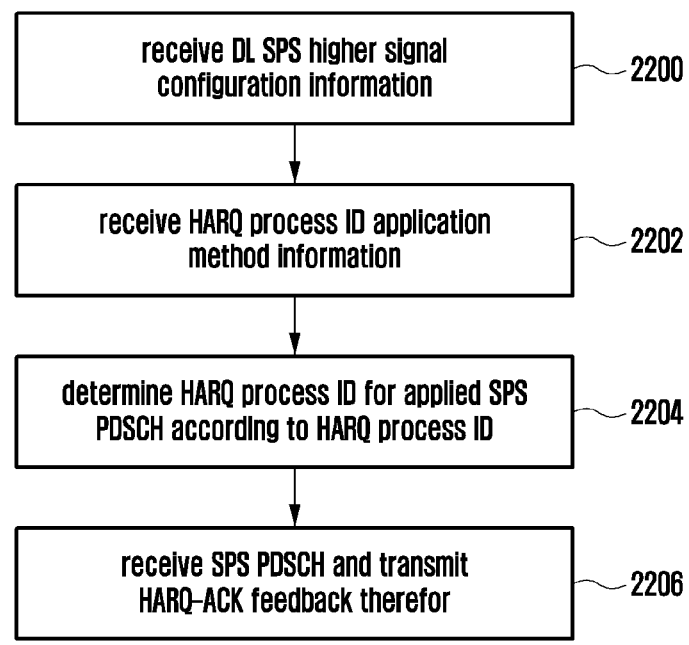
FIG. 22 is a flowchart illustrating an operation of the UE according to an embodiment.

FIG. 22 is a flowchart illustrating an operation of the UE according to an embodiment.

The UE receives higher configuration information for DL SPS from the BS as described above in the disclosure in operation 2200. The higher configuration information may be a DL SPS transmission period, PUCCH resources including HARQ-ACK information, and an MCS table information. The UE receives method information for determining an HARQ process ID for the SPS PDSCH in operation 2202. The corresponding information may be higher signal information such as DL SPS, higher signal information separated therefrom, or information included in DCI for activating DL SPS. Specifically, the corresponding information may be information that may correspond to all DL SPSs within a BWP in common when the corresponding information is associated with a BWP configuration, and may be information that may be applied for each DL SPS within the BWP when the corresponding information is associated with a DL SPS configuration. Further, the corresponding information may be information informing of a specific one equation among [Equation 17-1] to [Equation 17-6] above to determine the HARQ process ID in FIG. 17. The corresponding information may further include information informing that one of method 17-1 to method 17-6 is applied in FIG. 17. The corresponding information is not limited to FIG. 17 and can inform of information of the method of determining the HARQ process ID in the disclosure. The UE determines the HARQ process ID for the SPS PDSCH on the basis of the method information for determining the HARQ process ID in operation 2204 and receives DL SPS and reports HARQ-ACK feedback therefor in operation 2206 after DL SPSs are activated.

For example, when the UE receives a configuration of a plurality of DL SPSs and then receives information indicating that HARQ process IDs of the configured DL SPSs are determined according to [Equation 17-3], the UE determines HARQ process IDs of the plurality of DL SPSs according to [Equation 17-3], and receives DL SPS and reports HARQ-ACK feedback to the BS after the DL SPSs are activated.

In another example, when the UE receives a configuration of a plurality of DL SPSs and then receives information indicating that HARQ process IDs of the configured DL SPSs are determined according to [Equation 17-1], the UE determines HARQ process IDs of the plurality of DL SPSs according to [Equation 17-1], and receives DL SPS and reports HARQ-ACK feedback to the BS after the DL SPSs are activated.

In another example, when configuring a plurality of DL SPSs, the UE can receive information of a method of determining HARQ process IDs of the DL SPSs. In a situation in which three DL SPSs are configured, when DL SPS index 1 is configured as [Equation 17-1], DL SPS index 2 is configured as [Equation 17-2], and DL SPS index 3 is configured as [Equation 17-3], the UE determines the HARQ process ID for DL SPS index 1 according to [Equation 17-1] and determines the HARQ process ID for DL SPS indexes 2 and 3 according to [Equation 17-3]. After activation of DL SPSs, the UE receives the DL SPSs and reports HARQ-ACK feedback therefor to the BS.

In another example, the UE may user different methods to determine the HARQ process ID according to an HARQ-ACK information transmission scheme for DL SPSs. For one DL SPS index, when there is an individual resource for transmitting HARQ-ACK information for individual DL SPS, the UE determines the HARQ process ID by applying one of [Equation 17-1] or [Equation 17-2]. For one DL SPS index, when there are common resources for transmitting HARQ-ACK information for a plurality of DL SPSs, the UE determines the HARQ process ID by applying one of [Equation 17-3] and [Equation 17-6]. After activation of DL SPSs, the UE receives the DL SPSs and reports HARQ-ACK feedback therefor to the BS. The scheme can be applied to individual DL SPS or to two or more DL SPSs.

In another example, as DCI information activated for the configured DL SPS, the UE may receive information indicating at least one of [Equation 17-1] or [17-6] and determine the HARQ process ID for the DL SPS on the basis of the information. As the information, the HARQ process ID, NDI, or other DI format fields may be used or RNTI information may be used.

In another example, for DL SPSs indicated by at least one of [Equation 17-3] to [Equation 17-6], the UE can apply the HARQ process ID in common to DL SPSs indicated by the same equation information. Alternatively, when at least one of the configured DL SPSs determines the HARQ process ID on the basis of at least one of [Equation 17-3] to [Equation 17-6], the equation may be applied in common to all of other DL SPSs. All of the other DL SPSs may refer to DL SPSs included in one BWP or DL SPSs included in one cell or carrier.

In another example, for DL SPSs indicated by at least one of [Equation 17-1] to [Equation 17-2], the UE can apply the HARQ process ID in common to DL SPSs indicated by the same equation information. Alternatively, when at least one of the configured DL SPSs determines the HARQ process ID on the basis of at least one of [Equation 17-1] to [Equation 17-2], the equation may be applied in common to all of other DL SPSs. All of the other DL SPSs may refer to DL SPSs included in one BWP or DL SPSs included in one cell or carrier.

FIG. 22 mainly describes a method of selecting an equation for determining the HARQ process ID, but is not limited thereto, and can be applied in common to method 17-1 to method 17-6 described in FIG. 17 or all of the other methods described in the disclosure.

Figure 23:
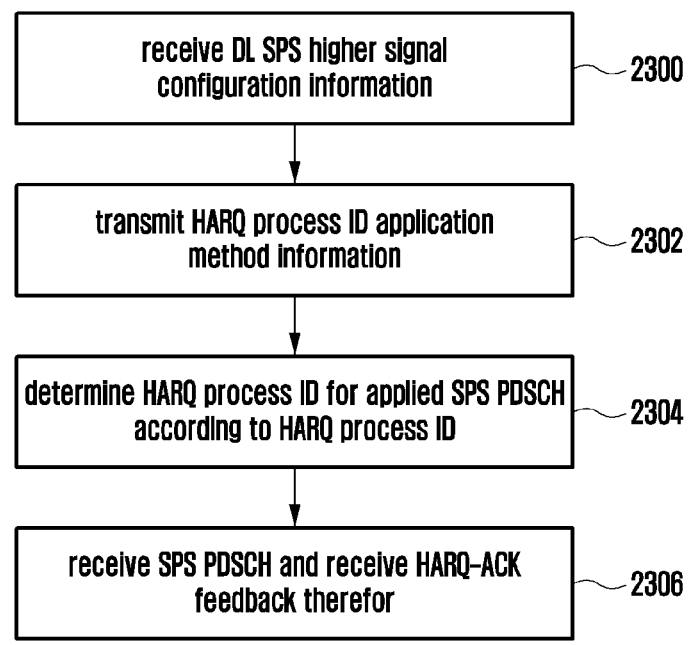
FIG. 23 is a flowchart illustrating a BS operation according to an embodiment.

FIG. 23 is a flowchart illustrating a BS operation according to an embodiment.

The BS transmits one piece of a plurality of pieces of DL SPS configuration information in operation 2300. The BS transmits information for determining the HARQ process ID in operation 2302. The information may be information included in a DCI format for activating a higher signal or DL SPS. The corresponding information for determining the HARQ process ID may be at least one of [Equation 17-1] to [Equation 17-6] described in FIG. 17. When a plurality of DL SPS configurations are indicated, the BS can determine the HARQ process ID on the basis of different equations for respective DL SPSs or determine the HARQ process ID on the basis of a common equation for some or all of the configured DL SPSs in operation 2304. The BS transmits DL SPS information on the basis of the determined HARQ process ID determined according to the indicated equation information and receives HARQ feedback information therefor in operation 2306.

FIG. 23 mainly describes a method of selecting an equation for determining the HARQ process ID, but is not limited thereto, and can be applied in common to method 17-1 to method 17-6 described in FIG. 17 or all of the other methods described in the disclosure.

Further, in various embodiments of the disclosure, "data" may include a transport block (TB) transmitted through a shared channel such as a PDSCH, a PUSCH, or a PSSCH.

In the disclosure, an example of the higher signal (or higher-level signal or high-level signal) may be UE-common signals such as an MIB or an SIB or UE-specific higher signals such as RRC or a MAC CE.

In the disclosure, an example of the L1 signal may be a specific field within DCI, DCI formation information, RNTI information scrambled with CRC of DCI, or control area resource information for transmitting and receiving DCI.

In the drawings in which methods of the disclosure are described, the order of the description does not always correspond to the order in which steps of each method are performed, and the order relationship between the steps may be changed or the steps may be performed in parallel. Alternatively, in the drawings in which methods of the disclosure are described, some elements may be omitted and only some elements may be included therein without departing from the essential spirit and scope of the disclosure.

The disclosure mainly describes a UE operation for an SPS PDSCH, but the disclosure can be equally applied sufficiently to a grant-free PUSCH (or configured grant type 1 and type 2).

In addition, in methods of the disclosure, some or all of the contents of each embodiment may be implemented in combination without departing from the essential spirit and scope of the disclosure.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a plurality of embodiments of the disclosure may be partially combined with each other to operate a base station and a terminal. Further, although the above embodiments have been described on the basis of the NR system, other variants based on the technical idea of the embodiments may also be implemented in other systems such as FDD or TDD LTE systems.

Moreover, although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants based on the technical idea of the disclosure may be implemented.

The invention claimed is:

1. A method performed by a terminal in a wireless communication system, the method comprising:
    receiving, from a base station, a radio resource control (RRC) message including a time division duplex (TDD) configuration;
    receiving, from the base station, at least one semi-persistent scheduling (SPS) physical downlink shared channel (PDSCH);
    identifying a first slot for a first physical uplink control channel (PUCCH) with first hybrid automatic repeat request-acknowledgment (HARQ-ACK) information bits associated with the at least one SPS PDSCH;
    identifying an earliest second slot for a second PUCCH in case that a symbol associated with the first PUCCH in the first slot is indicated as a downlink based on the TDD configuration; and
    transmitting, to the base station, the second PUCCH with second HARQ-ACK information bits in the earliest second slot,
    wherein in case that a first PDSCH and a second PDSCH with a same HARQ process ID are received prior to transmitting the second PUCCH, a HARQ-ACK information bit for the first PDSCH is not included in the second HARQ-ACK information bits.

2. The method of claim 1, wherein the first PDSCH is received earlier than the second PDSCH.

3. The method of claim 1,
    wherein the second PUCCH resource does not have a symbol indicated as the downlink.

4. A method performed by a base station in a wireless communication system, the method comprising:
    transmitting, to a terminal, a radio resource control (RRC) message including a time division duplex (TDD) configuration;

transmitting, to the terminal, at least one semi-persistent scheduling (SPS) physical downlink shared channel (PDSCH);

identifying a first slot for a first physical uplink control channel (PUCCH) with first hybrid automatic repeat request-acknowledgement (HARQ-ACK) information bits associated with the at least one SPS PDSCH;

identifying an earliest second slot for a second PUCCH in case that a symbol associated with the first PUCCH in the first slot is indicated as a downlink based on the TDD configuration; and receiving, from the terminal, the second PUCCH with second HARQ-ACK information bits in the earliest second slot, wherein in case that a first PDSCH and a second PDSCH with a same HARQ process ID are transmitted prior to receiving the second PUCCH, a HARQ-ACK information bit for the first PDSCH is not included in the second HARQ-ACK information bits.

5. The method of claim 4, wherein the first PDSCH is transmitted earlier than the second PDSCH.

6. The method of claim 4, wherein the second PUCCH resource does not have a symbol indicated as the downlink.

7. A terminal in a wireless communication system, the terminal comprising:

a transceiver configured to transmit and receive signals; and a processor operably coupled to the transceiver, wherein the processor is configured to:

control the transceiver to receive, from a base station, a radio resource control (RRC) message including a time division duplex (TDD) configuration, control the transceiver to receive, from the base station, at least one semi-persistent scheduling (SPS) physical downlink shared channel (PDSCH), identify a first slot for a first physical uplink control channel (PUCCH) with first hybrid automatic repeat request-acknowledgement (HARQ-ACK) information bits associated with the at least one SPS PDSCH, identify an earliest second slot for a second PUCCH in case that a symbol associated with the first PUCCH in the first slot is indicated as a downlink based on the TDD configuration, and control the transceiver to transmit, to the base station, the second PUCCH with second HARQ-ACK information bits in the earliest second slot, wherein in case that a first PDSCH and a second PDSCH with a same HARQ process ID are received prior to transmitting the second PUCCH, a HARQ-ACK information bit for the first PDSCH is not included in the second HARQ-ACK information bits.

8. The terminal of claim 7, wherein the first PDSCH is received earlier than the second PDSCH.

9. The terminal of claim 7, wherein the second PUCCH resource does not have a symbol indicated as the downlink.

10. A base station in a wireless communication system, the base station comprising:

a transceiver configured to transmit and receive signals; and a processor operably coupled to the transceiver, wherein the processor is configured to:

control the transceiver to transmit, to a terminal, a radio resource control (RRC) message including a time division duplex (TDD) configuration, control the transceiver to transmit, to the terminal, at least one semi-persistent scheduling (SPS) physical downlink shared channel (PDSCH), identify a first slot for a first physical uplink control channel (PUCCH) with first hybrid automatic repeat request-acknowledgement (HARQ-ACK) information bits associated with the at least one SPS PDSCH, identify an earliest second slot for a second PUCCH in case that a symbol associated with the first PUCCH in the first slot is indicated as a downlink based on the TDD configuration, and control the transceiver to receive, from the terminal, the second PUCCH with second HARQ-ACK information bits in the earliest second slot, wherein in case that a first PDSCH and a second PDSCH with a same HARQ process ID are transmitted prior to receiving the second PUCCH, a HARQ-ACK information bit for the first PDSCH is not included in the second HARQ-ACK information bits.

11. The base station of claim 10, wherein the first PDSCH is transmitted earlier than the second PDSCH.

* * * * *